(12) United States Patent
Bowman et al.

(10) Patent No.: US 10,185,722 B2
(45) Date of Patent: *Jan. 22, 2019

(54) DISTRIBUTED DATA SET ENCRYPTION AND DECRYPTION

(71) Applicant: SAS Institute Inc., Cary, NC (US)

(72) Inventors: Brian Payton Bowman, Apex, NC (US); Mark Kuebler Gass, III, Durham, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,670

(22) Filed: May 30, 2018

(65) Prior Publication Data

US 2018/0276231 A1    Sep. 27, 2018

Related U.S. Application Data

(63) Continuation of application No. 15/694,217, filed on Sep. 1, 2017, now Pat. No. 9,990,367, which is a (Continued)

(51) Int. Cl.
G06F 17/30 (2006.01)
G06F 3/06 (2006.01)
(Continued)

(52) U.S. Cl.
CPC ........ *G06F 17/30097* (2013.01); *G06F 3/061* (2013.01); *G06F 3/064* (2013.01);
(Continued)

(58) Field of Classification Search
CPC ......... G06F 17/30097; G06F 17/30584; G06F 17/302; G06F 17/30312; G06F 3/064;
(Continued)

(56) References Cited

U.S. PATENT DOCUMENTS 9,619,148 B2 *  4/2017  Bowman ................. G06F 3/061
9,703,789 B2 *  7/2017  Bowman ................. G06F 3/061
(Continued)

FOREIGN PATENT DOCUMENTS

WO     2017006118 A1    1/2017

OTHER PUBLICATIONS

International Search Report received for PCT Patent Application No. PCT/US17/52486, dated Dec. 11, 2017, 2 pages.

*Primary Examiner* — Shane Woolwine

(57) ABSTRACT

An apparatus may include a processor component caused to: generate map entries in map data descriptive of encrypted data blocks within a data file; use first map block encryption data to encrypt a first map extension of the map data; transmit the encrypted first map extension for storage within the data file; store the first map block encryption data within the second map extension; use second map block encryption data to encrypt a second map extension of the map data after storage of the first map block encryption data therein; transmit encrypted second map extension for storage within the data file; store the second map block encryption data within the map base; use third map block encryption data to encrypt a map base of the map data after storage of the second map block encryption data therein; and transmit the encrypted map base for storage within the data file.

30 Claims, 50 Drawing Sheets

Related U.S. Application Data continuation-in-part of application No. 15/220,182, filed on Jul. 26, 2016, now Pat. No. 9,811,524, which is a continuation of application No. 15/220,034, filed on Jul. 26, 2016, now Pat. No. 9,619,148.

(60) Provisional application No. 62/535,961, filed on Jul. 23, 2017, provisional application No. 62/519,824, filed on Jun. 14, 2017, provisional application No. 62/197,514, filed on Jul. 27, 2015, provisional application No. 62/197,519, filed on Jul. 27, 2015.

(51) Int. Cl.
  *G06F 9/50* (2006.01)
  *G06F 21/60* (2013.01)
  *G06F 12/02* (2006.01)

(52) U.S. Cl.
  CPC ............ *G06F 3/0604* (2013.01); *G06F 3/067* (2013.01); *G06F 3/0643* (2013.01); *G06F 3/0644* (2013.01); *G06F 9/5072* (2013.01); *G06F 9/5077* (2013.01); *G06F 12/0292* (2013.01); *G06F 17/302* (2013.01); *G06F 17/30312* (2013.01); *G06F 17/30584* (2013.01); *G06F 21/602* (2013.01); *H05K 999/99* (2013.01); *G06F 2212/1016* (2013.01); *G06F 2212/1056* (2013.01); *G06F 2212/154* (2013.01); *G06F 2212/262* (2013.01); *G06F 2212/263* (2013.01)

(58) Field of Classification Search
  CPC ...... G06F 3/061; G06F 3/0643; G06F 3/0644; G06F 3/067; G06F 3/0604; G06F 9/5072; G06F 9/5077; G06F 12/0292; G06F 2212/262; G06F 2212/154; G06F 2212/1056; G06F 2212/1016; G06F 2212/263
  USPC .................................................. 711/173, 135
  See application file for complete search history.

(56) References Cited

U.S. PATENT DOCUMENTS

| | | | |
|---|---|---|---|
| 9,722,974 B1 | 8/2017 | Fuller et al. | |
| 9,811,524 B2* | 11/2017 | Bowman | ................ G06F 3/061 |
| 9,946,718 B2* | 4/2018 | Bowman | ............... G06F 21/602 |
| 9,946,719 B2* | 4/2018 | Bowman | ............... G06F 21/602 |
| 9,990,367 B2* | 6/2018 | Bowman | ............... G06F 21/602 |
| 2004/0015478 A1 | 1/2004 | Pauly | |
| 2007/0226466 A1 | 9/2007 | Capek et al. | |
| 2008/0028009 A1 | 1/2008 | Ngo | |
| 2008/0235497 A1 | 9/2008 | Tomblin et al. | |
| 2009/0012947 A1 | 1/2009 | Whitehead | |
| 2010/0313040 A1* | 12/2010 | Lumb | .................. G06F 3/0608 |
| | | | 713/189 |
| 2011/0107112 A1 | 5/2011 | Resch | |
| 2011/0179039 A1 | 7/2011 | Prahlad et al. | |
| 2012/0109983 A1 | 5/2012 | Vanderhallen et al. | |
| 2012/0124282 A1 | 5/2012 | Frank et al. | |
| 2013/0275776 A1 | 10/2013 | Baptist et al. | |
| 2013/0291080 A1 | 10/2013 | Somerfield et al. | |
| 2013/0325825 A1 | 12/2013 | Pope et al. | |
| 2014/0149123 A1 | 5/2014 | Sun et al. | |
| 2015/0134796 A1* | 5/2015 | Theimer | .......... G06F 17/30569 |
| | | | 709/223 |
| 2017/0031937 A1 | 2/2017 | Bowman et al. | |
| 2017/0169233 A1 | 6/2017 | Hsu et al. | |

* cited by examiner

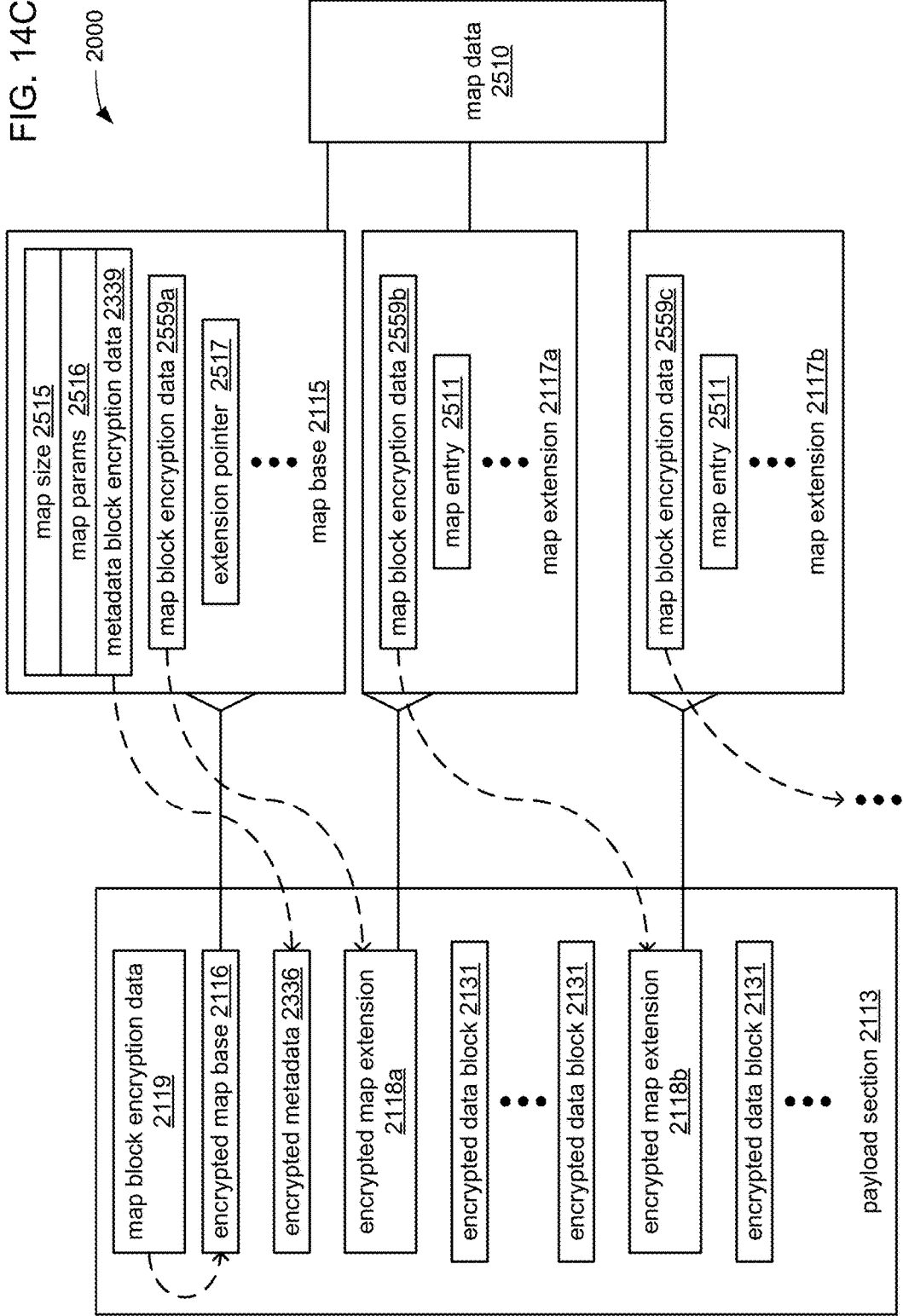

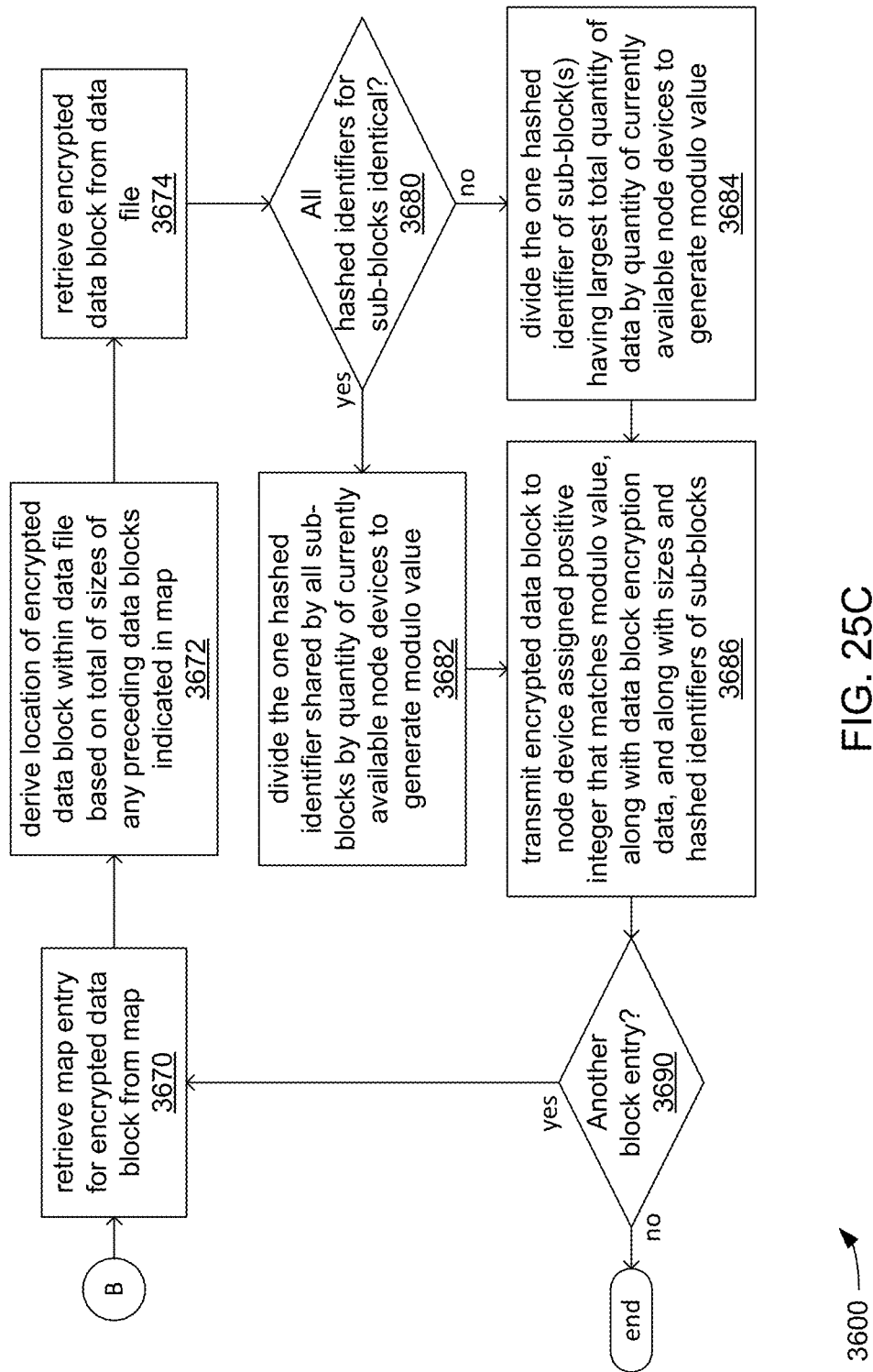

DISTRIBUTED DATA SET ENCRYPTION AND DECRYPTION

CROSS-REFERENCE TO RELATED APPLICATIONS

This application is a continuation under the provisions of 35 U.S.C. § 120 of U.S. application Ser. No. 15/694,217 filed Sep. 1, 2017; which is a continuation-in-part under the provisions of 35 U.S.C. § 120 of U.S. application Ser. No. 15/220,182 filed Jul. 26, 2016 (now U.S. Pat. No. 9,811,524); which is a continuation under the provisions of 35 U.S.C. § 120 of U.S. application Ser. No. 15/220,034 also filed Jul. 26, 2016 (now U.S. Pat. No. 9,619,148); which claims the benefit of priority under 35 U.S.C. § 119(e) to U.S. Provisional Application Ser. Nos. 62/197,514 and 62/197,519, both filed Jul. 27, 2015. application Ser. No. 15/694,217 also claims the benefit of priority under 35 U.S.C. § 119(e) to U.S. Provisional Application Ser. No. 62/519,824 filed Jun. 14, 2017, and to U.S. Provisional Application Ser. No. 62/535,961 filed Jul. 23, 2017. The disclosures of U.S. application Ser. No. 15/694,217; related U.S. application Ser. Nos. 15/694,662 and 15/694,674, both also filed Sep. 1, 2017 (now U.S. Pat. Nos. 9,946,718 and 9,946,719, respectively); U.S. application Ser. No. 15/220,182; related U.S. application Ser. No. 15/804,570 filed Nov. 6, 2017; related U.S. application Ser. No. 15/220,192 also filed Jul. 26, 2016 (now U.S. Pat. No. 9,703,789); U.S. application Ser. No. 15/220,034; U.S. Provisional Application Ser. No. 62/197,514; U.S. Provisional Application Ser. No. 62/197,519; U.S. Provisional Application Ser. No. 62/519,824; and U.S. Provisional Application Ser. No. 62/535,961 are all hereby incorporated herein by reference in their respective entireties for all purposes.

TECHNICAL FIELD

Various embodiments described herein are generally directed to inter-device coordination and data set organization to improve distributed encryption and decryption of a data set processed by multiple node devices.

BACKGROUND

The performance of analyses of large data sets (e.g., what is commonly referred to as "big data") is becoming increasingly commonplace in such areas as simulations, process monitoring, decision making, behavioral modeling and making predictions. Such analysis are often performed by grids of varying quantities of available node devices, while the data sets are often stored within a separate set of storage devices. This begets the challenge of efficiently encrypting such large data sets for storage by storage devices and efficiently decrypting such large data sets for use by node devices among a grid of node devices following retrieval from storage devices.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus may include a processor component and a storage to store instructions that, when executed by the processor component, cause the processor component to perform operations including transmit, to multiple node devices, a command to encrypt a data set distributed among the multiple node devices for storage, and receive, from at least one node device of the multiple node devices, at least a portion of metadata indicative of organization of data within the data set, wherein: the data set is to be stored as multiple encrypted data blocks within a data file maintained by one or more storage devices; each node device of the multiple node devices is to provide at least one encrypted data block of the multiple encrypted data blocks to be stored; the organization of the multiple encrypted data blocks within the data file is to be indicated in map data that is to include multiple map entries; each map entry of the multiple map entries is to correspond to an encrypted data block of the multiple encrypted data blocks; and at least a subset of the multiple node devices are to each encrypt a portion of the data of the data set to generate at least one of the multiple encrypted data blocks at least partially in parallel. The processor component may be further caused to perform operations including: receive, from each node device of the multiple node devices, an indication of a size of one of the multiple encrypted data blocks and data block encryption data, wherein the data block encryption data is generated by the node device and is used by the node device to encrypt a portion of the data set to generate the one of the multiple encrypted data blocks; and for each encrypted data block of the multiple encrypted data blocks for which an indication of size and data block encryption data is received, generate a corresponding one of the multiple map entries within the map data to include the indication of size and the data block encryption data. In response to receipt of indications of size and data block encryption data for the encrypted data blocks of the multiple encrypted data blocks, the processor component may be further caused to perform operations including: use, by the processor component, metadata block encryption data to encrypt the metadata to generate an encrypted metadata block; add the metadata block encryption data to the map data; transmit the encrypted metadata block to the one or more storage devices to be stored at a first predetermined location within the data file; use, by the processor component, first map block encryption data to encrypt a first portion of the map data to generate an encrypted map base, wherein the first portion of the map data includes at least a first subset of the multiple map entries and the metadata block encryption data; and transmit the encrypted map base to the one or more storage devices to be stored at a second predetermined location within the data file.

The processor component may be caused to transmit a pass phrase value to each of the multiple node devices to use to encrypt a portion of the data of the data set to generate at least one of the multiple encrypted data blocks at least partially in parallel, wherein no indication of the pass phrase value is to be transmitted to the one or more storage devices.

The data set may include partitioned data, wherein: the data of the data set is divided into multiple partitions that are each assigned a partition label; each encrypted data block includes at least one data sub-block that includes data of the data set that belongs to a single partition of the multiple partitions; and the indication of a size of one of the multiple encrypted data blocks received from each node device includes an indication of a sub-block size indicative of a quantity of the data of the data set within each data sub-block within the one of the encrypted data blocks. In response to an indication received from the at least one node device that the data set includes partitioned data, the processor component may be caused to perform operations including: generate within each map entry a sub-block count indicative of a quantity of the data sub-blocks within the corresponding encrypted data block; and generate within each map entry a separate map sub-entry for each data sub-block within the corresponding encrypted data block, wherein each map sub-entry includes the sub-block size of the corresponding data sub-block and a hashed identifier and the hashed identifier is derived from the partition label of the partition to which the data of the data set that is within the corresponding data sub-block belongs.

The processor component may be caused to perform operations including: randomly generate a first salt value as part of the metadata block encryption data; use, by the processor component, the metadata block encryption data and a pass phrase to generate a first encryption cipher; use, by the processor component, the first encryption cipher and a size of the metadata to encrypt the metadata; randomly generate a second salt value as part of the first map block encryption data; use, by the processor component, the first map block encryption data and the pass phrase to generate a second encryption cipher; and use, by the processor component, the second encryption cipher and a size of the first portion of the map data to encrypt the first portion of the map data wherein the pass phrase is not to be transmitted to the one or more storage devices. Each data block encryption data may be separately generated by one of the multiple node devices for a corresponding one of the multiple encrypted data blocks, and may include another salt value that is randomly generated by the one of the multiple node devices. More than one node device of the multiple node devices may generate more than one encrypted data block of the multiple encrypted data blocks at least partially in parallel.

The processor component may be caused to perform operations including: perform an XOR operation with the first map block encryption data; and following the performance of the XOR operation, transmit the first map block encryption data to the one or more storage devices to be stored at a third predetermined location within the data file.

The processor component may caused, prior to encryption of the first portion of the data map, to perform operations including: use, by the processor component, the second map block encryption data to encrypt a second portion of the map data to generate a first encrypted map extension, wherein the second portion of the map data includes a second subset of the multiple map entries; add the second map block encryption data to the first portion of the map data prior to encryption of the first portion of the map data; and transmit the first encrypted map extension to the one or more storage devices to be stored at a third predetermined location within the data file. The processor component may be caused to generate multiple encrypted map extensions, wherein: the multiple encrypted map extensions includes the first encrypted map extension; and each successive one of the multiple encrypted map extensions following the first encrypted map extension, in a pre-defined order, is up to twice the size of the preceding one of the multiple encrypted map extensions.

The multiple node devices may be capable of communication with the one or more storage devices, and the processor component may be caused to perform operations including: receive, from each node device of the multiple node devices, and with the indication of size and the data block encryption data for one of the multiple encrypted data blocks, a request for a pointer to a location within the data file at which to store the one of the multiple encrypted data blocks; and for each encrypted data block for which a request for a pointer to a location is received, determine the location within the data file at which the corresponding node device is to store the encrypted data block, and transmit, to the corresponding node device, a pointer to the location within the data file. At least one node device of the multiple node devices may not be capable of communication with the one or more storage devices, and the processor component may be caused to perform operations including: receive, from each node device of the multiple node devices, and with the indication of size and the data block encryption data for one of the multiple encrypted data blocks, the one of the multiple encrypted data blocks; and for each encrypted data block received from a corresponding one of the multiple node devices, determine the location within the data file at which to store the encrypted data block, and transmit, to the one or more storage devices, the encrypted data block to be stored at the location within the data file. The apparatus may include an additional node device; and the processor component may be caused to perform operations including: perform a task with a portion of the data set at least partially in parallel with one or more of the multiple node devices; generate data block encryption data to encrypt the portion of the data set to generate one of the multiple encrypted data blocks; and generate a corresponding one of the multiple map entries to include an indication of a size of the one of the multiple encrypted data blocks and the data block encryption data.

A computer-program product tangibly embodied in a non-transitory machine-readable storage medium, the computer-program product including instructions that may be operable to cause a processor component to perform operations including: transmit, to multiple node devices, a command to encrypt a data set distributed among the multiple node devices for storage, and receive, from at least one node device of the multiple node devices, at least a portion of metadata indicative of organization of data within the data set, wherein: the data set is to be stored as multiple encrypted data blocks within a data file maintained by one or more storage devices; each node device of the multiple node devices is to provide at least one encrypted data block of the multiple encrypted data blocks to be stored; the organization of the multiple encrypted data blocks within the data file is to be indicated in map data that is to include multiple map entries; each map entry of the multiple map entries is to correspond to an encrypted data block of the multiple encrypted data blocks; and at least a subset of the multiple node devices are to each encrypt a portion of the data of the data set to generate at least one of the multiple encrypted data blocks at least partially in parallel. The processor component may be further caused to perform operations including: receive, from each node device of the multiple node devices, an indication of a size of one of the multiple encrypted data blocks, and data block encryption data, wherein the data block encryption data is generated by the node device and is used by the node device to encrypt a portion of the data set to generate the one of the multiple encrypted data blocks; and for each encrypted data block of the multiple encrypted data blocks for which an indication of size and data block encryption data is received, generate a corresponding one of the multiple map entries within the map data to include the indication of size and the data block encryption data. In response to receipt of indications of size and data block encryption data for the encrypted data blocks of the multiple encrypted data blocks, the processor component may be further caused to perform operations including: use, by the processor component, metadata block encryption data to encrypt the metadata to generate an encrypted metadata block; add the metadata block encryption data to the map data; transmit the encrypted metadata block to the one or more storage devices to be stored at a first predetermined location within the data file; use, by the processor component first map block encryption data to encrypt a first portion of the map data to generate an encrypted map base, wherein the first portion of the map data includes at least a first subset of the multiple map entries and the metadata block encryption data; and transmit the encrypted map base to the one or more storage devices to be stored at a second predetermined location within the data file.

The processor component may be caused to transmit a pass phrase value to each of the multiple node devices to use to encrypt a portion of the data of the data set to generate at least one of the multiple encrypted data blocks at least partially in parallel, wherein no indication of the pass phrase value is to be transmitted to the one or more storage devices.

The data set may include partitioned data, wherein: the data of the data set is divided into multiple partitions that are each assigned a partition label; each encrypted data block includes at least one data sub-block that includes data of the data set that belongs to a single partition of the multiple partitions; and the indication of a size of one of the multiple encrypted data blocks received from each node device includes an indication of a sub-block size indicative of a quantity of the data of the data set within each data sub-block within the one of the encrypted data blocks. In response to an indication received from the at least one node device that the data set includes partitioned data, the processor component may be caused to perform operations including: generate within each map entry a sub-block count indicative of a quantity of the data sub-blocks within the corresponding encrypted data block; and generate within each map entry a separate map sub-entry for each data sub-block within the corresponding encrypted data block, wherein each map sub-entry includes the sub-block size of the corresponding data sub-block and a hashed identifier and the hashed identifier is derived from the partition label of the partition to which the data of the data set that is within the corresponding data sub-block belongs.

The processor may be caused to perform operations including: randomly generate a first salt value as part of the metadata block encryption data; use, by the processor component, the metadata block encryption data and a pass phrase to generate a first encryption cipher; use, by the processor component, the first encryption cipher and a size of the metadata to encrypt the metadata; randomly generate a second salt value as part of the first map block encryption data; use, by the processor component, the first map block encryption data and the pass phrase to generate a second encryption cipher; and use, by the processor component, the second encryption cipher and a size of the first portion of the map data to encrypt the first portion of the map data wherein the pass phrase is not to be transmitted to the one or more storage devices. Each data block encryption data may be separately generated by one of the multiple node devices for a corresponding one of the multiple encrypted data blocks, and includes another salt value that is randomly generated by the one of the multiple node devices. More than one node device of the multiple node devices may generate more than one encrypted data block of the multiple encrypted data blocks at least partially in parallel.

The processor component may be caused to perform operations including: perform an XOR operation with the first map block encryption data; and following the performance of the XOR operation, transmit the first map block encryption data to the one or more storage devices to be stored at a third predetermined location within the data file.

The processor component may be caused, prior to encryption of the first portion of the data map, to perform operations including: use, by the processor component, the second map block encryption data to encrypt a second portion of the map data to generate a first encrypted map extension, wherein the second portion of the map data includes a second subset of the multiple map entries; add the second map block encryption data to the first portion of the map data prior to encryption of the first portion of the map data; and transmit the first encrypted map extension to the one or more storage devices to be stored at a third predetermined location within the data file. The processor component may be caused to generate multiple encrypted map extensions, wherein: the multiple encrypted map extensions includes the first encrypted map extension; and each successive one of the multiple encrypted map extensions following the first encrypted map extension, in a pre-defined order, is up to twice the size of the preceding one of the multiple encrypted map extensions.

The multiple node devices may be capable of communication with the one or more storage devices, and the processor component may be caused to perform operations including: receive, from each node device of the multiple node devices, and with the indication of size and the data block encryption data for one of the multiple encrypted data blocks, a request for a pointer to a location within the data file at which to store the one of the multiple encrypted data blocks; and for each encrypted data block for which a request for a pointer to a location is received, determine the location within the data file at which the corresponding node device is to store the encrypted data block, and transmit, to the corresponding node device, a pointer to the location within the data file. At least one node device of the multiple node devices may not be capable of communication with the one or more storage devices, and the processor component may be caused to perform operations including: receive, from each node device of the multiple node devices, and with the indication of size and the data block encryption data for one of the multiple encrypted data blocks, the one of the multiple encrypted data blocks; and for each encrypted data block received from a corresponding one of the multiple node devices, determine the location within the data file at which to store the encrypted data block, and transmit, to the one or more storage devices, the encrypted data block to be stored at the location within the data file. The processor component may be incorporated into an additional node device, and the processor component may be caused to perform operations including: perform a task with a portion of the data set at least partially in parallel with one or more of the multiple node devices; generate data block encryption data to encrypt the portion of the data set to generate one of the multiple encrypted data blocks; and generate a corresponding one of the multiple map entries to include an indication of a size of the one of the multiple encrypted data blocks and the data block encryption data.

A computer-implemented method may include: transmitting, to multiple node devices via a network, a command to encrypt a data set distributed among the multiple node devices for storage, and receiving, from at least one node device of the multiple node devices, at least a portion of metadata indicative of organization of data within the data set, wherein: the data set is to be stored as multiple encrypted data blocks within a data file maintained by one or more storage devices; each node device of the multiple node devices is to provide at least one encrypted data block of the multiple encrypted data blocks to be stored; the organization of the multiple encrypted data blocks within the data file is to be indicated in map data that is to include multiple map entries; each map entry of the multiple map entries is to correspond to an encrypted data block of the multiple encrypted data blocks; and at least a subset of the multiple node devices are to each encrypt a portion of the data of the data set to generate at least one of the multiple encrypted data blocks at least partially in parallel. The method may further include: receiving, from each node device of the multiple node devices, an indication of a size of one of the multiple encrypted data blocks, and data block encryption data, wherein the data block encryption data is generated by the node device and is used by the node device to encrypt a portion of the data set to generate the one of the multiple encrypted data blocks; and for each encrypted data block of the multiple encrypted data blocks for which an indication of size and data block encryption data is received, generating, by a processor component, a corresponding one of the multiple map entries within the map data to include the indication of size and the data block encryption data. The method may further include, in response to receipt of indications of size and data block encryption data for the encrypted data blocks of the multiple encrypted data blocks, performing operations including: using, by the processor component, the metadata block encryption data to encrypt the metadata to generate an encrypted metadata block; adding, by the processor component, the metadata block encryption data to the map data; transmitting, via the network, the encrypted metadata block to the one or more storage devices to be stored at a first predetermined location within the data file; using, by the processor component, the first map block encryption data to encrypt a first portion of the map data to generate an encrypted map base, wherein the first portion of the map data includes at least a first subset of the multiple map entries and the metadata block encryption data; and transmitting, via the network, the encrypted map base to the one or more storage devices to be stored at a second predetermined location within the data file.

The method may include transmitting, via the network, a pass phrase value to each of the multiple node devices to use to encrypt a portion of the data of the data set to generate, within each of the multiple node devices, at least one of the multiple encrypted data blocks at least partially in parallel, wherein no indication of the pass phrase value is to be transmitted to the one or more storage devices.

The data set may include partitioned data, wherein: the data of the data set is divided into multiple partitions that are each assigned a partition label; each encrypted data block includes at least one data sub-block that includes data of the data set that belongs to a single partition of the multiple partitions; and the indication of asize of one of the multiple encrypted data blocks received from each node device includes an indication of a sub-block size indicative of a quantity of the data of the data set within each data sub-block within the one of the encrypted data blocks. The method may include, in response to an indication received from the at least one node device that the data set includes partitioned data, performing operations including: generating, by the processor component, within each map entry a sub-block count indicative of a quantity of the data sub-blocks within the corresponding encrypted data block; and generating, by the processor component, within each map entry a separate map sub-entry for each data sub-block within the corresponding encrypted data block, wherein each map sub-entry includes the sub-block size of the corresponding data sub-block and a hashed identifier, and the hashed identifier is derived from the partition label of the partition to which the data of the data set that is within the corresponding data sub-block belongs.

The method may include performing operations including: randomly generating, by the processor component, a first salt value as part of the metadata block encryption data; using, by the processor component, the metadata block encryption data and a pass phrase to generate a first encryption cipher; using, by the processor component, the first encryption cipher and a size of the metadata to encrypt the metadata; randomly generating, by the processor component, a second salt value as part of the first map block encryption data; using, by the processor component, the first map block encryption data and the pass phrase to generate a second encryption cipher; and using, by the processor component, the second encryption cipher and a size of the first portion of the map data to encrypt the first portion of the map data wherein the pass phrase is not to be transmitted to the one or more storage devices. Each data block encryption data may be separately generated by one of the multiple node devices for a corresponding one of the multiple encrypted data blocks, and may include another salt value that is randomly generated by the one of the multiple node devices. More than one node device of the multiple node devices may generate more than one encrypted data block of the multiple encrypted data blocks at least partially in parallel.

The method may include: performing, by the processor component, an XOR operation with the first map block encryption data; and following the performance of the XOR operation, transmitting, via the network, the first map block encryption data to the one or more storage devices to be stored at a third predetermined location within the data file.

The method may include, prior to encryption of the first portion of the data map, performing operations including: using, by the processor component, the second map block encryption data to encrypt a second portion of the map data to generate a first encrypted map extension, wherein the second portion of the map data includes a second subset of the multiple map entries; adding, by the processor component, the second map block encryption data to the first portion of the map data prior to encryption of the first portion of the map data; and transmitting, via the network, the first encrypted map extension to the one or more storage devices to be stored at a third predetermined location within the data file. The method may include generating, by the processor component, multiple encrypted map extensions, wherein: the multiple encrypted map extensions includes the first encrypted map extension; and each successive one of the multiple encrypted map extensions following the first encrypted map extension in a pre-defined order, is up to twice the size of the preceding one of the multiple encrypted map extensions.

The multiple node devices may be capable of communication with the one or more storage devices, and the method may include performing operations including: receiving, from each node device of the multiple node devices, and with the indication of size and the data block encryption data for one of the multiple encrypted data blocks, a request for a pointer to a location within the data file at which to store the one of the multiple encrypted data blocks; and for each encrypted data block for which a request for a pointer to a location is received, determining, by the processor component, the location within the data file at which the corresponding node device is to store the encrypted data block, and transmitting, via the network to the corresponding node device, a pointer to the location within the data file. At least one node device of the multiple node devices may not be capable of communication with the one or more storage devices, and the method may include performing operations including: receiving, from each node device of the multiple node devices, and with the indication of size and the data block encryption data for one of the multiple encrypted data blocks, the one of the multiple encrypted data blocks; and for each encrypted data block received from a corresponding one of the multiple node devices, determining, by the processor component, the location within the data file at which to store the encrypted data block, and transmitting, via the network to the one or more storage devices, the encrypted data block to be stored at the location within the data file. The processor component may be incorporated into an additional node device, and the method may include performing operations including: performing, by the processor component, a task with a portion of the data set at least partially in parallel with one or more of the multiple node devices; generating, by the processor component, data block encryption data to encrypt the portion of the data set to generate one of the multiple encrypted data blocks; and generating, by the processor component, a corresponding one of the multiple map entries to include an indication of a size of the one of the multiple encrypted data blocks and the data block encryption data.

An apparatus may include a processor component and a storage to store instructions that, when executed by the processor component, cause the processor component to perform operations including generate, by the processor component, multiple map entries in map data that is descriptive of an arrangement of multiple encrypted data blocks of a data set within a data file to be maintained by one or more storage devices, wherein: each map entry of the multiple map entries is to correspond to an encrypted data block of the multiple encrypted data blocks, and is to include an indication of a data block size of the corresponding encrypted data block; and each map entry is to include data block encryption data that is separately generated and used to encrypt a portion of the data set to generate the corresponding encrypted data block. The processor component may be further caused to perform operations including divide, by the processor component, the map data into at least a map base and multiple map extensions in response to completion of generation of the multiple map entries in the map data, wherein: the multiple map extensions comprises at least a first map extension and a second map extension; the first map extension comprises a first subset of the multiple map entries that corresponds to a first subset of the multiple encrypted data blocks, and the first map extension is to be encrypted to generate a first encrypted map extension; the second map extension comprises a second subset of the multiple map entries that corresponds to a second subset of the multiple encrypted data blocks, and the second map extension is to be encrypted to generate a second encrypted map extension; the map base comprises multiple extension pointers; and the multiple extension pointers comprises at least a first extension pointer that points to a first location within the data file at which the first encrypted map extension is to be stored, and a second extension pointer that points to a second location within the data file at which the second encrypted map extension is to be stored. The processor component may be further caused to perform operations including: use, by the processor component, first map block encryption data to encrypt the first map extension to generate the first encrypted map extension; transmit the first encrypted map extension to the one or more storage devices to be stored at the first location within the data file; store the first map block encryption data within the second map extension; use, by the processor component, second map block encryption data to encrypt the second map extension to generate the second encrypted map extension after storage of the first map block encryption data within the second map block; transmit the second encrypted map extension to the one or more storage devices to be stored at the second location within the data file; store the second map block encryption data within the map base; use, by the processor component, third map block encryption data to encrypt the map base to generate an encrypted map base after storage of the second map block encryption data within the map base; and transmit the encrypted map base to the one or more storage devices to be stored at a third location within the data file.

The processor component may be caused to perform operations including: compare a size of the map data to a threshold map data size; and determine, by the processor component, whether to divide the map data into the map base and the multiple map extensions based on the comparison. In response to a determination that the size of the map data exceeds the threshold map data size, the processor component may perform operations including: determine, by the processor component, a quantity of the multiple map extensions based on a size of the map data; and generate the map extensions of the multiple map extensions to have exponentially increasing sizes. The third location within the data file at which the encrypted map base is to be stored may include a predetermined location within the data file that follows a header of the data file from a starting end of the data file. The processor component may be caused to perform operations including: derive the second location within the data file at which the second map extension is to be stored based on the third location and a size of the encrypted map base, wherein the second location follows the encrypted map base and precedes the second subset of the multiple encrypted data blocks; and derive the first location within the data file at which the first map extension is to be stored based on the second location, a size of the second encrypted map extension and a total size of second subset of the multiple encrypted data blocks, wherein the second location follows the second subset of the multiple encrypted data blocks and precedes the first subset of the multiple encrypted data blocks.

The processor component may be caused to perform operations including: randomly generate a first salt value as part of the first map block encryption data; use, by the processor component, the first map block encryption data and a pass phrase to generate a first encryption cipher; use, by the processor component, the first encryption cipher and a size of the first map extension to encrypt the first map extension to generate the first encrypted map extension; randomly generate a second salt value as part of the second map block encryption data; use, by the processor component, the second map block encryption data and the pass phrase to generate a second encryption cipher; use, by the processor component, the second encryption cipher and a size of the second map extension to encrypt the second map extension to generate the second encrypted map extension; randomly generate a third salt value as part of the third map block encryption data; use, by the processor component, the third map block encryption data and the pass phrase to generate a third encryption cipher; and use, by the processor component, the third encryption cipher and a size of the map base to encrypt the map base to generate the encrypted map base, wherein the pass phrase is not to be transmitted to the one or more storage devices. The processor component may be caused to perform operations including: randomly generate a fourth salt value as part of a metadata block encryption data; use, by the processor component, the metadata block encryption data and the pass phrase to generate a fourth encryption cipher; use, by the processor component, the fourth encryption cipher and a size of metadata descriptive of an organization of data of the data set to encrypt the metadata to generate encrypted metadata; transmit the encrypted metadata to the one or more storage devices to be stored at a fourth location within the data file; and store the metadata block encryption data within the map base prior to encryption of the map base to generate the encrypted map base.

The processor component may be caused to perform operations including: perform an XOR operation with the third map block encryption data; and following the performance of the XOR operation, transmit the third map block encryption data to the one or more storage devices to be stored at a predetermined location within the data file. The processor component may be caused to perform operations including: receive, at a control device that comprises the processor component, the data block encryption data and the data block size for each encrypted data block of the multiple encrypted data blocks from multiple node devices; receive, at the control device and from each node device of the multiple node devices, a request for a pointer to at location within the data file at which the node device is to store an encrypted data block of the multiple encrypted data blocks; and in response to each request for a pointer received from a node device of the multiple node devices, derive the location within the data file at which the node device is to store the encrypted data block, and transmit, to node device, a pointer to the location within the data file. The processor component may be caused to perform operations including: receive, at a control device that comprises the processor component, the data block encryption data and the data block size for each encrypted data block of the multiple encrypted data blocks from multiple node devices; receive, at the control device and from each node device of the multiple node devices, at least one encrypted data block of the multiple encrypted data blocks to store an encrypted data block of the multiple encrypted data blocks; and in response to each receipt of at least one encrypted data block from a node device of the multiple node devices, derive the location within the data file at which the control device is to store the at least one encrypted data block, and transmit the at least one encrypted data block to the one or more storage devices to store within the data file at the location.

The processor component may be caused, at a time following storage of the data set as the multiple encrypted data blocks within the data file, to perform operations including: retrieve the third map block encryption data from a predetermined location within the data file; retrieve the encrypted map base from the third location within the data file; use, by the processor component, the third map block encryption data and a pass phrase to generate a third decryption cipher; use, by the processor component, the third decryption cipher and a size of the encrypted map base to decrypt the encrypted map base to regenerate the map base; retrieve the second map block encryption data from the map base; retrieve the second encrypted map extension from the second location within the data file; use, by the processor component, the second map block encryption data and the pass phrase to generate a second decryption cipher; use, by the processor component, the second decryption cipher and a size of the second encrypted map extension to decrypt the second encrypted map extension to regenerate the second map extension; retrieve the first map block encryption data from the second map extension; retrieve the first encrypted map extension from the first location within the data file; use, by the processor component, the first map block encryption data and the pass phrase to generate a first decryption cipher; and use, by the processor component, the first decryption cipher and a size of the first encrypted map extension to decrypt the first encrypted map extension to regenerate the first map extension. The processor component may be caused to perform operations including: retrieve at least the first subset of the multiple map entries and the second subset of the multiple map entries; derive, by the processor component, a distribution of the multiple encrypted data blocks among multiple node devices; and for each encrypted data block of the multiple encrypted data blocks, transmit at least the corresponding data block encryption data to a node device of the multiple node devices to which the encrypted data block is assigned in the distribution to enable the node device to decrypt the encrypted data block.

A computer-program product tangibly embodied in a non-transitory machine-readable storage medium, the computer-program product including instructions that may be operable to cause a processor component to perform operations including generate, by the processor component, multiple map entries in map data that is descriptive of an arrangement of multiple encrypted data blocks of a data set within a data file to be maintained by one or more storage devices, wherein: each map entry of the multiple map entries is to correspond to an encrypted data block of the multiple encrypted data blocks, and is to include an indication of a data block size of the corresponding encrypted data block; and each map entry is to include data block encryption data that is separately generated and used to encrypt a portion of the data set to generate the corresponding encrypted data block. The processor component may be caused to perform operations including divide, by the processor component, the map data into at least a map base and multiple map extensions in response to completion of generation of the multiple map entries in the map data, wherein: the multiple map extensions comprises at least a first map extension and a second map extension; the first map extension comprises a first subset of the multiple map entries that corresponds to a first subset of the multiple encrypted data blocks, and the first map extension is to be encrypted to generate a first encrypted map extension; the second map extension comprises a second subset of the multiple map entries that corresponds to a second subset of the multiple encrypted data blocks, and the second map extension is to be encrypted to generate a second encrypted map extension; the map base comprises multiple extension pointers; and the multiple extension pointers comprises at least a first extension pointer that points to a first location within the data file at which the first encrypted map extension is to be stored, and a second extension pointer that points to a second location within the data file at which the second encrypted map extension is to be stored. The processor component may be caused to perform operations including: use, by the processor component, first map block encryption data to encrypt the first map extension to generate the first encrypted map extension; transmit the first encrypted map extension to the one or more storage devices to be stored at the first location within the data file; store the first map block encryption data within the second map extension; use, by the processor component, second map block encryption data to encrypt the second map extension to generate the second encrypted map extension after storage of the first map block encryption data within the second map block; transmit the second encrypted map extension to the one or more storage devices to be stored at the second location within the data file; store the second map block encryption data within the map base; use, by the processor component, third map block encryption data to encrypt the map base to generate an encrypted map base after storage of the second map block encryption data within the map base; and transmit the encrypted map base to the one or more storage devices to be stored at a third location within the data file.

The processor component may be caused to perform operations including: compare a size of the map data to a threshold map data size; and determine, by the processor component, whether to divide the map data into the map base and the multiple map extensions based on the comparison. In response to a determination that the size of the map data exceeds the threshold map data size, the processor component may be caused to perform operations including: determine, by the processor component, a quantity of the multiple map extensions based on a size of the map data; and generate the map extensions of the multiple map extensions to have exponentially increasing sizes. The third location within the data file at which the encrypted map base is to be stored may include a predetermined location within the data file that follows a header of the data file from a starting end of the data file, and the processor component may be caused to perform operations including: derive the second location within the data file at which the second map extension is to be stored based on the third location and a size of the encrypted map base, wherein the second location follows the encrypted map base and precedes the second subset of the multiple encrypted data blocks; and derive the first location within the data file at which the first map extension is to be stored based on the second location, a size of the second encrypted map extension and a total size of second subset of the multiple encrypted data blocks, wherein the second location follows the second subset of the multiple encrypted data blocks and precedes the first subset of the multiple encrypted data blocks.

The processor component may be caused to perform operations including: randomly generate a first salt value as part of the first map block encryption data; use, by the processor component, the first map block encryption data and a pass phrase to generate a first encryption cipher; use, by the processor component, the first encryption cipher and a size of the first map extension to encrypt the first map extension to generate the first encrypted map extension; randomly generate a second salt value as part of the second map block encryption data; use, by the processor component, the second map block encryption data and the pass phrase to generate a second encryption cipher; use, by the processor component, the second encryption cipher and a size of the second map extension to encrypt the second map extension to generate the second encrypted map extension; randomly generate a third salt value as part of the third map block encryption data; use, by the processor component, the third map block encryption data and the pass phrase to generate a third encryption cipher; and use, by the processor component, the third encryption cipher and a size of the map base to encrypt the map base to generate the encrypted map base, wherein the pass phrase is not to be transmitted to the one or more storage devices. The processor component may be caused to perform operations including: randomly generate a fourth salt value as part of a metadata block encryption data; use, by the processor component, the metadata block encryption data and the pass phrase to generate a fourth encryption cipher; use, by the processor component, the fourth encryption cipher and a size of metadata descriptive of an organization of data of the data set to encrypt the metadata to generate encrypted metadata; transmit the encrypted metadata to the one or more storage devices to be stored at a fourth location within the data file; and store the metadata block encryption data within the map base prior to encryption of the map base to generate the encrypted map base.

The processor component may be caused to perform operations including: perform an XOR operation with the third map block encryption data; and following the performance of the XOR operation, transmit the third map block encryption data to the one or more storage devices to be stored at a predetermined location within the data file. The processor component may be caused to perform operations including: receive, at a control device that comprises the processor component, the data block encryption data and the data block size for each encrypted data block of the multiple encrypted data blocks from multiple node devices; receive, at the control device and from each node device of the multiple node devices, a request for a pointer to at location within the data file at which the node device is to store an encrypted data block of the multiple encrypted data blocks; and in response to each request for a pointer received from a node device of the multiple node devices, derive the location within the data file at which the node device is to store the encrypted data block, and transmit, to node device, a pointer to the location within the data file. The processor component may be caused to perform operations including: receive, at a control device that comprises the processor component, the data block encryption data and the data block size for each encrypted data block of the multiple encrypted data blocks from multiple node devices; receive, at the control device and from each node device of the multiple node devices, at least one encrypted data block of the multiple encrypted data blocks to store an encrypted data block of the multiple encrypted data blocks; and in response to each receipt of at least one encrypted data block from a node device of the multiple node devices, derive the location within the data file at which the control device is to store the at least one encrypted data block, and transmit the at least one encrypted data block to the one or more storage devices to store within the data file at the location.

The processor component may be caused, at a time following storage of the data set as the multiple encrypted data blocks within the data file, to perform operations including: retrieve the third map block encryption data from a predetermined location within the data file; retrieve the encrypted map base from the third location within the data file; use, by the processor component, the third map block encryption data and a pass phrase to generate a third decryption cipher; use, by the processor component, the third decryption cipher and a size of the encrypted map base to decrypt the encrypted map base to regenerate the map base; retrieve the second map block encryption data from the map base; retrieve the second encrypted map extension from the second location within the data file; use, by the processor component, the second map block encryption data and the pass phrase to generate a second decryption cipher; use, by the processor component, the second decryption cipher and a size of the second encrypted map extension to decrypt the second encrypted map extension to regenerate the second map extension; retrieve the first map block encryption data from the second map extension; retrieve the first encrypted map extension from the first location within the data file; use, by the processor component, the first map block encryption data and the pass phrase to generate a first decryption cipher; and use, by the processor component, the first decryption cipher and a size of the first encrypted map extension to decrypt the first encrypted map extension to regenerate the first map extension. The processor component may be caused to perform operations including: retrieve at least the first subset of the multiple map entries and the second subset of the multiple map entries; derive, by the processor component, a distribution of the multiple encrypted data blocks among multiple node devices; and for each encrypted data block of the multiple encrypted data blocks, transmit at least the corresponding data block encryption data to a node device of the multiple node devices to which the encrypted data block is assigned in the distribution to enable the node device to decrypt the encrypted data block.

A computer-implemented method may include generating, by a processor component, multiple map entries in map data that is descriptive of an arrangement of multiple encrypted data blocks of a data set within a data file to be maintained by one or more storage devices, wherein: each map entry of the multiple map entries is to correspond to an encrypted data block of the multiple encrypted data blocks, and is to include an indication of a data block size of the corresponding encrypted data block; and each map entry is to include data block encryption data that is separately generated and used to encrypt a portion of the data set to generate the corresponding encrypted data block. The method may further include: dividing, by the processor component, the map data into at least a map base and multiple map extensions in response to completing generation of the multiple map entries in the map data, wherein: the multiple map extensions comprises at least a first map extension and a second map extension; the first map extension comprises a first subset of the multiple map entries that corresponds to a first subset of the multiple encrypted data blocks, and the first map extension is to be encrypted to generate a first encrypted map extension; the second map extension comprises a second subset of the multiple map entries that corresponds to a second subset of the multiple encrypted data blocks, and the second map extension is to be encrypted to generate a second encrypted map extension; the map base comprises multiple extension pointers; and the multiple extension pointers comprises at least a first extension pointer that points to a first location within the data file at which the first encrypted map extension is to be stored, and a second extension pointer that points to a second location within the data file at which the second encrypted map extension is to be stored. The method may further include: using, by the processor component, first map block encryption data to encrypt the first map extension to generate the first encrypted map extension; transmitting the first encrypted map extension to the one or more storage devices to be stored at the first location within the data file; storing the first map block encryption data within the second map extension; using, by the processor component, second map block encryption data to encrypt the second map extension to generate the second encrypted map extension after storage of the first map block encryption data within the second map block; transmitting the second encrypted map extension to the one or more storage devices to be stored at the second location within the data file; storing the second map block encryption data within the map base; using, by the processor component, third map block encryption data to encrypt the map base to generate an encrypted map base after storage of the second map block encryption data within the map base; and transmitting the encrypted map base to the one or more storage devices to be stored at a third location within the data file.

The method may include: comparing a size of the map data to a threshold map data size; and determining, by the processor component, whether to divide the map data into the map base and the multiple map extensions based on the comparison. The method may include, in response to a determination that the size of the map data exceeds the threshold map data size, performing operations including: determining, by the processor component, a quantity of the multiple map extensions based on a size of the map data; and generating the map extensions of the multiple map extensions to have exponentially increasing sizes. The third location within the data file at which the encrypted map base is to be stored comprises a predetermined location within the data file that follows a header of the data file from a starting end of the data file. The method may include: deriving the second location within the data file at which the second map extension is to be stored based on the third location and a size of the encrypted map base, wherein the second location follows the encrypted map base and precedes the second subset of the multiple encrypted data blocks; and deriving the first location within the data file at which the first map extension is to be stored based on the second location, a size of the second encrypted map extension and a total size of second subset of the multiple encrypted data blocks, wherein the second location follows the second subset of the multiple encrypted data blocks and precedes the first subset of the multiple encrypted data blocks.

The method may include: randomly generating a first salt value as part of the first map block encryption data; using, by the processor component, the first map block encryption data and a pass phrase to generate a first encryption cipher; using, by the processor component, the first encryption cipher and a size of the first map extension to encrypt the first map extension to generate the first encrypted map extension; randomly generating a second salt value as part of the second map block encryption data; using, by the processor component, the second map block encryption data and the pass phrase to generate a second encryption cipher; using, by the processor component, the second encryption cipher and a size of the second map extension to encrypt the second map extension to generate the second encrypted map extension; randomly generating a third salt value as part of the third map block encryption data; using, by the processor component, the third map block encryption data and the pass phrase to generate a third encryption cipher; and using, by the processor component, the third encryption cipher and a size of the map base to encrypt the map base to generate the encrypted map base, wherein the pass phrase is not to be transmitted to the one or more storage devices. The method may include: randomly generating a fourth salt value as part of a metadata block encryption data; using, by the processor component, the metadata block encryption data and the pass phrase to generate a fourth encryption cipher; using, by the processor component, the fourth encryption cipher and a size of metadata descriptive of an organization of data of the data set to encrypt the metadata to generate encrypted metadata; transmitting the encrypted metadata to the one or more storage devices to be stored at a fourth location within the data file; and storing the metadata block encryption data within the map base prior to encryption of the map base to generate the encrypted map base.

The method may include: performing an XOR operation with the third map block encryption data; and following the performance of the XOR operation, transmitting the third map block encryption data to the one or more storage devices to be stored at a predetermined location within the data file. The method may include: receiving, at a control device that comprises the processor component, the data block encryption data and the data block size for each encrypted data block of the multiple encrypted data blocks from multiple node devices; receiving, at the control device and from each node device of the multiple node devices, a request for a pointer to at location within the data file at which the node device is to store an encrypted data block of the multiple encrypted data blocks; and in response to each request for a pointer received from a node device of the multiple node devices, deriving the location within the data file at which the node device is to store the encrypted data block, and transmit, to node device, a pointer to the location within the data file. The method may include: receiving, at a control device that comprises the processor component, the data block encryption data and the data block size for each encrypted data block of the multiple encrypted data blocks from multiple node devices; receiving, at the control device and from each node device of the multiple node devices, at least one encrypted data block of the multiple encrypted data blocks to store an encrypted data block of the multiple encrypted data blocks; and in response to each receipt of at least one encrypted data block from a node device of the multiple node devices, deriving the location within the data file at which the control device is to store the at least one encrypted data block, and transmitting the at least one encrypted data block to the one or more storage devices to store within the data file at the location.

The method may include, at a time following storage of the data set as the multiple encrypted data blocks within the data file, performing operations including: retrieving the third map block encryption data from a predetermined location within the data file; retrieving the encrypted map base from the third location within the data file; using, by the processor component, the third map block encryption data and a pass phrase to generate a third decryption cipher; using, by the processor component, the third decryption cipher and a size of the encrypted map base to decrypt the encrypted map base to regenerate the map base; retrieving the second map block encryption data from the map base; retrieving the second encrypted map extension from the second location within the data file; using, by the processor component, the second map block encryption data and the pass phrase to generate a second decryption cipher; using, by the processor component, the second decryption cipher and a size of the second encrypted map extension to decrypt the second encrypted map extension to regenerate the second map extension; retrieving the first map block encryption data from the second map extension; retrieving the first encrypted map extension from the first location within the data file; using, by the processor component, the first map block encryption data and the pass phrase to generate a first decryption cipher; and using, by the processor component, the first decryption cipher and a size of the first encrypted map extension to decrypt the first encrypted map extension to regenerate the first map extension. The method may include: retrieving at least the first subset of the multiple map entries and the second subset of the multiple map entries; deriving, by the processor component, a distribution of the multiple encrypted data blocks among multiple node devices; and for each encrypted data block of the multiple encrypted data blocks, transmitting at least the corresponding data block encryption data to a node device of the multiple node devices to which the encrypted data block is assigned in the distribution to enable the node device to decrypt the encrypted data block.

An apparatus may include a processor component of a first node device and a storage to store instructions that, when executed by the processor component, cause the processor component to perform operations including receive, at the first node device of multiple node devices, an indication of a processing task to perform with a data set and metadata indicative of an organization of data within the data set, wherein: the data set is stored within a data file as multiple encrypted data blocks; and each encrypted data block is generated by encryption of at least one data set portion of the data set using corresponding data block encryption data separately generated for each encrypted data block. The processor component may be further caused to: receive, at the first node device, data block encryption data and an indication of a size of an encrypted data block of the multiple encrypted data blocks that is distributed to the first node device for decryption; and analyze the metadata to determine whether the data of the data set is partitioned data. In response to an indication in the metadata that the data of the data set is partitioned data, wherein the data within the data set is organized into multiple partitions that are each distributable to a single node device, the processor component may be further caused to perform operations including: receive, at the first node device, an indication of a quantity of one or more data sub-blocks within the encrypted data block, and for each data sub-block of the encrypted data block, a sub-block size and a hashed identifier of the data sub-block, wherein each data sub-block of the encrypted data block corresponds to a data set portion of the data set, and each data set portion comprises data of a partition of the multiple partitions that is identified by the corresponding hashed identifier; use the data block encryption data to decrypt the encrypted data block to regenerate one or more data set portions from the one or more data sub-blocks of the encrypted data block; analyze the hashed identifier of each data sub-block of the encrypted data block to determine whether all of the one or more data set portions are distributed to the first node device for processing to perform the processing task; and in response to a determination that at least one data set portion of the one or more data set portions is to be distributed to a second node device of the multiple node devices for processing, the processor component is caused to perform operations including transmit, from the first node device, the at least one data set portion to the second node device, and perform the processing task with any data set portion of the one or more data set portions that are distributed to the first node device for processing.

In response to a determination that all of the one or more data set portions are to be distributed to the first node device for processing, the processor component maybe caused to perform the processing task with all of the one or more data set portions. In response to a lack of indication in the metadata that the data of the data set is partitioned data, wherein the encrypted data block comprises a single encrypted data set portion of the data set, the processor may be caused to perform operations including: use the data block encryption data to decrypt the encrypted data block to regenerate the single data set portion; and perform the processing task with the single data set portion.

The multiple node devices may be able to exchange encrypted data blocks with one or more storage devices that store the data file, and the processor component may be caused to perform operations including: receive, at the first node device, a pointer to a location within the data file at which the encrypted data block is stored; transmit an instruction to the one or more storage devices to provide the encrypted data block from the location specified by the pointer; and receive, at the first node device, the encrypted data block from the one or more storage devices. The multiple node devices may be unable to exchange encrypted data blocks with one or more storage devices that store the data file, and the processor component may be caused to receive the encrypted data block from a control device along with the data block encryption data and the indication of the size of the encrypted data block.

The data block encryption data may include a salt value previously randomly generated and used to encrypt one or more data set portions of the data set as one or more corresponding data sub-blocks to generate the encrypted data block. The processor component may be caused to perform operations including: receive, at the first node device, a pass phrase, wherein the pass phrase is to be used by the multiple node devices to decrypt the multiple encrypted data blocks, and is not to be stored with the data file; use, by the processor component, the salt value and the pass phrase to generate a decryption cipher; and use, by the processor component, the decryption cipher and the size of the encrypted data block to decrypt the encrypted data block.

The processor component may include multiple processor cores; and in response to an indication in the metadata that the data of the data set is partitioned data, the processor component may be caused to perform the processing task with each data set portion of the one or more data set portions using a separate one of the multiple processor cores at least partially in parallel. The processor component comprises multiple processor cores; and the processor component may be caused to decrypt each encrypted data block of a subset of the multiple encrypted data blocks using a separate one of the multiple processor cores at least partially in parallel.

A third node device of the multiple node devices may decrypt another encrypted data block comprising a data sub-block that corresponds to another data set portion of the data set that is assigned to be processed by the first node device; and the processor component may be caused to receive, at the first node device, the other data set portion from the third node device.

The first node device may include a controller to coordinate performances of decryption and the processing task among the multiple node devices. The controller may include a controller processor component and a controller storage to store controller instructions that, when executed by the controller processor component, cause the controller processor component to perform operations including analyze the metadata to determine whether the data of the data set is partitioned data, and in response to a determination that the data of the data set is partitioned data, the controller processor may be caused to perform operations including: derive, by the controller processor component, a distribution of the data sub-blocks within the multiple encrypted data blocks among the multiple node devices for purposes of processing to perform the processing task at least partially in parallel; derive, by the controller processor component, a distribution of the multiple encrypted data blocks among the multiple node devices for purposes of decryption of the multiple encrypted data blocks at least partially in parallel based at least partially on the distribution of the data sub-blocks; and for each encrypted data block of the multiple encrypted data blocks, transmit the corresponding data block encryption data to the node device to which the encrypted data block is to be distributed for decryption.

A computer-program product tangibly embodied in a non-transitory machine-readable storage medium, the computer-program product including instructions that may be operable to cause a processor component of a first node device to perform operations including receive, at the first node device of multiple node devices, an indication of a processing task to perform with a data set and metadata indicative of an organization of data within the data set, wherein: the data set is stored within a data file as multiple encrypted data blocks; and each encrypted data block is generated by encryption of at least one data set portion of the data set using corresponding data block encryption data separately generated for each encrypted data block. The processor component may be further caused to: receive, at the first node device, data block encryption data and an indication of a size of an encrypted data block of the multiple encrypted data blocks that is distributed to the first node device for decryption; and analyze the metadata to determine whether the data of the data set is partitioned data. In response to an indication in the metadata that the data of the data set is partitioned data, wherein the data within the data set is organized into multiple partitions that are each distributable to a single node device, the processor component may be further caused to perform operations including: receive, at the first node device, an indication of a quantity of one or more data sub-blocks within the encrypted data block, and for each data sub-block of the encrypted data block, a sub-block size and a hashed identifier of the data sub-block, wherein each data sub-block of the encrypted data block corresponds to a data set portion of the data set, and each data set portion comprises data of a partition of the multiple partitions that is identified by the corresponding hashed identifier; use the data block encryption data to decrypt the encrypted data block to regenerate one or more data set portions from the one or more data sub-blocks of the encrypted data block; analyze the hashed identifier of each data sub-block of the encrypted data block to determine whether all of the one or more data set portions are distributed to the first node device for processing to perform the processing task; and in response to a determination that at least one data set portion of the one or more data set portions is to be distributed to a second node device of the multiple node devices for processing, the processor component is caused to perform operations including transmit, from the first node device, the at least one data set portion to the second node device, and perform the processing task with any data set portion of the one or more data set portions that are distributed to the first node device for processing.

In response to a determination that all of the one or more data set portions are to be distributed to the first node device for processing, the processor component may be caused to perform the processing task with all of the one or more data set portions. In response to a lack of indication in the metadata that the data of the data set is partitioned data, wherein the encrypted data block comprises a single encrypted data set portion of the data set, the processor may be caused to perform operations including: use the data block encryption data to decrypt the encrypted data block to regenerate the single data set portion; and perform the processing task with the single data set portion.

The multiple node devices may be able to exchange encrypted data blocks with one or more storage devices that store the data file, and the processor component may be caused to perform operations including: receive, at the first node device, a pointer to a location within the data file at which the encrypted data block is stored; transmit an instruction to the one or more storage devices to provide the encrypted data block from the location specified by the pointer; and receive, at the first node device, the encrypted data block from the one or more storage devices. The multiple node devices may be unable to exchange encrypted data blocks with one or more storage devices that store the data file, and the processor component may be caused to receive the encrypted data block from a control device along with the data block encryption data and the indication of the size of the encrypted data block.

The data block encryption data may include a salt value previously randomly generated and used to encrypt one or more data set portions of the data set as one or more corresponding data sub-blocks to generate the encrypted data block. The processor component may be caused to perform operations including: receive, at the first node device, a pass phrase, wherein the pass phrase is to be used by the multiple node devices to decrypt the multiple encrypted data blocks, and is not to be stored with the data file; use, by the processor component, the salt value and the pass phrase to generate a decryption cipher; and use, by the processor component, the decryption cipher and the size of the encrypted data block to decrypt the encrypted data block.

The processor component may include multiple processor cores; and in response to an indication in the metadata that the data of the data set is partitioned data, the processor component may be caused to perform the processing task with each data set portion of the one or more data set portions using a separate one of the multiple processor cores at least partially in parallel. The processor component may include multiple processor cores; and the processor component may be caused to decrypt each encrypted data block of a subset of the multiple encrypted data blocks using a separate one of the multiple processor cores at least partially in parallel.

A third node device of the multiple node devices may decrypt another encrypted data block comprising a data sub-block that corresponds to another data set portion of the data set that is assigned to be processed by the first node device; and the processor component may be caused to receive, at the first node device, the other data set portion from the third node device.

The first node device may include a controller to coordinate performances of decryption and the processing task among the multiple node devices. The controller may include a controller processor component and a controller storage to store controller instructions that, when executed by the controller processor component, cause the controller processor component to perform operations including analyze the metadata to determine whether the data of the data set is partitioned data, and in response to a determination that the data of the data set is partitioned data, the controller processor may be caused to perform operations including: derive, by the controller processor component, a distribution of the data sub-blocks within the multiple encrypted data blocks among the multiple node devices for purposes of processing to perform the processing task at least partially in parallel; derive, by the controller processor component, a distribution of the multiple encrypted data blocks among the multiple node devices for purposes of decryption of the multiple encrypted data blocks at least partially in parallel based at least partially on the distribution of the data sub-blocks; and for each encrypted data block of the multiple encrypted data blocks, transmit the corresponding data block encryption data to the node device to which the encrypted data block is to be distributed for decryption.

A computer-implemented method may include receiving, at a first node device of multiple node devices, an indication of a processing task to perform with a data set and metadata indicative of an organization of data within the data set, wherein: the data set is stored within a data file as multiple encrypted data blocks; and each encrypted data block is generated by encryption of at least one data set portion of the data set using corresponding data block encryption data separately generated for each encrypted data block. The method may further include: receiving, at the first node device, data block encryption data and an indication of a size of an encrypted data block of the multiple encrypted data blocks that is distributed to the first node device for decryption; and analyzing, by a processor component of the first node device, the metadata to determine whether the data of the data set is partitioned data. The method may further include, in response to an indication in the metadata that the data of the data set is partitioned data, wherein the data within the data set is organized into multiple partitions that are each distributable to a single node device, performing operations including: receiving, at the first node device, an indication of a quantity of one or more data sub-blocks within the encrypted data block, and for each data sub-block of the encrypted data block, a sub-block size and a hashed identifier of the data sub-block, wherein each data sub-block of the encrypted data block corresponds to a data set portion of the data set, and each data set portion comprises data of a partition of the multiple partitions that is identified by the corresponding hashed identifier; using, by the processor component, the data block encryption data to decrypt the encrypted data block to regenerate one or more data set portions from the one or more data sub-blocks of the encrypted data block; analyzing, by the processor component, the hashed identifier of each data sub-block of the encrypted data block to determine whether all of the one or more data set portions are distributed to the first node device for processing to perform the processing task; and in response to a determination that at least one data set portion of the one or more data set portions is to be distributed to a second node device of the multiple node devices for processing, performing operations including transmitting, from the first node device, the at least one data set portion to the second node device, and performing, by the processor component, the processing task with any data set portion of the one or more data set portions that are distributed to the first node device for processing.

The method may include, in response to a determination that all of the one or more data set portions are to be distributed to the first node device for processing, performing, by the processor component, the processing task with all of the one or more data set portions. The method may include, in response to a lack of indication in the metadata that the data of the data set is partitioned data, wherein the encrypted data block comprises a single encrypted data set portion of the data set, the performing operations include: using, by the processor component, the data block encryption data to decrypt the encrypted data block to regenerate the single data set portion; and performing, by the processor component, the processing task with the single data set portion.

The multiple node devices may be able to exchange encrypted data blocks with one or more storage devices that store the data file, and the method may include: receiving, at the first node device, a pointer to a location within the data file at which the encrypted data block is stored; transmitting, from the first node device, an instruction to the one or more storage devices to provide the encrypted data block from the location specified by the pointer; and receiving, at the first node device, the encrypted data block from the one or more storage devices. The multiple node devices may be unable to exchange encrypted data blocks with one or more storage devices that store the data file; and the method may include receiving, at the first node device, the encrypted data block from a control device along with the data block encryption data and the indication of the size of the encrypted data block.

The data block encryption data may include a salt value previously randomly generated and used to encrypt one or more data set portions of the data set as one or more corresponding data sub-blocks to generate the encrypted data block. The method may include: receiving, at the first node device, a pass phrase, wherein the pass phrase is to be used by the multiple node devices to decrypt the multiple encrypted data blocks, and is not to be stored with the data file; using, by the processor component, the salt value and the pass phrase to generate a decryption cipher; and using, by the processor component, the decryption cipher and the size of the encrypted data block to decrypt the encrypted data block.

The processor component may include multiple processor cores; and the method may include, in response to an indication in the metadata that the data of the data set is partitioned data, performing the processing task with each data set portion of the one or more data set portions using a separate one of the multiple processor cores at least partially in parallel. The processor component may include multiple processor cores; and the method may include decrypting each encrypted data block of a subset of the multiple encrypted data blocks using a separate one of the multiple processor cores at least partially in parallel.

A third node device of the multiple node devices may decrypt another encrypted data block comprising a data sub-block that corresponds to another data set portion of the data set that is assigned to be processed by the first node device; and the method may include receiving, at the first node device, the other data set portion from the third node device.

The first node device may include a controller to coordinate performances of decryption and the processing task among the multiple node devices. The method may include: analyzing, by a controller processor component of the controller, the metadata to determine whether the data of the data set is partitioned data, and in response to a determination that the data of the data set is partitioned data, performing operations including: deriving, by the controller processor component, a distribution of the data sub-blocks within the multiple encrypted data blocks among the multiple node devices for purposes of processing to perform the processing task at least partially in parallel; deriving, by the controller processor component, a distribution of the multiple encrypted data blocks among the multiple node devices for purposes of decryption of the multiple encrypted data blocks at least partially in parallel based at least partially on the distribution of the data sub-blocks; and for each encrypted data block of the multiple encrypted data blocks, transmitting the corresponding data block encryption data to the node device to which the encrypted data block is to be distributed for decryption.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 14A, 14B and 14C each illustrate an example embodiment of distribution of portions of a data set and corresponding encrypted data blocks thereof.

FIGS. 25A, 25B and 25C, together, illustrate an example embodiment of a logic flow of a control device retrieving encrypted data blocks of a data set.

DETAILED DESCRIPTION

Figure 1:
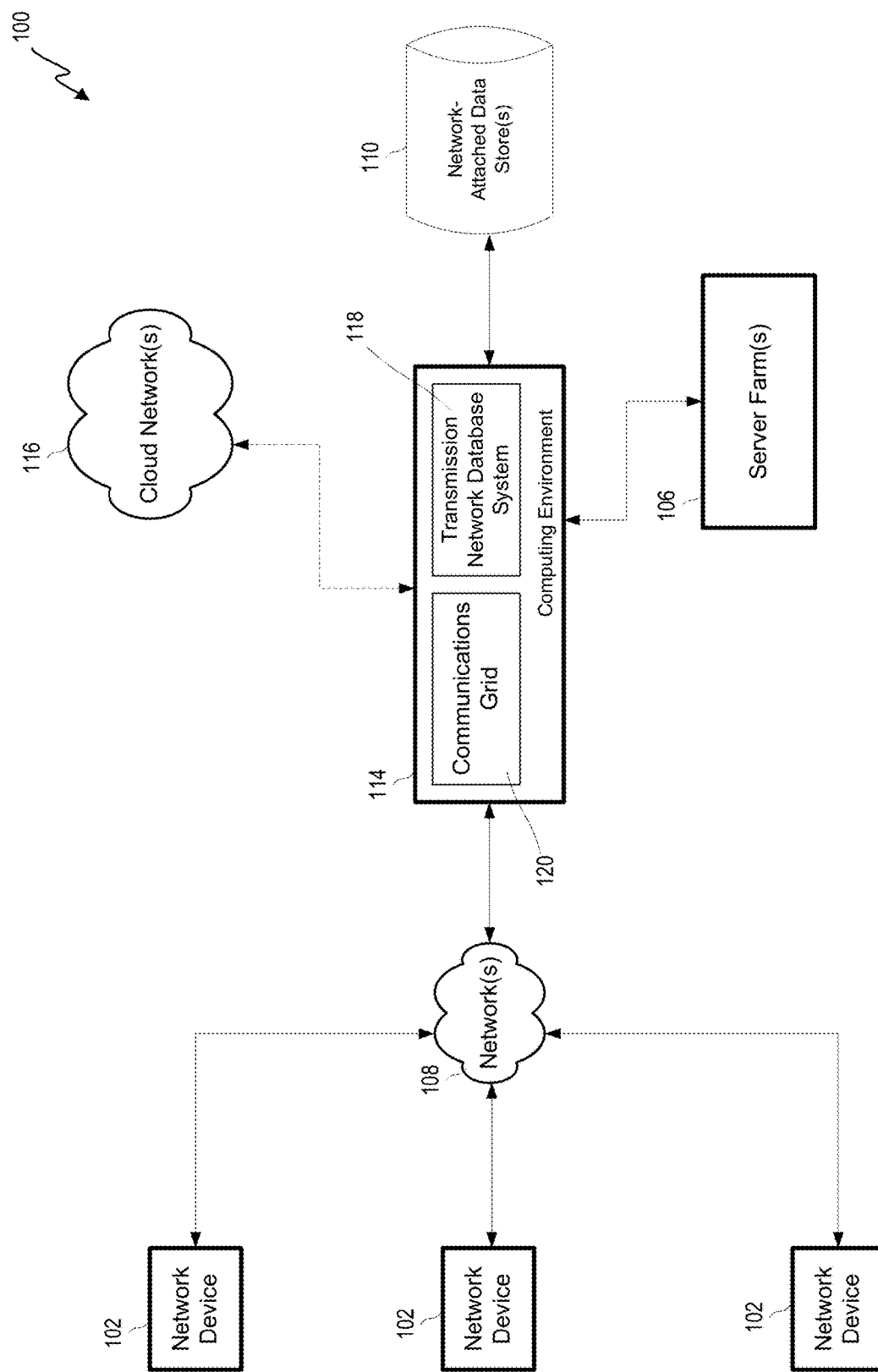
FIG. 1 illustrates a block diagram that provides an illustration of the hardware components of a computing system, according to some embodiments of the present technology.

Various embodiments described herein are generally directed to inter-device coordination and data set organization to improve distributed encryption and decryption of, as well as storage and retrieval of, a data set processed by multiple node devices. A data set may be stored within a single data file for relatively long term storage (also commonly referred to as "persisted") in a distributed manner among one or more storage devices. The data of the data set may be divided into multiple data blocks and/or data sub-blocks within the data file in a manner that correlates to the manner in which portions of the data set are distributed among multiple node devices during processing. Additionally, each data block and each block into which the map may be divided may be separately encrypted before storage within the data file. The data file may include a map of the manner in which the encrypted data blocks and/or data sub-blocks are organized within the single data file, including the quantity, size(s) and/or location(s) within the data file. The map may also include separate data block encryption data for later use in separately decrypting each encrypted data block, as well as including separate map block encryption data for later use in separately decrypting each block into which the map, itself, may be divided, encrypted and stored within the data file. Where the map is divided into multiple separately stored encrypted blocks, each block of the map (except the last one) may contain the map block encryption data needed to decrypt a next one of the blocks of the map, such that the first encrypted block of the map must be decrypted to obtain the map block encryption data needed to decrypted the next encrypted block of the map, and so on in a chain of nested encryption. Thus, decryption of a particular encrypted data block of the data set may necessitate the decryption of one or more encrypted blocks of the map to obtain the particular data block encryption data needed to decrypt the particular encrypted data block.

The one or more storage devices may employ any of a variety of file systems to store the data file, and the data file may include a file header providing indications of various characteristics of the data file relevant to that file system. It should be noted that the manner in which the data file is distributed among the one or more storage devices may be entirely unrelated to the manner in which the data of the data set is divided into data blocks. By way of example, the manner in which the data of the data set is divided into data blocks advantageously does not affect or preclude the distribution of the data file among multiple storage devices configured to cooperate to form a redundant array of inexpensive disks (RAID) array to provide protection against loss of the data file and/or to provide faster access to the data file.

The data within the data set may be organized in any of a variety of ways (e.g., rows and columns, columnar, one or more hypercubes, linked list, tree, graph, etc.) with any of a variety of indexing mechanisms that may employ any of a variety of labeling schemes. To enable access to and use of the data, the data set may include metadata that is descriptive of such aspects of the manner in which the data of the data set is so organized. In some embodiments, the data within the data set may be organized into multiple partitions in which the data within each partition is required be processed all together as a single atomic unit. Therefore, if the data set is partitioned, the data blocks, and the one or more data sub-blocks into which each data block may be divided, may be at least partially defined by the manner in which data is organized into partitions. As will be explained in greater detail, the manner in which the data set is encrypted, stored, retrieved and/or decrypted may be at least partially dependent on whether the data of the data set is partitioned. The metadata and/or the map may include an indication of whether the data of the data set is partitioned, and if so, the metadata may describe various aspects of the partitioning. Partitioning of the data within a data set may aid in simplifying and/or optimizing the processing of the data set in a distributed multi-node computational environment, by serving as a mechanism by which logically-related data of the data set are physically grouped together for processing on the same node device. Co-locating all data of a partition on the same node device may eliminate the need for time-consuming and/or resource-consuming inter-node data shuffling as computations are done on the partition data as a whole within a single node device. Furthermore, a straight-forward scheme that may be used to locate the specific node device containing the partition which will be explained in greater detail herein.

In embodiments in which a grid of multiple node devices are employed to process the data set, and in which each of the node devices is capable of directly exchanging data with storage devices, the actions taken by each of the multiple node devices to store and retrieve data of the data set may be coordinated by a control device. In some embodiments, the control device may be separate and distinct from all of the node devices. In other embodiments, such a coordinating function of the control device may be performed by one of the multiple node devices (e.g., on a separate execution thread, by a separate processor core, within a separate virtual machine, etc.). Thus, in storing or retrieving the data set, the control device and each node device of the multiple node devices may directly access the single data file in which the data set is stored. More specifically, the control device may directly store or retrieve the encrypted forms of the metadata and the map, while each of the node devices may directly store or retrieve one or more different encrypted data blocks. At least the accesses made by the node devices to store or retrieve encrypted data blocks may be performed at least partially in parallel. The control device may provide each of the node devices with one or more pointers to locations within the data file at which the different encrypted data blocks may be stored or retrieved in the form of offsets relative to a designated starting location of the data file (e.g., offsets from the first byte of the data file or from the first byte of a payload portion of the data file). Through such use of pointers, the need for coordination between the node devices and the control device is greatly minimized Each of the node devices is thereby able to separately act to store and retrieve one or more encrypted data blocks without the need to synchronize the timing of such actions with other node devices and/or with the control device. In some embodiments, the control device may store or retrieve encrypted forms of the metadata and/or the map at least partially in parallel with the storage or retrieval, respectively, of encrypted data blocks performed by one or more of the multiple node devices.

In other embodiments that also include the grid of multiple node devices to process the data set, but in which the node devices are not capable of directly exchanging data with the storage devices (or are not permitted to do so), the storage and retrieval of the data of the data set may be performed through the control device. Stated differently, the data of the data set may be relayed between the multiple node devices and the storage devices through the control device.

Regardless of whether the storage and/or retrieval of encrypted data blocks is performed directly by the node devices or relayed through a control device, the encryption of data blocks for storage and/or the decryption of retrieved data blocks may also be performed in a distributed manner by the node devices. More specifically, as part of encrypting data blocks for storage, the node devices may provide separate data block encryption data for each data block to the control device for inclusion by the control device in the map. Correspondingly, as part of retrieving data blocks from storage, the control device may provide the separate data block encryption data for each data block that is retrieved by the control device from the map to the node devices to enable the decryption of data blocks by the node devices.

Still other embodiments may not include a grid of node devices, and instead, may include just the control device to process the data set, as well as to directly exchange data with the storage devices to directly perform storage and retrieval of the data set. In such embodiments, it may the control device that encrypts all of the data blocks in preparation for the control device storing all of the data blocks. Correspondingly, in such embodiments, following retrieval of the all of the data blocks from storage by the control device, it may be the control device that decrypts all of the retrieved data blocks.

In embodiments in which the data of the data set is not partitioned, the map may include indications of the size of each encrypted data block and/or how many encrypted data blocks are used to store the data of the data set, as well as data block encryption data for each encrypted data block. To reduce storage requirements for the map, itself, the map may include a table or similar data structure of multiple entries in which each entry may correspond to a single encrypted data block and include a data block size and data block encryption data for its corresponding encrypted data block. In embodiments in which the data of the data set is partitioned, each entry may additionally indicate a size and a hashed identifier for each of the one or more data sub-blocks within each encrypted data block. As will be explained in greater detail, each partition may have a unique partition label that may be described in the metadata and/or may be included with the data belonging to that partition, and a hash may be taken of each such partition label to generate a corresponding hashed identifier. Whether the map is stored within a single block at a single location in the data file or in multiple blocks distributed across multiple locations within the data file may depend on the storage requirements of the map, which may depend on the total quantity and size of entries required for all of the encrypted data blocks.

In storing the data set within the data file in embodiments in which there are multiple node devices that are capable of directly exchanging data with storage devices (and are permitted to do so), and in which the data of the data set is not partitioned, each of the node devices may independently encrypt the one or more data blocks that it has in preparation for storage. Also, for each encrypted data block that a node device is to store, the node device may transmit a request to the control device for a pointer to a location within the data file at which to store that encrypted data block. Each such request may include an indication of the size of the encrypted data block that the requesting node device is to store and the data block encryption data generated and used by the requesting node in encrypting the data block. The specification of the size of the encrypted data block to be stored in each request enables the control device to derive the location within the data file to specify in the next pointer that the control device provides in response to the next request for a pointer from another node device. The control device may generate a map entry in the map for each encrypted data block for which a pointer is requested, and may store the specified size and data block encryption data for that encrypted data block in that map entry.

Each node device that so requests a pointer, upon being provided with the requested pointer, may employ the pointer to, itself, store the data block for which the pointer was requested in its encrypted form and at the location pointed to by the pointer in the data file. Such requesting and provision of pointers at which to store encrypted data blocks within the data file may continue until there are no more encrypted data blocks of the data set to be stored by any of the node devices for which a pointer has not been requested. In some embodiments, each of the node devices may transmit an indication to the control device of having no more encrypted data blocks of the data set to request pointers for. However, in other embodiments in which each of the node devices is required to request only a single pointer for all data that is to be stored by that node device (and as a single encrypted data block), the control device may determine whether there are more encrypted data blocks for which pointers remain to be requested based on whether or not requests for pointers have been received from all of the node devices involved in processing the data set. In such other embodiments, a request for a single pointer for the storage of more than one encrypted data block by a node device may include a separate indication of size and/or separate data block encryption data for each of the more than one encrypted data blocks.

In some embodiments, the control device may store encrypted forms of the map and/or the metadata of the data set within the data file in response to there being no more encrypted data blocks of the data set for which pointers need to be requested, and regardless of whether any or all of the encrypted data blocks have yet been stored. Encryption of the map, in addition to the data itself, may be deemed desirable to avoid providing clues as to the manner in which the data is organized as encrypted data blocks within the data file, which may aid in efforts to defeat the encryption of the data. Encryption of the metadata, in addition to the data itself, may be deemed desirable as the metadata may include indications of headings for rows, columns, etc., and/or may include indications of an indexing scheme by which the data is meant to be accessed (in its unencrypted form), which may aid in efforts to defeat the encryption of the data and/or may provide clues as to the content of the data. Thus, in such embodiments, the encryption and storage of the map and/or the metadata by the control device is thereby not dependent upon, and need not be synchronized with, the storage of any of the encrypted data blocks performed by the node devices. However, in other embodiments, the control device may delay encryption and/or storage of the map and/or metadata of the data set within the data file until indications have been received by the control device from all of the node devices that all of the encrypted data blocks have been successfully stored. This may be deemed desirable as a measure to address errors in transmission of one or more encrypted data blocks to the one or more storage devices via a network and/or errors in storage of one or more encrypted data blocks by the one or more storage devices.

Regardless of when the control device stores the encrypted forms of the map and/or the metadata within the data file, the control device may first generate those encrypted forms by encrypting each block of the map using separate map block encryption data generated by the control device for each block of the map, and by encrypting the metadata using metadata block encryption data generated by the control device for the metadata. The control device may store the metadata block encryption data employed in encrypting the metadata within the first or only block of the map prior to the encryption of that block of the map. The control device may also store the map block encryption data employed in encrypting the first or only block of the map in unencrypted form within the data file at a predetermined offset from the start of the data file. Alternatively, the map block encryption data for the first or only block of the map may be subjected to an XOR operation to prior to being stored at the predetermined offset to provide at least the appearance of being part of the encrypted data within the data file, thereby effectively hiding it in plain sight to some extent within the data file. As previously discussed, where the map is divided into more than one block for storage within the data file, the map block encryption data used in encrypting each block of the map (except the first such block) may be stored within the preceding block of the map so as to be encrypted along with the portion of the map that is within the preceding block.

Any of a variety of types of encryption may be used by the control device to separately encrypt each block of the metadata and/or the map in preparation for storage. Also, any of a variety of types of encryption may be used by the control device and/or by the node devices (if present) to separately encrypt each data block of the data set for storage. As part of such separate encryption of a block of metadata, a block of the map or a data block, a different set of encryption data is used in which one or more pieces of encryption information may be deliberately different for each block that is encrypted. By way of example, while a single pass phrase may be used for the encryption of every block of metadata, every block of the map and every data block, a separate salt value may be randomly generated for each such block. Also, while the pass phrase may never be stored with or within the data file, the salt value generated for use in separately encrypting each block of the metadata, each block of the map and each data block may be stored within the data file as part of a corresponding piece of block encryption data to enable subsequent decryption of each such block following retrieval thereof. Other aspects of the encryption and decryption of each block will be explained in greater detail.

In embodiments in which the data of the data set is not partitioned, the lack of a requirement to keep any two or more specific portions of the data of the data set together for processing may result in the manner in which the data of the data set is divided into the encrypted data blocks being based solely on the manner in which the data of the data set was distributed among the multiple node devices at the time the data set was generated and/or most recently stored. More specifically, each encrypted data block stored within the data file is stored therein by only one node device such that no encrypted data block within the data file includes data stored therein by more than one node device. However, in some embodiments, a single node device may store more than one encrypted data block within the data file such that a single node may request more than one pointer from the control device. In some embodiments, this may arise as a result of a distribution of data and/or of processing of the data among multiple execution threads, multiple virtual machines and/or multiple processor cores within a single node device. Thus, for each portion of the data set within a single node device that has been fully processed within and/or by a separate corresponding execution thread, virtual machine and/or processor core, the node device may make a separate request for a separate pointer to a location within the data file at which a separate corresponding encrypted data block is to be stored. Alternatively, a single request for a single pointer at which to contiguously store all of the encrypted data blocks associated with a single node device may be requested, and the request may specify a size that is the sum of the sizes of all of those encrypted data blocks. This may be the case in embodiments in which each node device is required to make only one request for a pointer. However, as an alternative to such a single request specifying a single size that is the sum of the sizes of all of the encrypted data blocks to be stored by a node device, the request alternatively may include specifications of a separate size for each encrypted data block. Further, in addition to specifying a separate size for each of the encrypted data blocks, such a single request may also include separate data block encryption data for each of the encrypted data blocks.

In retrieving the data set from the data file in embodiments in which there are multiple node devices that are capable of directly exchanging data with storage devices (and are permitted to do so), and in which the data of the data set is not partitioned, the control device may retrieve indications of which node devices are available to perform processing with the data set. In some embodiments, the quantity of node devices that are available may vary with time based on any of a variety of factors, including demands for the processing resources of each of the node devices to perform other processing tasks (e.g., processing tasks having no connection to any processing of the data set), user sessions that indicate a specific node device count based on policy, known performance characteristics, service-level agreements, etc., instances of node devices having malfunctioned or being taken out of service for other reasons, etc. The control device may access the data file to retrieve encrypted forms of the map and/or the metadata of the data set, and may relay an indication of a task to be performed and/or the metadata to each of the available ones of the multiple node devices. In so doing, the control device may retrieve corresponding pieces of block encryption data needed to decrypt the first or only block of the map from a pre-selected location within the data file. The control device may then use such retrieved pieces of block encryption data to decrypt the first or only block of the map. In decrypting each of the one or more blocks of the map, the control device may retrieve the map block encryption data for each map block therefrom. Also, in decrypting the first or only block of the map, the control device may retrieve the metadata block encryption data therefrom. Following and/or during such decryption, the control device may then employ the information concerning each encrypted data block within the map to derive a distribution of the encrypted data blocks among the available node devices. The control device may employ any of a variety of techniques to derive a distribution of the encrypted data blocks among the available ones of the node devices, from simpler round robin techniques to any of a variety of data size balancing techniques.

In effecting this distribution of the encrypted data blocks, for each encrypted data block that the control device assigns to a node device, the control device may transmit a pointer to the location of the encrypted data block within the data file to the node device, along with an indication of the size of the encrypted data block and the data block encryption data needed to decrypt the data block. For each such combination of pointer, size and data block encryption data received by a node device, the node device may employ the pointer to access and retrieve the corresponding encrypted data block from within the data file, starting at the location pointed to by the pointer and ceasing when the amount of data of the encrypted data block indicated by the size has been retrieved. In some embodiments, each node device may transmit an indication to the control device of having completed each such retrieval of an encrypted data block. As each node device to which the retrieval of one or more encrypted data blocks has been assigned completes the retrieval of the assigned one or more encrypted data blocks, the node device may begin the separate decryption of each such retrieved encrypted data block, and may then begin performing the assigned processing tasks therewith. Again, through such use of pointers, the need for coordination among the node devices and/or between the node devices and the control device is greatly minimized. More specifically, there may be no synchronization of when each node begins performing processing tasks with the data of the one or more encrypted data blocks assigned to it, such that each node may immediately begin such processing upon retrieving and decrypting at least a portion of at least one encrypted data block. Also again, through such distribution of data block encryption data to the node devices, the performance of the decryption of the encrypted data blocks is able be performed in a distributed manner and at least partially in parallel by the node devices.

Again, in other embodiments that also include the grid of multiple node devices to process the data set, but in which the node devices are not capable of directly exchanging data with the storage devices (or are not permitted to), the retrieval of the data set may entail relaying the encrypted data blocks between the storage devices and the node devices through the control device. Also again, still other embodiments are possible that may not include a grid of node devices, and instead, may include just the control device to process the data set, as well as to directly exchange data with the storage devices to directly retrieve the data set. In such embodiments, it may the control device that decrypts all of the retrieved encrypted data blocks.

Various aspects of storing the data set within the data file in embodiments in which the data of the data set is partitioned may differ from storing the data set in embodiments in which the data of the data set is not partitioned. Each of the node devices may transmit a request to the control device for a pointer to a location within the data file at which to store a single encrypted data block that includes one or more data sub-blocks. Each such request may include a data structure providing indications of the quantity of data sub-blocks, the size of each data sub-block and/or the hashed identifier of each data sub-block. Each such request may also include the data block encryption data used by the node device in encrypting the encrypted data block. The specifications of the quantity of data sub-blocks within each encrypted data block and the size of each data sub-block enables the control device to derive the location within the data file to specify in the next pointer that the control device provides in response to the next request for a pointer from this same node device or another node device. The control device may also employ such information, as well as the hashed identifiers and the data block encryption data, in adding an entry for the encrypted data block that includes indications of the one or more data sub-blocks therein.

Each node device that so requests a pointer, upon being provided with the requested pointer, may employ the pointer to, itself, store the encrypted data block for which the pointer was requested at the location pointed to by the pointer in the data file. As each node device receives a pointer for every encrypted data block that it is to store, each node device may transmit an indication to the control device of having no more encrypted data blocks to request pointers for. However, as previously discussed, in embodiments in which each of the node devices is required to request only a single pointer for all data that is to be stored by that node device, the control device may determine whether there are more encrypted data blocks for which pointers remain to be requested based on whether or not requests for pointers have been received from all of the node devices involved in processing the data set.

In response to there being no more encrypted data blocks of the data set for which any of the node devices need to be provided with a pointer, the control device may proceed with storing encrypted forms of the map, the metadata of the data set and/or a data header within the data file without regard as to whether any or all of the encrypted data blocks have yet been stored. Alternatively, it may be deemed desirable for the control device to delay storage of the encrypted forms of the map, the metadata and/or the data header as a measure to address errors in transmission of one or more encrypted data blocks to the one or more storage devices via a network and/or errors in storage of one or more encrypted data blocks by the one or more storage devices. The data header may include an indication of how many node devices were involved in generating the data set and/or in storing the data set following its generation.

Regardless of when the control device stores encrypted forms of the map and/or the metadata within the data file, the control device may first generate those encrypted forms by encrypting each block of the map using separate map block encryption data generated by the control device for each block of the map, and by encrypting the metadata using metadata block encryption data generated by the control device for the metadata. The control device may store the metadata block encryption data within the first or only block of the map, and may store the map block encryption data employed in encrypting the first or only block of the map within the data file at one or more predetermined offsets from the start of the data file. The map block encryption data employed in encrypting the first or only block of the map may first be subjected to an XOR operation to provide at least the appearance of being part of the encrypted data within the data file, thereby effectively hiding it in plain sight to some extent within the data file. As previously discussed, where the map is divided into more than one block within the data file, the map block encryption data used in encrypting each (except the first such block) may be stored within the preceding block so as to be encrypted along with the portion of the map that is within the preceding block.

As previously discussed, in embodiments that include the grid of node devices and in which the data of the data set is partitioned, all of the data within each partition may be required to be processed together within a single node device, and not distributed among multiple node devices.

However, a single node device may perform processing operations involving the data of more than one partition. As also previously discussed, all of the data within each partition must be stored together within a single encrypted data block within the data file, and not distributed among multiple encrypted data blocks within the data file. However, within each encrypted data block, the data of a single partition may be divided into multiple data sub-blocks, and a single encrypted data block may include data sub-blocks of the data of more than one partition. The hashed identifiers associated with each data sub-block by the map may be employed by the control device to distinguish between the multiple partitions to which the data within each data sub-block belongs.

Various aspects of retrieving the data set from the data file in embodiments in which the data of the data set is partitioned may differ from retrieving the data set in embodiments in which the data of the data set is not partitioned. The control device may retrieve indications of which node devices are available to perform processing on the data set. Again, in some embodiments, the quantity of available node devices may vary over time. The control device may access the data file to retrieve encrypted forms of the map, the metadata of the data set and/or the data header, and may relay an indication of a task to be performed and/or the metadata to each of the available ones of the multiple node devices. In so doing, the control device may retrieve the map block encryption data needed to decrypt the first or only block of the map at the pre-selected offset from the start of the data file. The control device may then use such retrieved map block encryption data to decrypt the at least the first or only block of the map. In decrypting each of the one or more blocks of the map, the control device may retrieve the map block encryption data for each data block therefrom. Also, in decrypting the first or only block of the map, the control device may retrieve the metadata block encryption data therefrom. Following and/or during such decryption, the control device may then employ a combination of the hashed identifiers associated with the data sub-blocks, the quantity of partitions into which the data set is divided, the quantity of node devices involved in generating and/or in most recently storing the data set within the data file, and the quantity of node devices that are currently available in deriving a distribution of the encrypted data blocks and/or data sub-blocks within the encrypted data blocks among the currently available node devices.

More specifically, the control device may compare the quantity of node devices involved in the most recent storage of the data set within the data file to the quantity of currently available node devices. If these two quantities of node devices match, then the control device may distribute the encrypted data blocks among the currently available node devices in a manner that recreates the distribution of partitions among node devices that existed at the time the data set was most recently stored within the data file. To effect this distribution of partitions among the currently available node devices, the control device may provide each currently available node device with at least one pointer to a location within the data file from which the node device may retrieve an encrypted data block, along with an indication of the size of the encrypted data block and the data block encryption data needed to decrypt the encrypted data block. Thus, distribution of the pointers, and accordingly, of the data of the data set, is based on the encrypted data blocks within the data file, thereby avoiding the time and/or data transmission overhead of distributing what may be a considerably greater quantity of pointers to individual data sub-blocks.

However, if the quantity of node devices involved in at least storing the data set within the data file does not match the quantity of currently available node devices, then the control device may derive a distribution of the data sub-blocks among the currently available node devices using any of a variety of techniques, while ensuring that there are no instances in which the data of any partition is distributed among multiple node devices. In so doing, the control device may employ the hashed identifier associated by the map with each individual data sub-block. By way of example, the control device may divide each of the hashed identifiers by the quantity of currently available node devices to derive the modulo value from each such division. The control device may then employ the modulo value as the indicator of which node device to distribute each data sub-block to, and thereby determine which node device to distribute the entirety of each partition to.

However, as previously discussed, while the map may include separate indications of a size and a hashed identifier for each data sub-block in embodiments in which the data set is partitioned, the fact that encryption is performed per data block, and not per data sub-block, results in the need for each encrypted data block to be decrypted as a whole, such that separate decryption of each of the data sub-blocks that may make up any of the encrypted data blocks is not possible. In situations where the map indicates that all of the data sub-blocks within an encrypted data block share the same hashed identifier, and therefore all belong to the same partition, the entirety of such an encrypted data block is able to be distributed to a single node device. The control device may provide that single node device with a pointer to a location within the data file from which to retrieve the entirety of the encrypted data block, along with an indication of the sizes and hashed identifiers of all of the data sub-blocks therein and the data block encryption data for the encrypted data block. That single node device may then employ the pointer to access and retrieve the encrypted data block from within the data file, starting at the location pointed to by the pointer and ceasing when the amount of data of the encrypted data block retrieved by that single node device matches the size of the encrypted data block. That single node device may then employ the data block encryption data to decrypt the entirety of the encrypted data block.

However, in situations where the map indicates that a data block includes data sub-blocks that have different hashed identifiers such that different ones of the data sub-blocks belong to different partitions, and are therefore to be assigned to different node devices, the control device may make select one of those different node devices to be the one to perform the retrieval and/or decryption of the entirety of the encrypted data block. In some embodiments, such a selection may be based on the relative amounts of the data within the encrypted data block that are to be distributed to each of those different node devices for processing. Thus, the control device may select the one of those different node devices to which the largest portion of the data within the encrypted data block is to be distributed as the single node device to perform the decryption of the encrypted data block, and may therefore provide that single node device with a pointer to a location within the data file from which to retrieve the entirety of the encrypted data block, along with an indication of the sizes and hashed identifiers of all of the data sub-blocks therein and the data block encryption data for the encrypted data block. That single node device may employ the pointer to access and retrieve the encrypted data block from within the data file, starting at the location pointed to by the pointer and ceasing when the amount of data of the encrypted data block retrieved by that single node device matches the sum of the sizes of all of the data sub-blocks therein. That single node device may then employ the data block encryption data to decrypt the entirety of the encrypted data block. That single node device may then employ the hashed identifiers of the data sub-blocks to determine which data sub-block(s) are meant to be distributed to it, and which data sub-block(s) are meant to be distributed to other node device(s), and may relay the data sub-block(s) meant to be distributed to other node device(s) to those other node device(s).

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
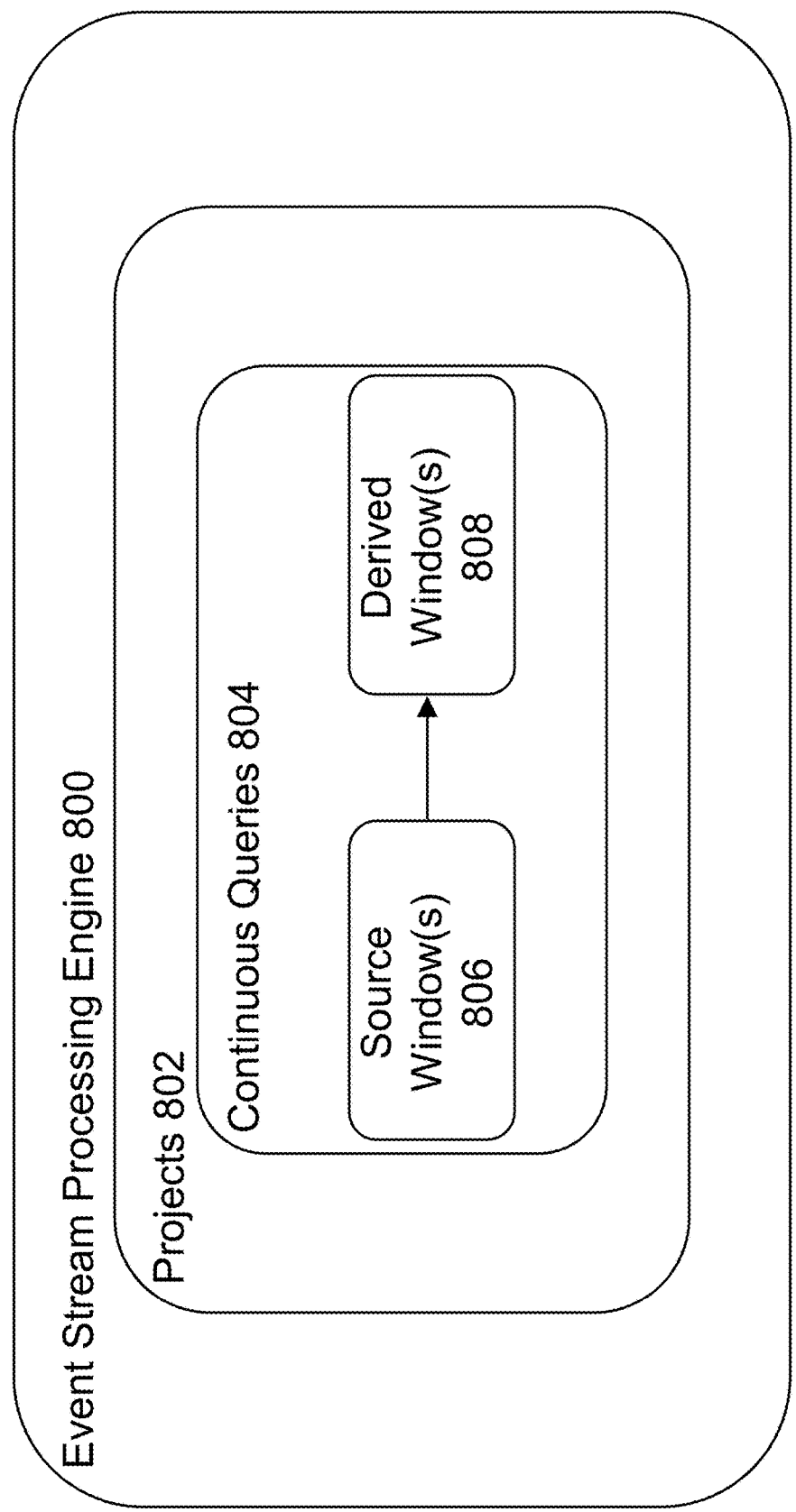
FIG. 8 illustrates a block diagram including components of an Event Stream Processing Engine (ESPE), according to embodiments of the present technology.
Figure 9:
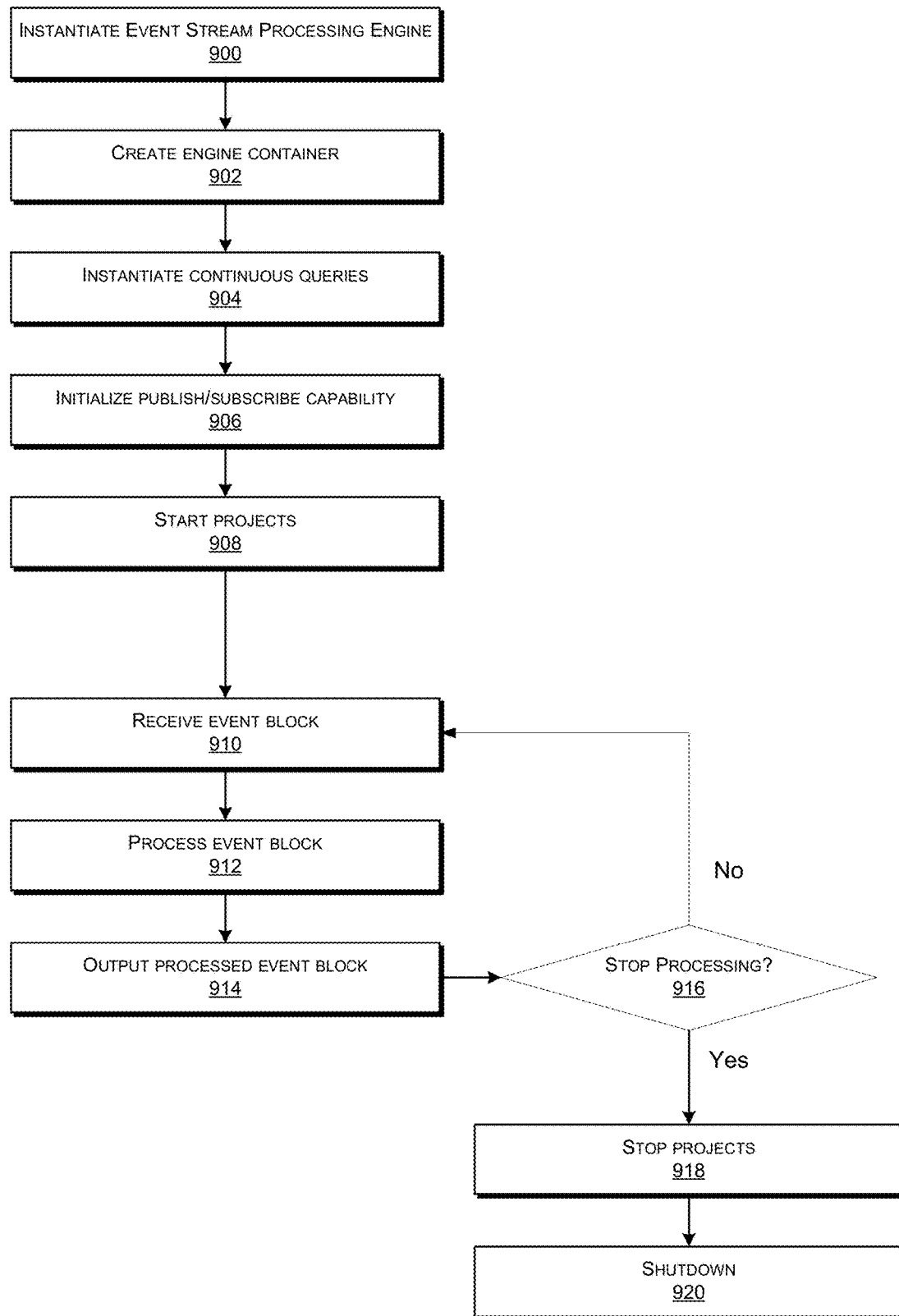
FIG. 9 illustrates a flow chart showing an example process including operations performed by an event stream processing engine, according to some embodiments of the present technology.
Figure 10:
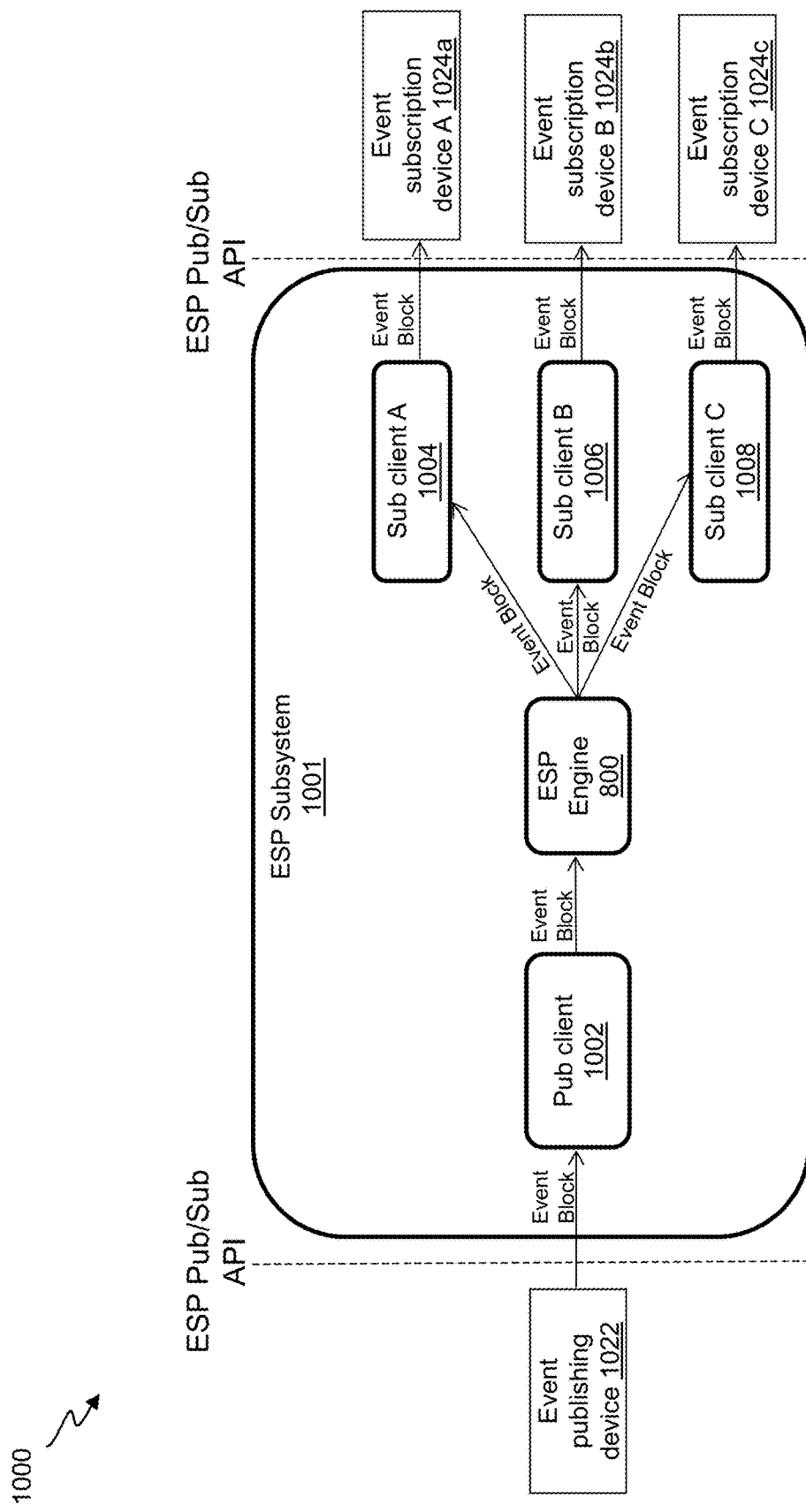
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
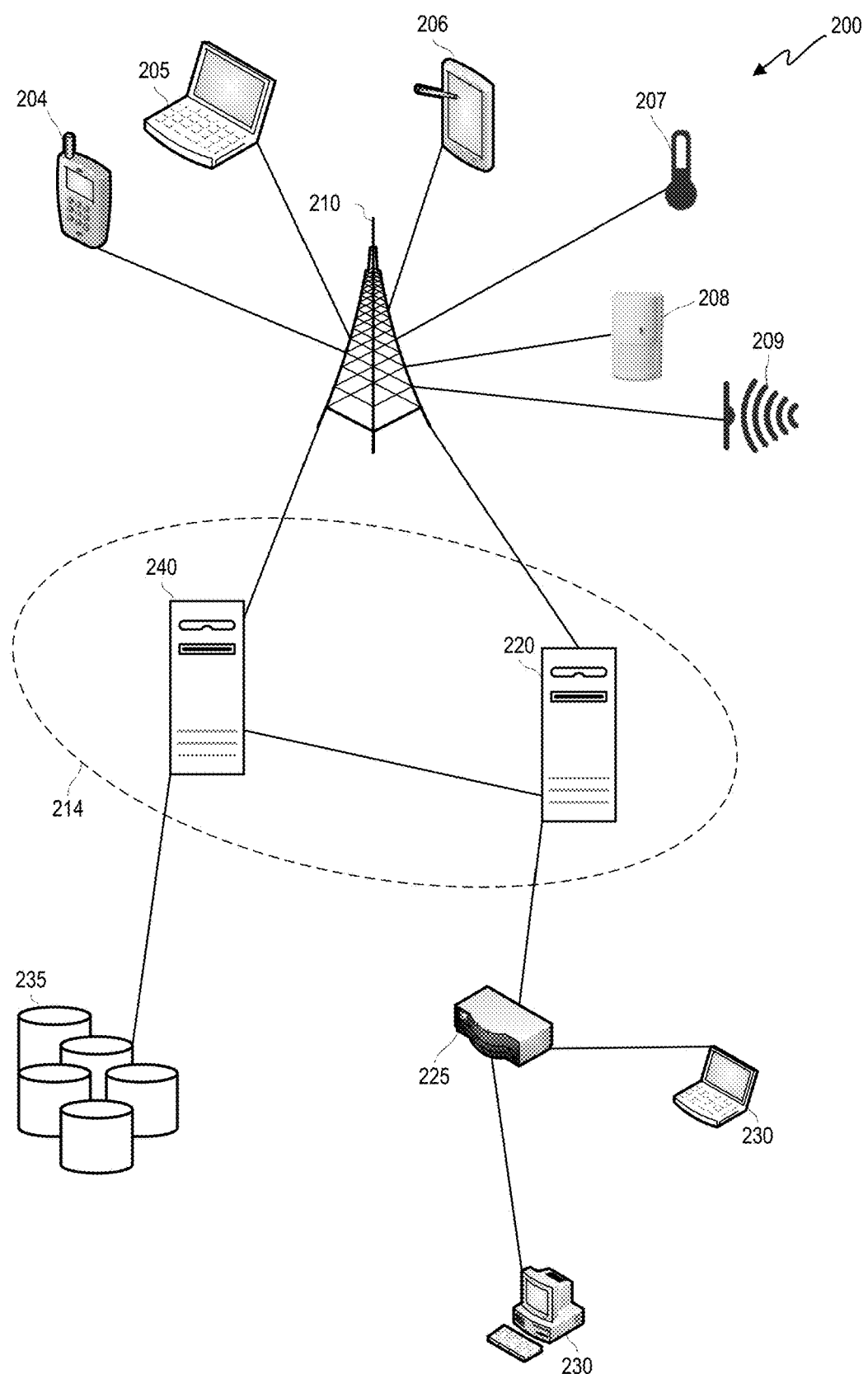
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
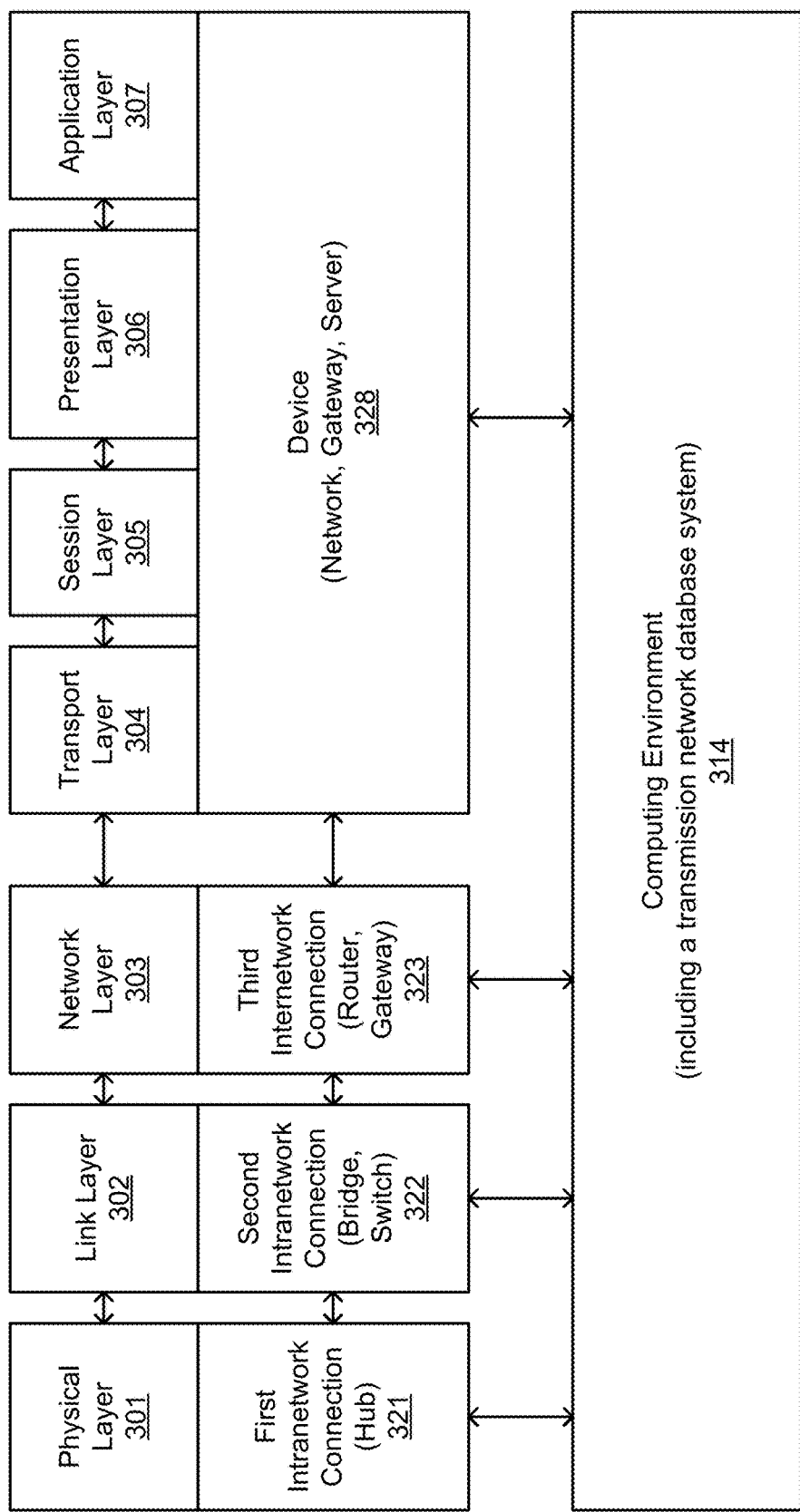
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
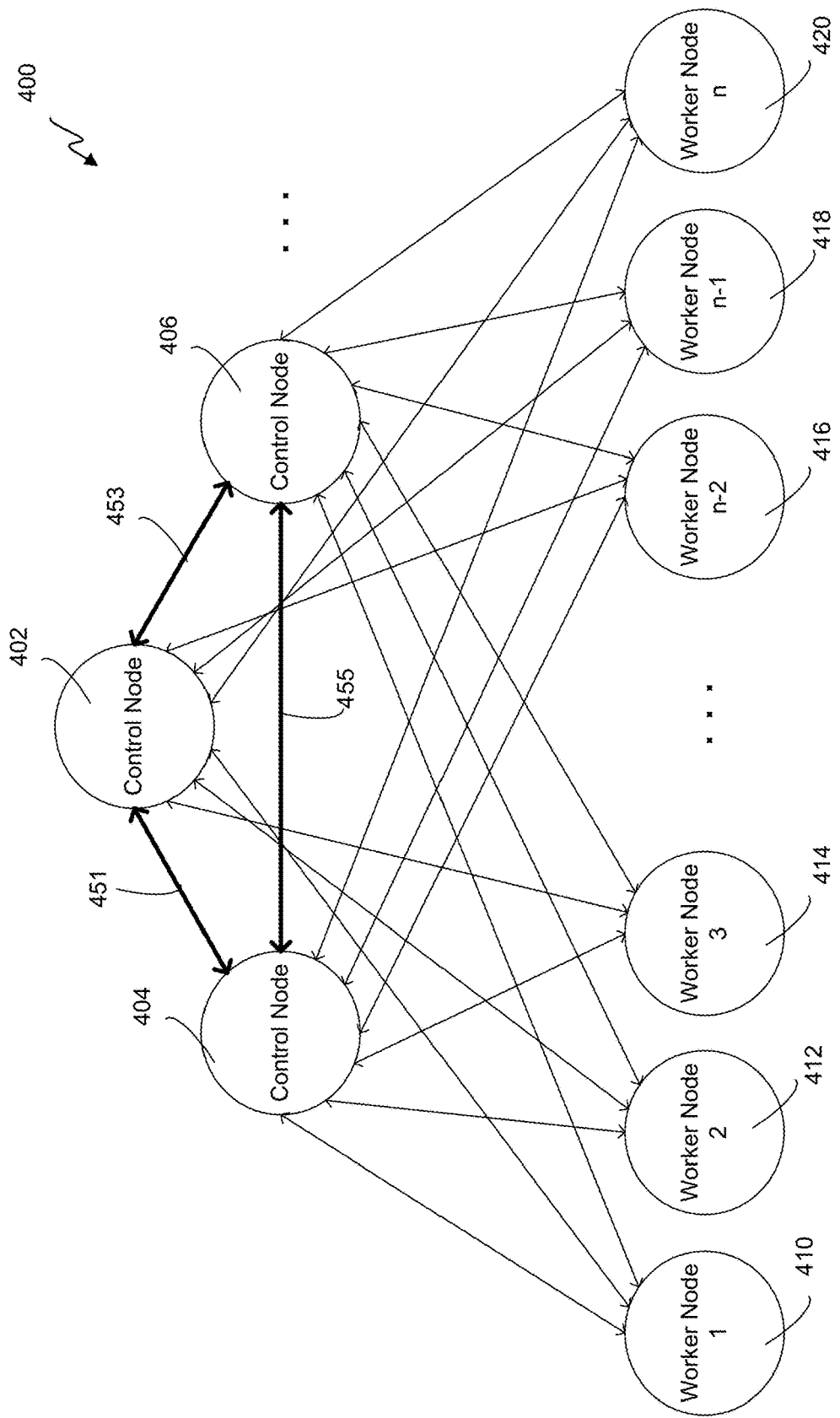
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
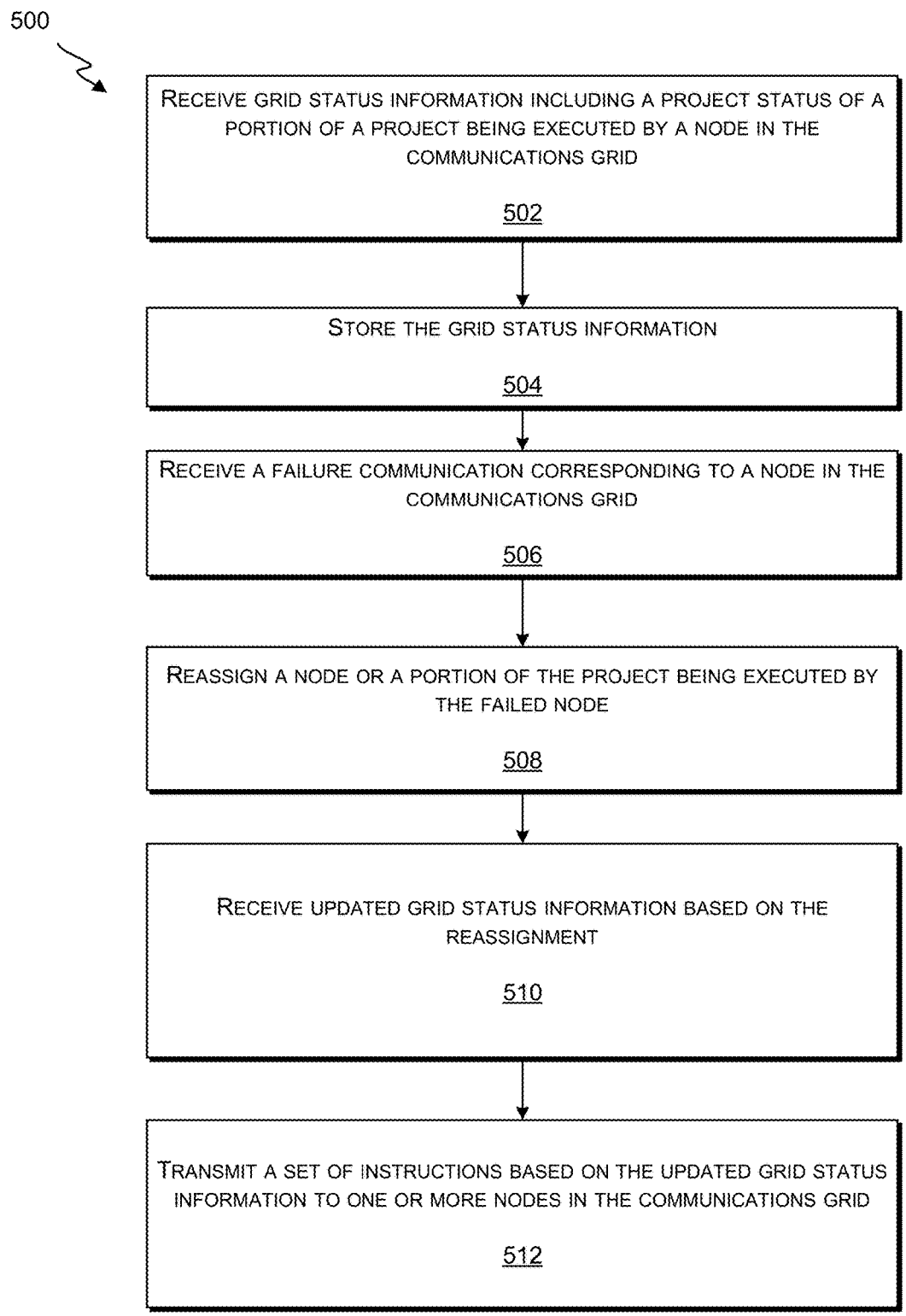
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
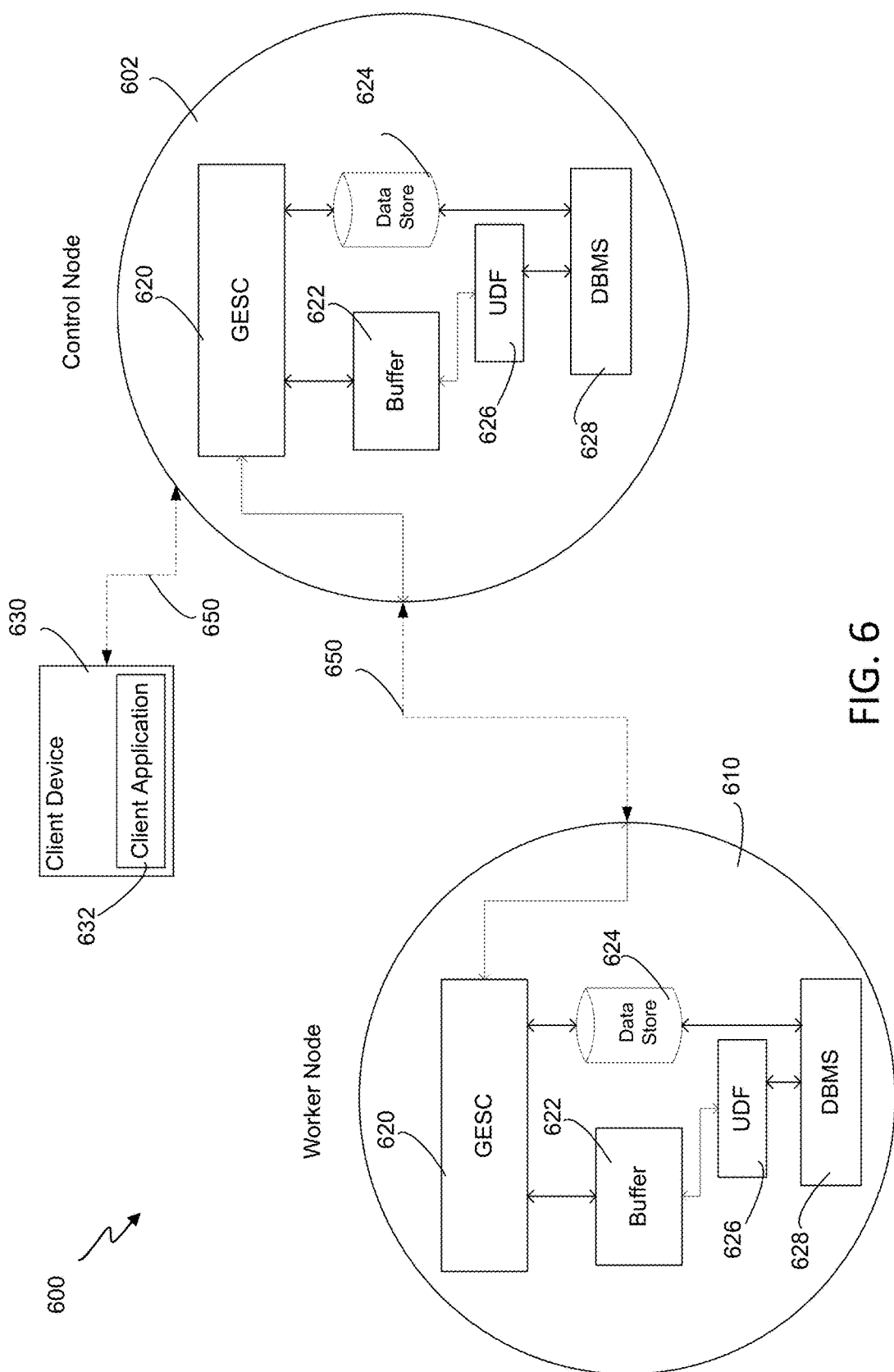
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
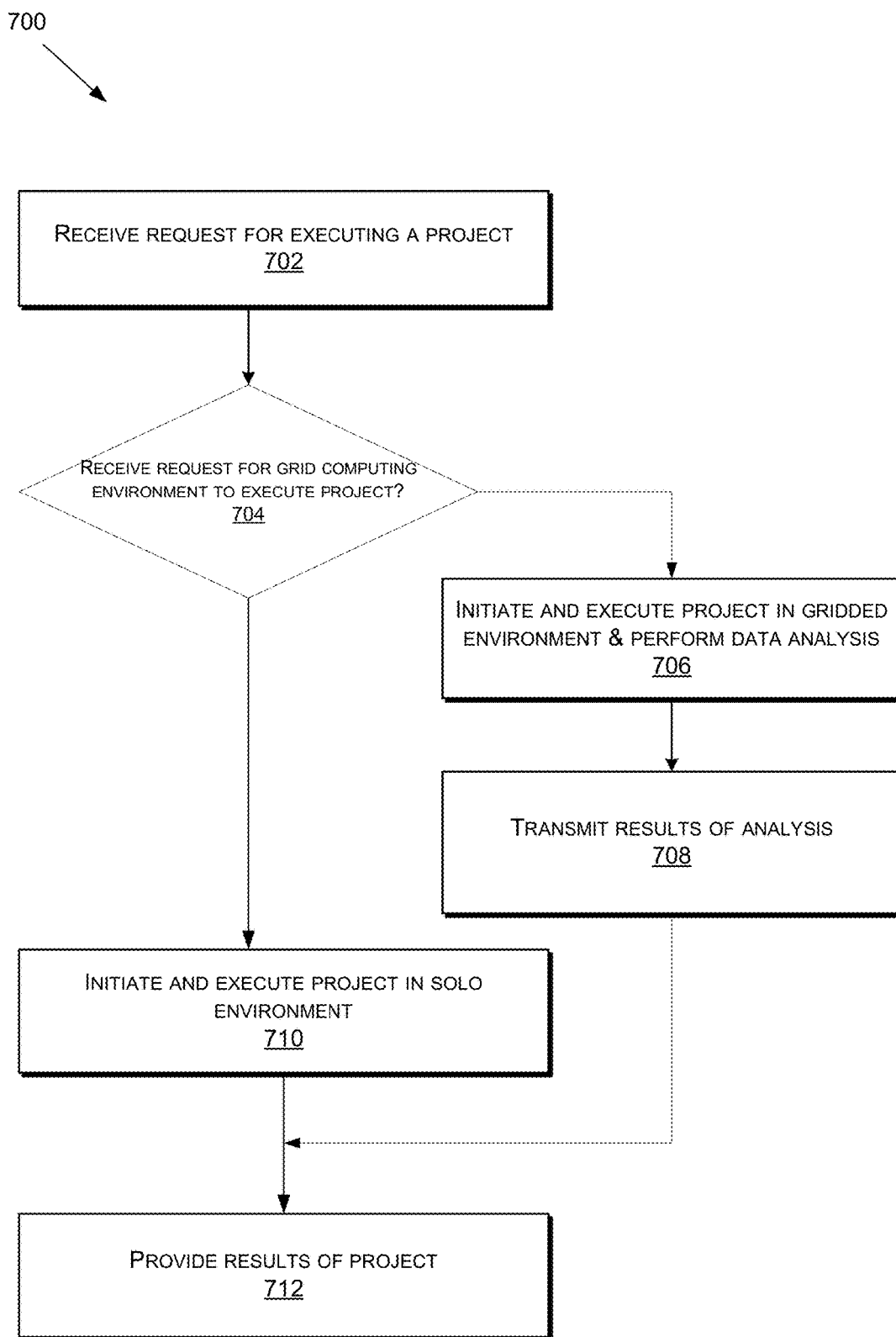
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
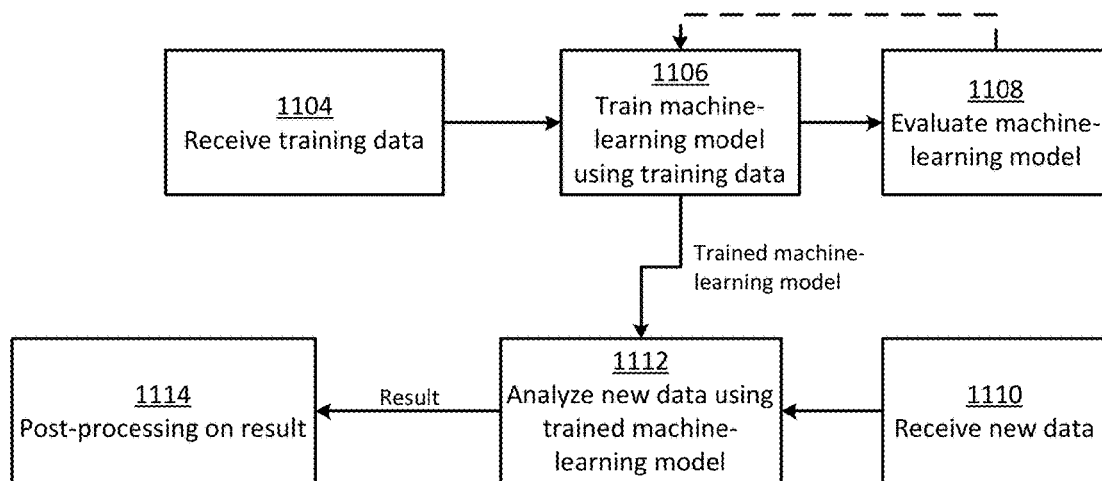
FIG. 11 illustrates a flow chart showing an example process of generating and using a machine-learning model according to some aspects.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
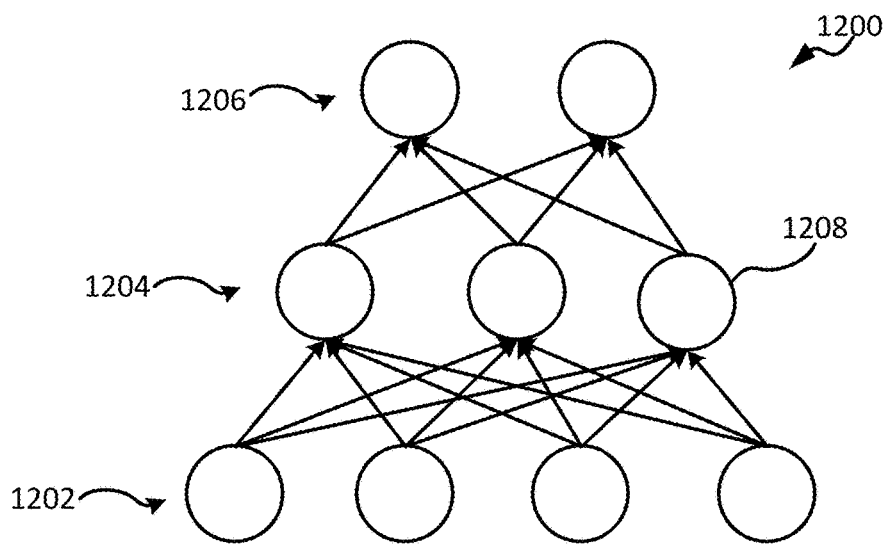
FIG. 12 illustrates an example machine-learning model based on a neural network.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Figure 13A:
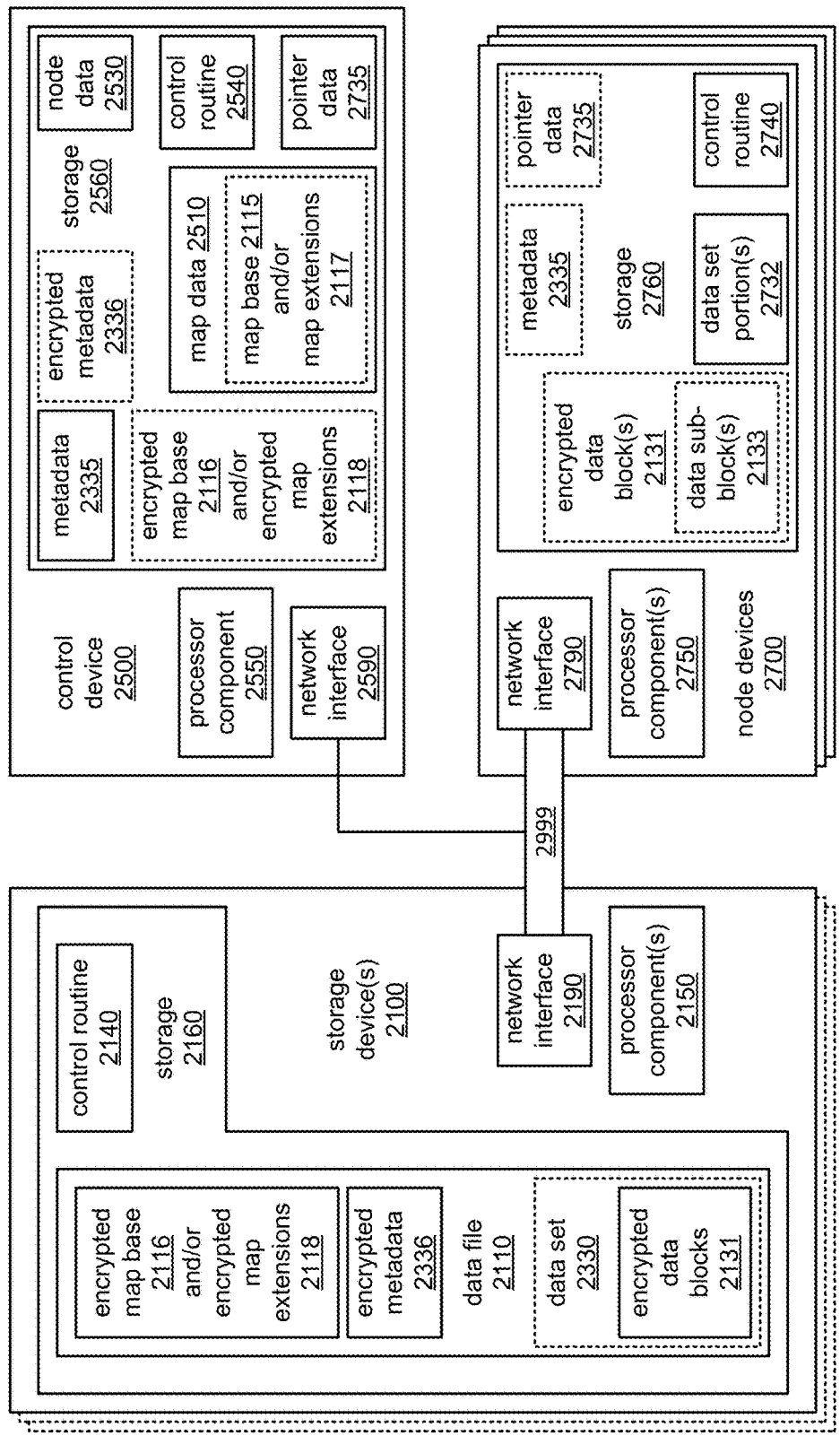
FIGS. 13A, 13B and 13C each illustrate an example embodiment of a distributed processing system.

FIG. 13A illustrates a block diagram of an example embodiment of a distributed processing system 2000 incorporating one or more storage devices 2100, multiple node devices 2700, and a control device 2500. As depicted, these devices 2100, 2500 and/or 2700 may exchange communications thereamong related to the storage and retrieval of a data set 2330 via a network 1999, including one or more of metadata 2335 in the form of encrypted metadata 2336, data set portions 2732 in the form of encrypted data blocks 2131 and/or encrypted data sub-blocks 2133, node data 2530 and/or pointer data 2735. However, one or more of the devices 2100, 2500 and/or 2700 may exchange other data entirely unrelated to the storage and retrieval of the data set 2330 with each other and/or with still other devices (not shown) via the network 2999. In various embodiments, the network 2999 may be a single network that may extend within a single building or other relatively limited area, a combination of connected networks that may extend a considerable distance, and/or may include the Internet. Thus, the network 2999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

The data set 2330 may be divisible into the data set portions 2732. Different ones of the data set portions 2732 may be temporarily stored by different ones of the node devices 2700 as the multiple node devices 2700 separately, and at least partially in parallel, perform processing tasks with the data set portions 2732. Such at least partially parallel performances of processing tasks by the multiple node devices 2700 may be coordinated by the control device 2500. The control device 2500 may distribute indications of the processing tasks to be performed and/or other related information, such as the metadata 2335, among the multiple node devices 2700. The control device 2500 may also receive indications of progress in the separate, but at least partially parallel, performance of processing tasks from each of the node devices 2700.

In preparation for and/or in support of such processing tasks, the data set 2330 may be stored for longer term storage as a single data file 2110 by the one or more storage devices 2100. Where the data set 2330 is employed by the multiple node devices 2700 as an input to such processing tasks, the multiple node devices 2700 may retrieve corresponding ones of the data set portions 2732 (in the form of the encrypted data blocks 2131), at least partially in parallel, from the one or more storage devices 2100. Alternatively or additionally, where the data set 2330 is generated as an output of such processing tasks, the multiple node devices 2700 may store corresponding ones of the data set portions 2732 (in the form of the encrypted data blocks 2131), at least partially in parallel, to the one or more storage devices 2100. Such at least partially parallel exchanges of the data set 2330 between the multiple node devices 2700 and the one or more storage devices 2100 may also be coordinated by the control device 2500. The control device 2500 may distribute, to each node device 2700, one or more pointers to locations within the data file 2110 at which one or more corresponding ones of the encrypted data blocks 2131 may be stored, and/or from which one or more corresponding ones of the encrypted data blocks 2131 may be retrieved.

In various embodiments, each of the one or more storage devices 2100 may incorporate one or more of a processor component 2150, a storage 2160 and a network interface 2190 to couple each of the one or more storage devices 2100 to the network 2999. The storage 2160 may store a control routine 2140 and/or at least a portion of the data file 2110 in which the data set 2330 is stored as a set of the encrypted data blocks 2131. Also stored within the data file 2110 may be the encrypted metadata 2336, and/or a map of the encrypted blocks of information stored within the data file 2110 in encrypted form as an encrypted map base 2116 that may be accompanied by multiple encrypted map extensions 2118. The control routine 2140 may incorporate a sequence of instructions operative on the processor component 2150 to implement logic to perform various functions. In executing the control routine 2140, the processor component 2150 of each of the one or more storage devices 2100 may operate the network interface 2190 to receive the encrypted data blocks 2131 (i.e., the encrypted form of the data set portions 2732) from corresponding ones of the node devices 2700, and may store the received encrypted data blocks 2131 within the data file 2110. Alternatively or additionally, the processor component 2150 may retrieve the encrypted data blocks 2131 from the data file 2110, and may operate the network interface 2190 to transmit the retrieved encrypted data blocks 2131 (i.e., the encrypted form of the data set portions 2732) to corresponding ones of the node devices 1700.

In various embodiments, each of the multiple node devices 2700 may incorporate one or more of a processor component 2750, a storage 2760 and a network interface 2790 to couple each of the node devices 2700 to the network 2999. The storage 2760 may store a control routine 2740; the metadata 2335; one or more of the data set portions 1732, along with one or more of the encrypted data blocks 2131 and/or encrypted data sub-blocks 2133; and/or the pointer data 2735. The control routine 2740 may incorporate a sequence of instructions operative on the processor component 2750 to implement logic to perform various functions. In executing the control routine 2740, the processor component 2750 of each of the node devices 2700 may operate the network interface 2790 to receive indications of processing tasks to perform on one or more of the data set portions 2732 at partially in parallel with others of the multiple node devices 2700, and/or other related information, from the control device 2500. Also, the processor component 2750 may encrypt one or more data set portions 2732 to generate corresponding one or more encrypted data blocks 2131, and may operate the network interface 2790 to transmit the one or more encrypted data blocks 2131 to the one or more storage devices 1100 for storage within the data file 2110. Alternatively or additionally, the processor component 2550 may operate the network interface 2790 to receive one or more of the encrypted data blocks 2131 from the one or more storage devices 2100, and may decrypt the one or more encrypted data blocks 2131 to generate corresponding one or more data set portions 2732 in support of performing such processing tasks.

In some embodiments, such exchanges of the encrypted data blocks 2131 may occur directly between the multiple node devices 2700 and the one or more storage devices 2100 via the network 2999. However, in other embodiments, such exchanges of the encrypted data blocks 2131 may be relayed through the control devices 2500.

In various embodiments, the control device 2500 may incorporate one or more of a processor component 2550, a storage 2560 and a network interface 2590 to couple the control device 2500 to the network 2999. The storage 2560 may store a control routine 2540; the metadata 2335, along with the encrypted metadata 2336; map data 2510, along with the encrypted map base 2116 and/or the encrypted map extensions 2118; and/or node data 2530. The control routine 2540 may incorporate a sequence of instructions operative on the processor component 2550 to implement logic to perform various functions. In executing the control routine 2540, the processor component 2550 may operate the network interface 2590 to transmit indications to each of the node devices 2700 of processing tasks to perform on one or more of the data set portions 2732 at partially in parallel with others of the multiple node devices 2700, and/or other related information. Also, the processor component 2550 may encrypt the metadata 2335 to generate the encrypted metadata 2336, may encrypt a map base 2115 and/or multiple map extensions 2117 formed from the map data 2510 to generate the encrypted map base 2116 and/or the multiple encrypted map extensions 2118, respectively, and may operate the network interface 2590 to transmit the encrypted metadata 2336, the encrypted map base 2116 and/or the encrypted map extensions 2118 to the one or more storage devices 1100 for storage within the data file 2110. Alternatively or additionally, the processor component 2550 may operate the network interface 2590 to receive the encrypted metadata 2336, the encrypted map base 2116 and/or the encrypted map extensions 2118 from the one or more storage devices 2110, may decrypt the encrypted metadata 2336 to generate the metadata 2335, and may decrypt the encrypted map base 2116 and/or the encrypted map extensions 2118 to generate the map base 2115 and/or multiple map extensions 2117, respectively, of the map data 2510.

Additionally, in embodiments in which exchanges of the encrypted data blocks 2131 are relayed through the control device 2500, the processor component 2550 may operate the network 2590 and the storage 2560 to receive, buffer and then retransmit each of the encrypted data blocks 2131 from the one or more storage devices 2100 to the multiple node devices 2700, or vice versa. However, in such embodiments, and as will be explained in greater detail, the work of encrypting data set portions 2732 to generate the encrypted data blocks 2131 and of decrypting the encrypted data blocks 2131 to generate the data set portions 2732 may still be performed in a distributed manner by the multiple node devices 2700.

Figure 13B:
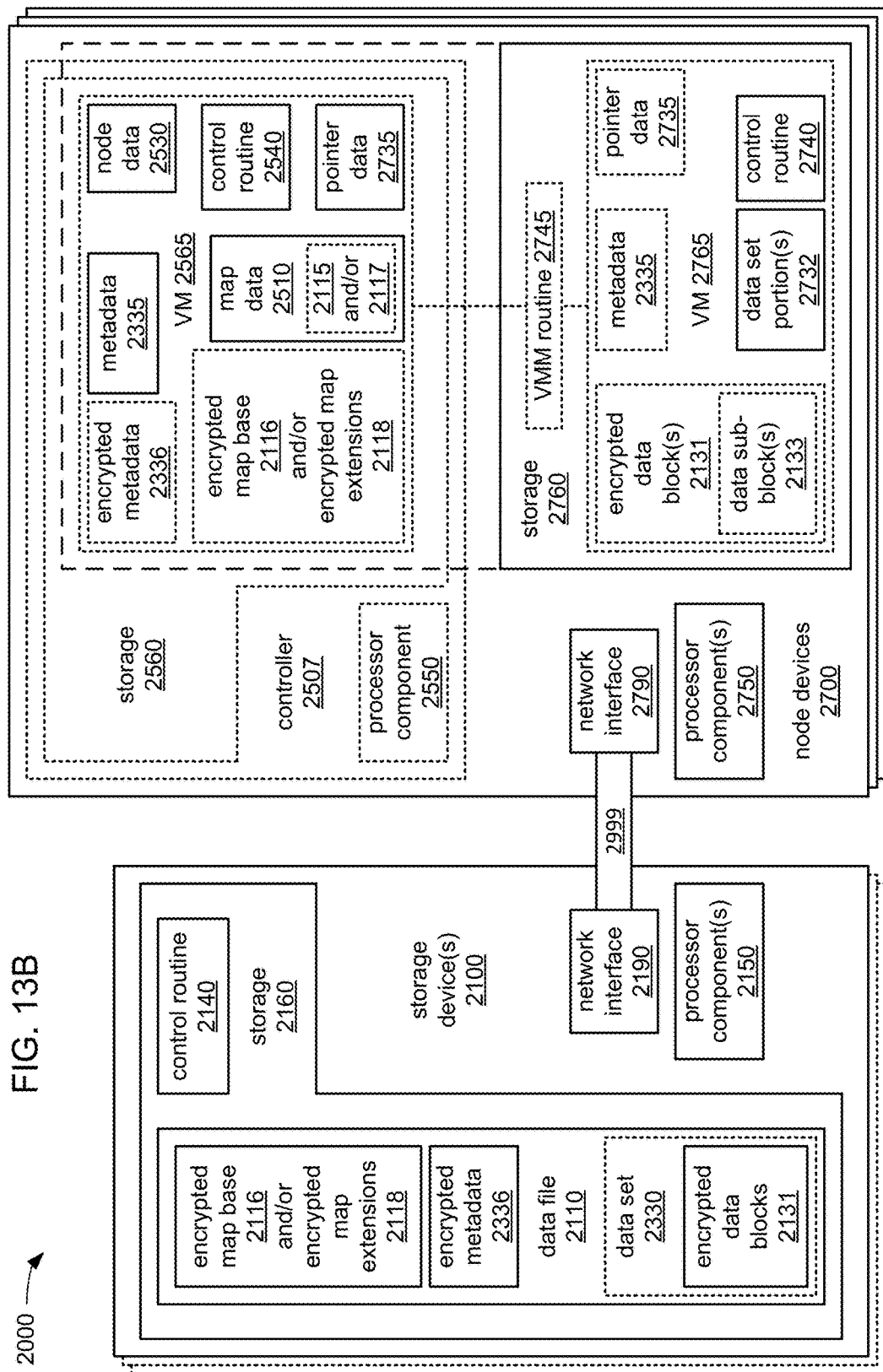

FIG. 13B illustrates a block diagram of an alternate example embodiment of the distributed processing system 2000 that is substantially similar to the example of FIG. 13A, but features an alternate embodiment of one of the node devices 2700 that additionally performs the coordinating functions of the control device 2500 in lieu of there being a separate and distinct control device 2500 to do so. As depicted, in some embodiments, such an alternate embodiment of the node device 2700 may additionally incorporate a controller 2507 that, itself, incorporates the processor component 2550 and the storage 2560 that were depicted as components of the separate control device 2500 of FIG. 13A to perform the coordinating functions. As also depicted as an alternative, in some embodiments, the processor component 2750 of such an alternate embodiment of the node device 2700 may be caused by its execution of a virtual machine manager (VMM) routine 2745 stored within the storage 2760 to generate a virtual machine (VM) 2565 and/or a VM 2765. Within the VM 2765, the processor component 2750 may execute the control routine 2740 to perform processing tasks with one or more data set portions 2732 at least partially in parallel with others of the node devices 2700. Alternatively or additionally, within the VM 2565, the processor component 2750 may execute the control routine 2540 to perform such coordinating tasks as have been described as being otherwise performed by the processor component 2550 of the control device 2500 of FIG. 13A and/or by the controller 2507.

Figure 13C:
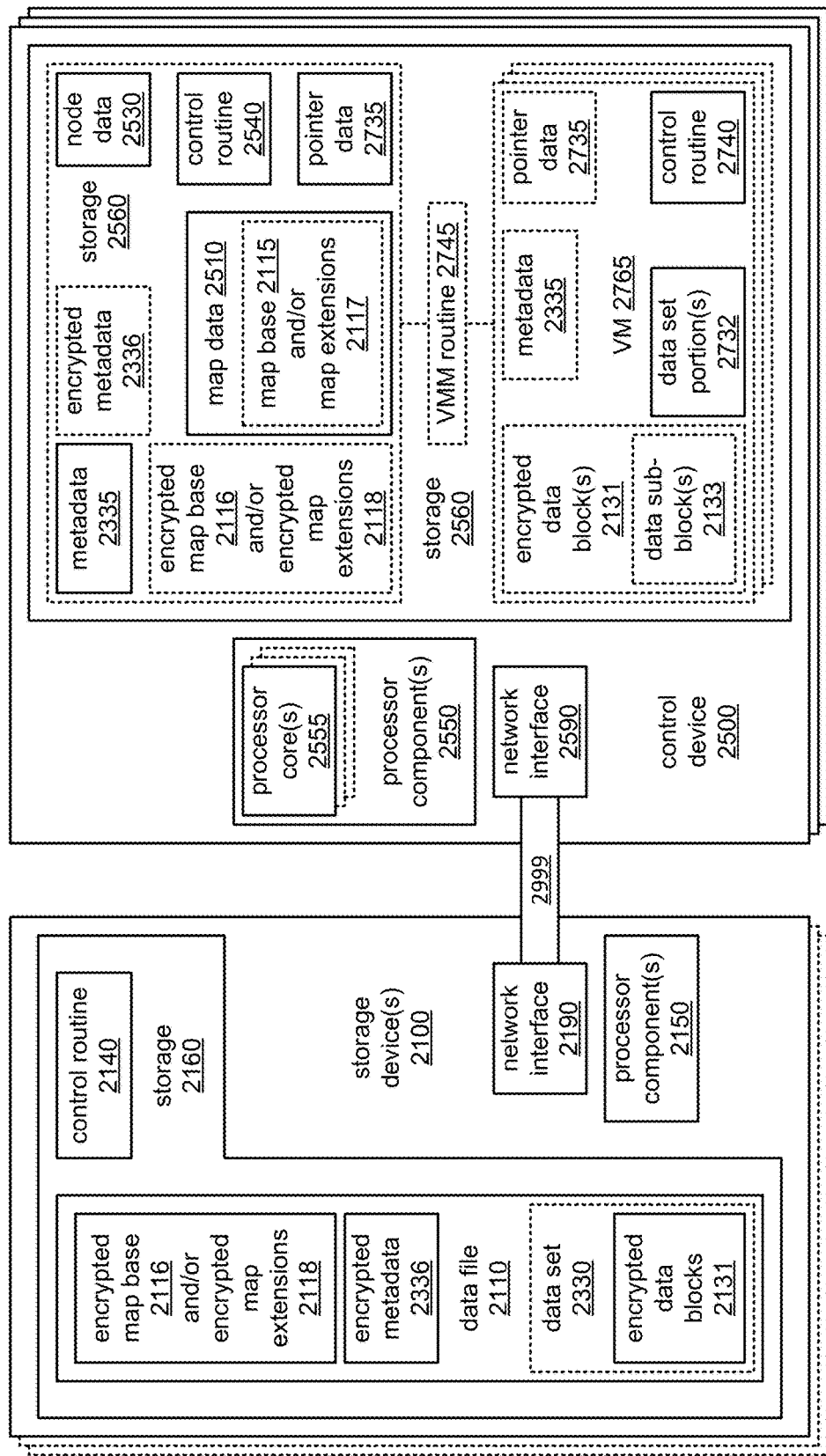

FIG. 13C illustrates a block diagram of another alternate example embodiment of the distributed processing system 2000 that is substantially similar to the examples of FIGS. 13A and 13B, but features an alternate embodiment of one of the control device 2500 that additionally performs the processing, encryption and decryption functions of the multiple node devices 2700 in lieu of there being a separate and distinct multitude of the node devices 2700 to do so. As depicted, in some embodiments, the processor component 2550 of such an alternate embodiment of the control device 2500 may incorporate multiple processor cores 2555 and/or another mechanism by which multiple threads of execution may be supported to take the place of the multiple processor components 2750 of the multiple node devices 2700. As also depicted as an alternative, in some embodiments, the processor component 2550 of such an alternate embodiment of the control device 2500 may be caused by its execution of the VMM routine 2745 stored within the storage 2560 to generate a virtual machine (VM) 2565 and multiple one VMs 2765 to take the place of the multiple node devices 2700. Within each VM 2765, the processor component 2550 (and/or a processing core 2555 thereof) may execute an instance of the control routine 2740 to perform processing tasks with one or more data set portions 2732 at least partially in parallel with performances of those processing tasks through the execution of other instances of the control routine 2740 within others of the VMs 2765. Alternatively or additionally, within the VM 2565, the processor component 2550 may execute the control routine 2540 to perform such coordinating tasks as have been described as being otherwise performed by the processor component 2550 of separate and distinct control device 2500 of FIG. 13A and/or by the controller 2507 of FIG. 13B.

Figure 14A:
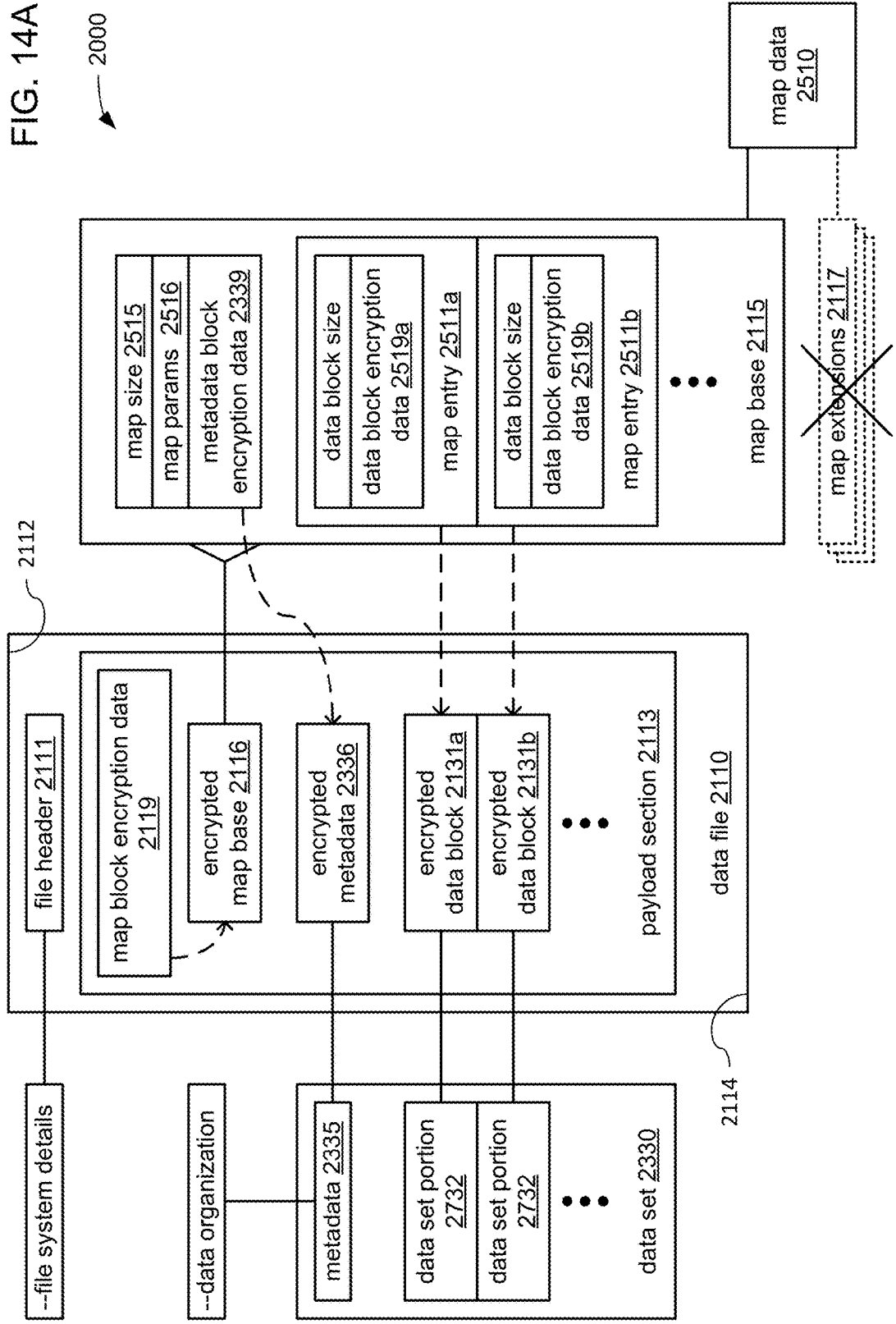
Figure 14B:
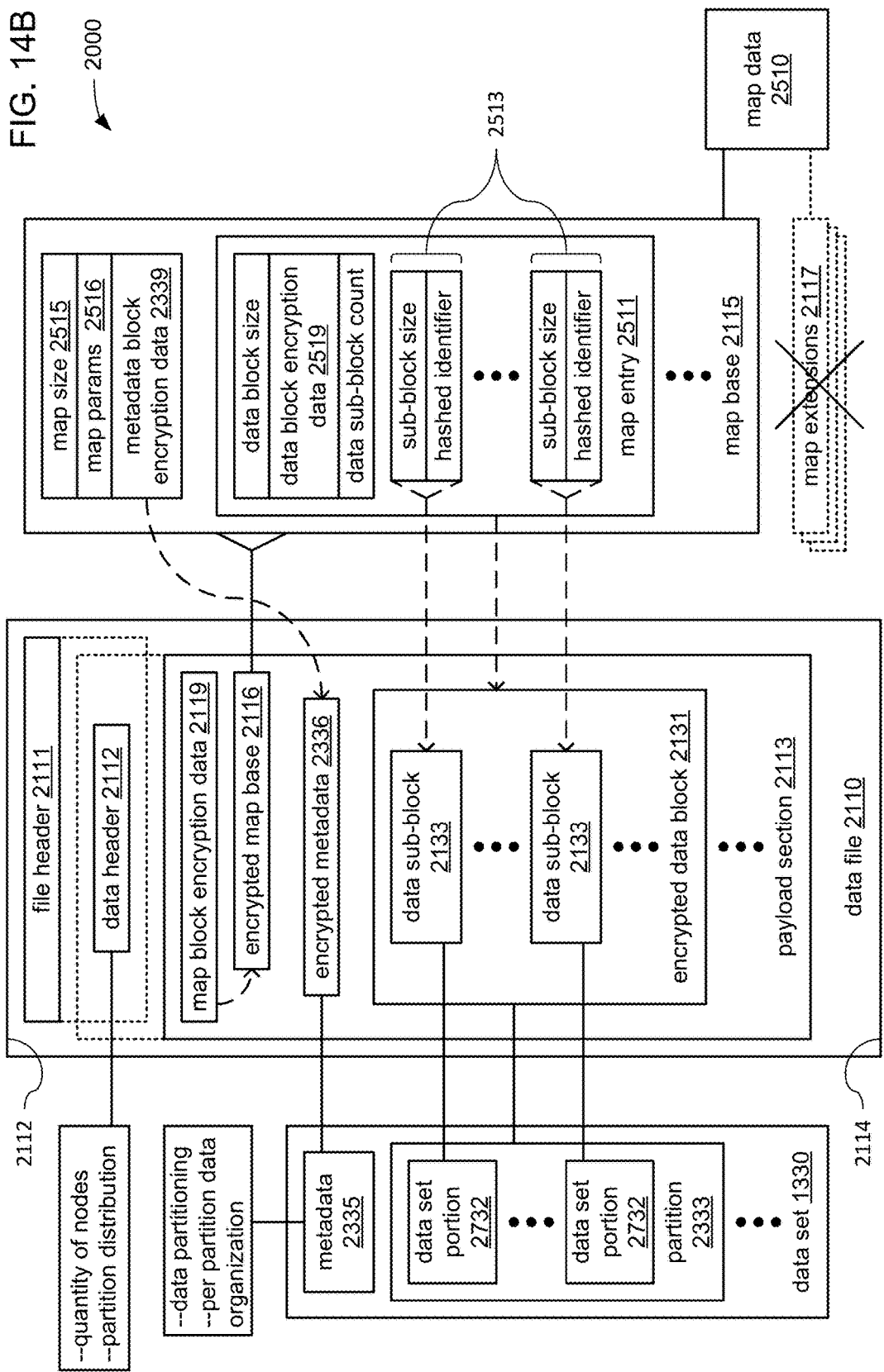

FIGS. 14A, 14B and 14C, together, illustrate an example of the manner in which the data set 2330 may be retained in storage within the data file 2110 by the one or more storage devices 2100 as multiple encrypted data blocks 2131. The data of the data set 1330 may be any of a variety of types of data (e.g., societal statistics data, business operations data, raw data from an experiment, financial data, medical treatment analysis data, etc.), and may be organized within the data set 2330 in any of a variety of ways (e.g., rows and columns, columnar, hypercube, linked list, tree, graph etc.) that may be made traversable using any of a variety of mechanisms to find a particular data point. The data set 2330 may incorporate the metadata 2335, which may include a description of the manner in which the data of the data set 2330 is organized.

The size of the data set 2330 may be sufficiently large that processing, encrypting and/or decrypting the data set 2330 using a single processing device may be deemed highly impractical. Indeed, it may be that the data set 2330 also changes frequently enough over time (e.g., is updated hourly, daily, weekly, etc.) such that the length of time required to process, encrypt and/or decrypt the data set 2330 using a single processing device would yield results that would already be out of date before such operations could be completed. Thus, it may be deemed highly desirable to process, encrypt and/or decrypt the data set 2330 in a distributed and at least partially parallel manner using a group of interconnected processing devices (sometimes referred to as a "grid" of node devices), such as the multiple node devices 2700 of the embodiment of the distributed processing system 2000 of either FIG. 13A or 13B. Alternatively, with advent of highly parallelized processor components such as graphics processing units (GPUs) with thousands of processing cores, and/or with specialized cryptographic accelerators with multiple cores optimized for encryption and decryption operations, it may be deemed highly desirable to process, encrypt and/or decrypt the data set 2330 in a distributed and at least partially parallel manner using the numerous processor cores 2555 of one or more of such processor components within a single device, such as the one or more processor components 2550 of the embodiment of the control device 2500 of the distributed processing system 2000 of FIG. 13C.

More specifically, where one or more of the processor components 2500 are implemented with a GPU, there may be thousands of processor cores 2555 that are each able to perform a operations of a simpler instruction set in a highly parallelized manner much more quickly than the typically much smaller quantity of processor cores 2555 in more conventional central processing unit (CPUs). Thus, where encryption, decryption and/or processing operations that are to be performed are amenable to the use of such simpler instruction sets in a highly parallelized manner, considerable improvements in performance may be realized. Alternatively or additionally, where one or more of the processor components 2500 are implemented with a cryptographic accelerator, there may be dozens of cross-checking pairs of processor cores 2555 that are each able to perform instructions of an instruction set specialized for cryptographic operations, and including various security features in the application programming interfaces (APIs) by which they are controlled. The built-in cross-checking features between such pairs of processor cores 2555 may allow operation-by-operation monitoring between the processor cores 2555 of each such pair for signs of having been compromised in the performance of encryption and/or decryption, including efforts to gain improper access to the pass phrase 2779. As will be explained in greater detail, the manner in which the encryption, storage, retrieval and decryption of the data set 2330 is effected advantageously obviates the need for coordination among the node devices 2700, between the control device 2500 and the node devices 2700, and/or among processor cores 2555 of the processor component(s) 2550.

Furthermore, the processing resources required to encrypt, store, retrieve and decrypt the map data 2510, which enables the accurate and flexible distribution of data blocks and/or the data sub-blocks representing data set portions 1732, is usually relatively small compared to the processing resources to perform analogous operations with the data set 2330. Therefore, making the tradeoff to consume the processing resources needed to perform such operations with the map data 2510 may be more than compensated for by the significant improvements that doing so makes possible in performance and flexibility in the handling of the data set 2330. Although the degree of parallelism in the handling of the data set 2330 may be impacted by workload and environmental constraints common to various computing systems, the parallelism achieved during encryption, storage, retrieval and decryption of the data set 2330 more readily scales with progressively larger forms of the data set 2330 and/or as the quantity of node devices 2700 and/or processor cores 2555 increases. More specifically, the time required to exchange encryption data needed to encrypt and/or decrypt blocks of the data of the data set 2330 and/or to exchange information concerning locations of the encrypted data blocks 2131 of the data set 2330 within the data file 2110 may be significantly smaller than the time required to perform the encryption, storage, retrieval and/or decryption of those blocks.

The data within the data set 2330 may be organized in a manner that enables such parallel distributed processing. More specifically, the organization of the data within the data set 2330 may enable the division of the data set 2330 into multiple ones of the data set portions 2732 (with varying degrees of flexibility, as will be explained) in which each of the data set portions 2732 is able to be processed without dependencies on the results of the processing of any of the other data set portions 2732. As a result, the data set portions 2732 may each be distributable to any of the node devices 2700 and/or to any of the processor cores 2555 of the processor 2550 without regard to which one of the node devices 2700 and/or the processor cores 2555 that any of the other data set portions 2732 are distributed to.

In embodiments that include the multiple node devices 2700, such divisibility of the data set 2330 obviates the need to incur the latencies of serializing the processing of two or more of the data set portions 2732, as well as obviating the latencies of transferring an output of the processing of one data set portion 2732 by one node device 2700 through the network 2999 to another node device 2700 at which another data set portion 2732 is to be processed. Such divisibility of the data set 2330 may also enable the exchange of the encrypted data blocks 2131 between the multiple node devices 2700 and the one or more storage devices 2100, either for storage or retrieval of the data set 2330, in a distributed and at least partially parallel manner. More specifically, each of the encrypted data blocks 2131 may be exchanged between one of the node devices 2700 and the one or more storage devices 2100 without regard to whether or when any of the other encrypted data blocks 2131 has been similarly exchanged between another of the node devices 2700 and the one or more storage devices 2100. To better enable such distributed and at least partially parallel exchanges of the encrypted data blocks 2131, the encrypted data blocks 2131 and the information required to access the encrypted data blocks 2131 may be stored within the data file 2110 in a manner that minimizes dependencies among the control device 1500 and the multiple node devices 1700 in performing the storage and retrieval of the encrypted data blocks 2131 and such associated information. Stated differently, and as discussed at multiple points throughout, a form of organization or ordering of various pieces of information within the data file, including portions of the data set 2330 and various pieces of information about the manner in which those portions are prepared for storage and/or the manner in which those portions are stored within the data file 2110. As will be familiar to those skilled in the art, such concepts of there being an organization or ordering of such contents of the data file 2110 refers to the manner in which the contents of the data file 2110 are accessed via an addressing or indexing scheme that has been defined for the data file 2110. And as will also be familiar to those skilled in the art, the physical reality of the manner in which the data file 2110 may actually be stored by the one or more storage devices 2100 may entail a division of the data file 2110 in to various portions that may be located in any of a variety of storage locations within storage components of the one or more storage devices 2100, yet while still enabling the contents of the data file 2110 to be accessible via such an addressing or indexing scheme.

Referring to both FIGS. 14A and 14B, the data file 2110 may include a file header 2111 located at or toward a starting end 2112 of the data file 2110, and a payload section 2113 that may start at a location following the file header 2111 and may end at a location coincident with the other end 2114 of the data file 2110. The one or more storage devices 2100 may employ any of a variety of file systems in storing and managing access to files within the one or more storage devices 2100, including and not limited to, network file system (NFS), block device storage, any of the various versions of file allocation table (FAT), High Sierra Format (ISO-9660), write anywhere file layout (WAFL), XFS, HDFS, MapR-FS, cloud storage (e.g. Amazon S3, Red Hat Ceph, Kubernetes, etc.), etc. The file header 2111 may be a single contiguous series of bytes that may include indications of any of a variety of details of the data file 2110 that may be germane to, and that may be organized in compliance with the specifications of, one of the file systems employed by the one or more storage devices 2100.

The payload section 2113 may be a single contiguous series of bytes that occupies the majority of data file 2110, and depending on various aspects of the file system employed by the one or more storage devices 2100, the starting end of the payload section 2113 may be located toward the starting end 2112 of the data file 2110 and may follow at least the file header 2111. At or toward the starting end of the payload section 2113, a few bytes of the payload section 2113 may be occupied by the map block encryption data 2119 that provides the encryption information needed to decrypt the encrypted map base 2116. As previously discussed, in some embodiments, the map block encryption data 2119 may be subjected to a XOR operation prior to storage within the data file 2110 to thereby hide the map block encryption data 2119 in plain sight by causing it to appear to be simply part of the encrypted data. Following such a quantity of a few bytes, a first quantity of multiple kilobytes of the payload section 2113 may be occupied by the encrypted map base 2116. The encrypted map base 2116 may be the encrypted form of the map base 2115 that provides at least a portion of the map data 2510 that describes the manner in which the encrypted data blocks 2131 are organized within the payload section 2113. As will be discussed in greater detail, where the map data 2510 exceeds a threshold of size, the map data 2510 may be divided into the map base 2115 and multiple map extensions 2117 (depicted in greater detail in FIG. 14C). However, each of FIGS. 14A and 14B depict a situation in which the map data 2510 does not exceed such a threshold such that it may not be so divided, and therefore, may be entirely contained within the map base 2115. Such a first quantity of kilobytes of the payload section 2113 may be followed by a second quantity of kilobytes of the payload section 2113 that may be occupied by the encrypted metadata 2336, which may the encrypted form of the metadata 2335. Following these two quantities of kilobytes may then be at least one contiguous series of the encrypted data blocks 2131.

In some embodiments, the manner in which the data of the data set 2330 is organized within the data set 2330 may be relatively highly granular, thereby providing a relatively high degree of flexibility in the division of the data set 2330 into the data set portions 2732. By way of example, where the data of the data set 2330 is organized into rows and columns with a relatively large quantity of rows, a relatively high degree of granularity may be provided based on distribution of the rows among the data set portions 2732. With such a relatively high degree of flexibility in defining the data set portions 2732, the quantity and/or size of each data set portion 2732 may be more tightly correlated to the quantity of the node devices 2700 and/or processor cores 2555 available at the time the data set 2330 is generated, and/or may be more tightly correlated to the resources within each of those available node devices 2700 and/or processor cores 2555.

However, in other embodiments, the data of the data set 2330 may be organized within the data set 2330 in a manner that has relatively low granularity, thereby providing a relatively low degree of flexibility in the division of the data set 2330 into the data set portions 2732. As a result, the quantity of data set portions 2732 into which the data set 2330 may be divisible, while still avoiding dependencies in processing therebetween, may be relatively limited such that at least some of the data set portions 2732 may be required to be relatively large. Such an embodiment of the data set 2330 may be described as being made up of partitioned data in which the relatively limited opportunities for division of the data set 2330 may define a relatively low quantity of partitions. An example of such partitioning may be an embodiment of the data set 2330 in which the data is partitioned such that it is divisible into no more than fifty data set portions 2732 that each correspond to one of the fifty states of the United States. The characteristics of the data within each of those partitions may be such that the data within each of the partitions may be processed with no dependencies on the data within any of the other partitions. However, the processing of the data within any one of the partitions may require access to at least a substantial portion of the data therein such that the data within each of the partitions cannot be distributed across more than one node device 2700 without a relatively high likelihood that time consuming exchanges of data would be required thereamong.

FIG. 14A depicts an example embodiment of the organization of the data of the data set 2330 within the data file 2110 where the data of the data set 2330 is of relatively high granularity such that the data of the data set 2330 is deemed to be non-partitioned data. For such a non-partitioned embodiment, each of the encrypted data blocks 2131 in the contiguous series of the encrypted data blocks 2131 (including the depicted encrypted data blocks 2131a and 2131b) that follows at least the encrypted map base 2116 and the encrypted metadata 2336 may correspond to a single data set portion 2732 that may be processed by one of the node devices 2700.

As will be explained in greater detail, in embodiments of the distributed processing system 2000 that include the multiple node devices 2700, each of the node devices 2700 may act independently of the other node devices 2700 to encrypt and then store such a single data set portion 2732 within the payload section 2113 as a single corresponding encrypted data block 2131 (e.g., the depicted single data block 2131a), or to encrypt and store multiple data set portions 2732 within the payload section 2113 as multiple corresponding encrypted data blocks 2131 (e.g., the depicted multiple adjacently stored encrypted data blocks 2131a and 2131b). The control device 2500 may coordinate such independent actions by the node devices 2700 by providing each node device 2700 with at least one pointer at which the node device 2700 may so store one or more of the data set portions 2732 in their encrypted form as corresponding one or more encrypted data blocks 2131. After coordinating such storage of all of the data set portions 2732 that are to be stored by the node devices 2700 through the distribution of pointers, the control device 2500 may store at least the map base 2115 and the metadata 2335 in their encrypted forms as at least the encrypted map base 2116 and the encrypted metadata 2336, respectively, within the payload section 2113. As will be explained in greater detail, the control device 2500 may generate portions of the contents of the map base 2115 as the control device 2500 generates pointers and provides those pointers to the node devices 2700 for use in storing the data set portions 2732.

The map base 2115 may include a contiguous series of bytes. At the starting end of the map base 2115, a first quantity of bytes of the map base 2115 may be occupied by an indication of the map size 2515 that specifies how many bytes, words, doublewords, etc. in total are used to provide a map of the encrypted data blocks 2131 within the payload section 2113. Following such a first quantity of bytes may be a second quantity of bytes of the map base 2115 that are occupied by indications of one or more map parameters 2516 that may include an indication that the data of the data set 2330 is non-partitioned data. Following such a second quantity of bytes may be a third quantity of bytes of the map base 2115 that are occupied by metadata block encryption data 2339 that may provide encryption information needed to decrypt the encrypted metadata 2336. Following these first three such quantities of bytes may then be a series of map entries 2511 (including the depicted map entries 2511a and 2511b). The order of the map entries 2511 within at least the map base 2115 may correspond to the order of the encrypted data blocks 2131 within the payload section 2113.

FIG. 14B depicts an example embodiment of the organization of the data of the data set 2330 within the data file 2110 where the data of the data set 2330 is of relatively low granularity such that the data of the data set 2330 is deemed to be partitioned data divided into multiple partitions 2333. As previously discussed, the data of the data set 2330 within each partition 2333 may need to be processed by a single one of the node devices 2700 such that the data of the data set 2330 within each partition 2333 cannot be distributed among multiple ones of the node devices 2700. It may also be deemed likely that there will be wide variations in size among the partitions 2333 due to wide variation in the frequency with which items of data of the data set 2330 are assigned to each partition 2333. Such variation may be due to variations in the size of the items of data, such as where the data includes strings of widely varying character or binary length; linked lists of widely varying quantities of entries; tree data structures with widely varying quantities of branches; and/or graphs, arrays, vectors, tensors, digital video of widely varying size. Thus, as a result, while one of the node devices 2700 may be caused to process the data within a single large partition 2333, another of the node devices 2700 may be caused to process the data within multiple significantly smaller partitions 2333. In recognition of such differences between partitioned data and non-partitioned data, the manner in which an embodiment of the data set 2330 made up of partitioned data may be stored within the data file 2110 may differ from the manner in which an embodiment of the data set 2330 made up of non-partitioned data may be stored. More specifically, for partitioned data, the quantity and/or size of each data set portion 2732 may be more tightly correlated to the quantity and/or sizes of the partitions 2333. Thus, for such a partitioned embodiment, each of the data blocks 2131 in the contiguous series of the data blocks 2131 that follows at least the encrypted map base 2116 and the encrypted metadata 2336 may include one or more data sub-blocks 2133, and each data sub-block 2133 may correspond to a single data set portion 2732.

As will be explained in greater detail, in embodiments of the distributed processing system 2000 that include the multiple node devices 2700, each of the node devices 2700 may act independently of the other node devices 2700 to encrypt and then store a single data set portion 2732 within the payload section 2113 as a single corresponding data sub-block 2133 within a single encrypted data block 2131, or to encrypt and store multiple data set portions 2732 within the payload section 2113 as multiple corresponding data sub-blocks 2133 within a single encrypted data block 2131. Again, the control device 1500 may coordinate such independent actions by the node devices 2700 by providing each node device 2700 with at least one pointer at which the node device 2700 may so store one or more of the data set portions 2732 as one or more data sub-blocks 2133 in encrypted form within a single encrypted data block 2131. After coordinating the storage of all of the data set portions 2732 that are to be stored by the node devices 2700 through the distribution of pointers, the control device 2500 may store at least the map base 2115 and/or the metadata 2335 in their encrypted forms as at least the encrypted map base 2116 and the encrypted metadata 2336, respectively, within the payload section 2113. The control device 2500 may also store a data header 2112 that provides indications of the quantity of node devices 2700 that are involved in storing the data set 2330 within the payload section 2113. As depicted, in various embodiments, such a data header 2112 may form part of the file header 2111 or part of the payload section 2113 (e.g., alongside, or part of either the encrypted map base 2116 or the encrypted metadata 2336).

Such differences in the manner in which an embodiment of the data set 2330 made up of partitioned data is stored from the manner in which an embodiment of the data set 2330 made up of non-partitioned data is stored may be accompanied by corresponding differences in the content of the map base 2115. More specifically, among the indications of one or more map parameters 2516 may be an indication that the data of the data set 2330 is partitioned data. Again, following the three quantities of bytes in which the map size 2515, various map parameters 2516 and/or the metadata block encryption data 2339 may be stored, may be a series of map entries 2511. The order of the map entries 2511 within at least the map base 2115 may correspond to the order of the encrypted data blocks 2131 within the payload section 2113. However, each map entry 2511 may include a data sub-block count specifying the quantity of data sub-blocks 2133 that are included within the corresponding encrypted data block 2131. Following the sub-block count within each map entry 2511 may be a series of one or more map sub-entries 2513 that each correspond to one of the data sub-blocks 2133 within the corresponding encrypted data block 2131, and the order of those map sub-entries 2513 may correspond to the order of the data sub-blocks 2133 within the corresponding encrypted data block 2131. Each such map sub-entry 2513 may include an indication of the size of the corresponding data sub-block 2133 and a hashed identifier indicative of the partition 2333 to which the data within the corresponding data sub-block 2133 belongs.

In such a partitioned embodiment, each partition 2333 may be given a unique label that provides a form of unique identification. However, just as the data within the data set 2330 may be any of a variety of types of data, the labels given to each partition 2333 may take any of a variety of forms, including and not limited to, numerical values and/or alpha-numeric text that may be of any arbitrary length. The hashed identifiers may be normalized versions of those labels, and may be generated in some embodiments by taking a hash of the labels, and/or by performing any of a variety of other functions on those labels in other embodiments.

Referring again to both FIGS. 14A and 14B, in various embodiments, the quantity of encrypted data blocks 2131 and/or of data sub-blocks 2133 may become relatively numerous that a relatively large quantity of storage space within the payload section 2113 may need to be allocated to accommodate a correspondingly large quantity of map entries 2511. In some embodiments, additional space for the storage of map entries 2511 beyond what can be accommodated within the storage space allocated to just the encrypted map base 2116 may be provided at one or more other locations within the payload section 2113.

More specifically, and referring to FIG. 14C, one or more encrypted map extensions 2118 (e.g., encrypted forms of the map extensions 2117) may be positioned among the encrypted map base 2116 and the encrypted metadata 2336, and/or may be interspersed among the encrypted data blocks 2131 within the payload section 1113. As depicted, the map entries 2511 that may otherwise be stored within the encrypted map base 2116 may, instead, be stored within the first of multiple encrypted map extensions 2118 to be stored within the payload section 2113 following the encrypted map base 2116. This may be done to make room within the encrypted map base 2116 for a series of extension pointers 2517 that each provide an indication of the location of one of the encrypted map extensions 2118 within the payload section 2113, and the order of the extension pointers 2517 within the encrypted map base 2116 may coincide with the order of the encrypted map extensions 2118 within the payload section 2113.

In some embodiments, each encrypted map extension 2118 may be required to be stored within the payload section 2113 at a location that is ahead of the locations of all of the encrypted data blocks 2131 for which the encrypted map extension 2118 includes map entries 2511 to enable more efficient retrieval of one or more of those encrypted data blocks 2131 from within the payload section 2113. Such a requirement may create an order of the encrypted map extensions 2118 within the data file 2110 that extends from the starting end of the payload section 2113 at which the encrypted map base 2116 may be located (which again, may be positioned towards the starting end 2112 of the file 2110), and to the opposite end of the payload section 2113. Thus, there may be an ordering of the encrypted map extensions 2118 from the encrypted map extension 2118 that is closest to the encrypted map base 2116 within the payload section 2113, and to the encrypted map extension 2118 that is furthest from the encrypted map base 2116. Thus, as depicted in FIG. 14C, the encrypted map extension 2118a is the closest one within the payload section 2113 to the encrypted map base 2116, and the encrypted map extension 2118b is the next one further away from the encrypted map base 2116.

In some embodiments, the encrypted map base 2116 and each of the encrypted map extensions 2118 may share a common size. In other embodiments, the encrypted map extension 2118 closest to the encrypted map base 2116 within the payload section 2113 (e.g. the encrypted map extension 2118a) may have a size that is double the size of the encrypted map base 2116, and each subsequent encrypted map extension 2118 within the payload section 2113 (e.g., each encrypted map extension 2118 that is the next one to be further away from the encrypted map base 2116 in the order of closest to furthest) may have a size that is double the size of the preceding encrypted map extension 2118 within the payload section 2113 (e.g., double the size of the encrypted map extension 2118 that is the next one to be closer to the encrypted map base 2116, such that the encrypted map extension 2118*b* may be double the size of the encrypted map extension 2118*a*). As a result, of such a scheme of increasing sizes of the map extensions 2118 (or as a result of any of a variety of similar such schemes), the size of the encrypted map extensions 2118 from the closest to the furthest may grow exponentially. Where such a predictable pattern of increasing size in the encrypted map extensions 2118 is used, there may be no need to store an indication within the encrypted map base 2116 of the sizes of each of the encrypted map extensions 2118.

As previously discussed in reference to FIGS. 14A-B, and as again depicted in FIG. 14C, at a pre-selected location within the data file 2110 that is at or towards the starting end of the payload section 2113 (which, again, may be positioned towards the starting end 2112 of the data file 2110) may be a few bytes of storage space that stores the map block encryption data 2119 made up of encryption information that was used to encrypt the map base 2115 to generate the encrypted map base 2116. As also previously discussed, a control device 2500 may later retrieve the map block encryption data 2119 for use in decrypting the encrypted map base 2116. Again, the map block encryption data 2119 may be subjected to an XOR operation and/or other technique(s) before storage within the data file 2110 to cause the map block encryption data 2119 to become at least somewhat less recognizable as being such encryption information. Thus, upon being retrieved for use in decrypting the encrypted map base 2116, the map block encrypt data 2119 may be subjected to a reversal of the XOR operation and/or other technique(s) before being so used.

As also previously discussed in reference to FIGS. 14A-B, and as also depicted in FIG. 14C, the metadata block encryption data 2339 made up of encryption information that was used to encrypt the metadata 2335 to generate the encrypted metadata 2336 may be stored at a predetermined location within the map base 2115 prior to encryption of the map base 2115 to generate the encrypted map base 2116. As also previously discussed, a control device 2500 may later retrieve the metadata encryption data 2339, following decryption of the encrypted map base 2116, to use the metadata encryption data 2339 to decrypt the encrypted metadata 2336.

As additionally depicted in FIG. 14C, the map block encryption data 2559*a* made up of encryption information that was used to encrypt the map extension 2117*a* to generate the encrypted map extension 2118*a* (e.g., the one closest to the encrypted map base 2116 within the payload section 2113) may be stored within the map base 2115 prior to encryption of the map base 2115 to generate the map base 2116. Also, the map block encryption data 2559*b* made up of encryption information that was used to encrypt the map extension 2117*b* to generate the encrypted map extension 2118*b* (e.g., the next one further away from the encrypted map base 2116) may be stored within the map extension 2117*a* prior to encryption of the map extension 2117*a* to generate the encrypted map extension 2118*a*. Further, the map block encryption data 2559*c* made up of encryption information that was used to encrypt the next map extension beyond the map extension 2117*b* may be stored within the map extension 2117*b* prior to encryption of the map extension 2117*b* to generate the encrypted map extension 2118*b*.

Thus, as depicted in FIG. 14C, and as previously discussed, the map block encryption data used in encrypting each block of the map data 2510 (except the map base 2115) may be stored within the preceding block of the map data 2510 (in an order that proceeds from the closest to the encrypted map base 2116 to furthest from the encrypted map base 2116 within the payload section 2113) so as to be encrypted along with the portion of the map data 2510 that is within the preceding block. In this way a chain of nested encryption of the blocks of the map data 2510 is formed, such that decryption of all of the map data 2510 must start with decrypting the encrypted map base 2116 to obtain the map base 2115 using the map block encryption data 2119. The decrypting must then proceed to the decryption of the encrypted map extension 2118*a* (e.g., the one closest to the encrypted map base 2116) to obtain the map extension 2117*a* using the map block encryption data 2559*a*. The decrypting must then continue to proceed, a block at a time of the map, by decrypting each subsequent encrypted map extension 2118 (e.g., each one that is the next further away from the encrypted map base 2116) to obtain each corresponding subsequent map extension 2117 using the map block encryption data 2559 retrieved through the decryption of the preceding encrypted map extension 2118. As may be appreciated by those skilled in the art, the formation of such a chain of nested encryption may add considerably to the difficulty of efforts that may be made to decrypt the encrypted data blocks 2131. Not only is the map data 2510, which is required to obtain the needed information of where each encrypted data block 2131 starts and ends within the data file 2110, but the formation of such a nested chain of encryption imposes a requirement that efforts to defeat the encryption of the map data 2510 must begin with the encrypted map base 2116, and must proceed in a particular order starting at the encrypted map base 2116 and proceeding through each encrypted map extension 2118, one at a time, and through one independent use of encryption after another.

Figure 15A:
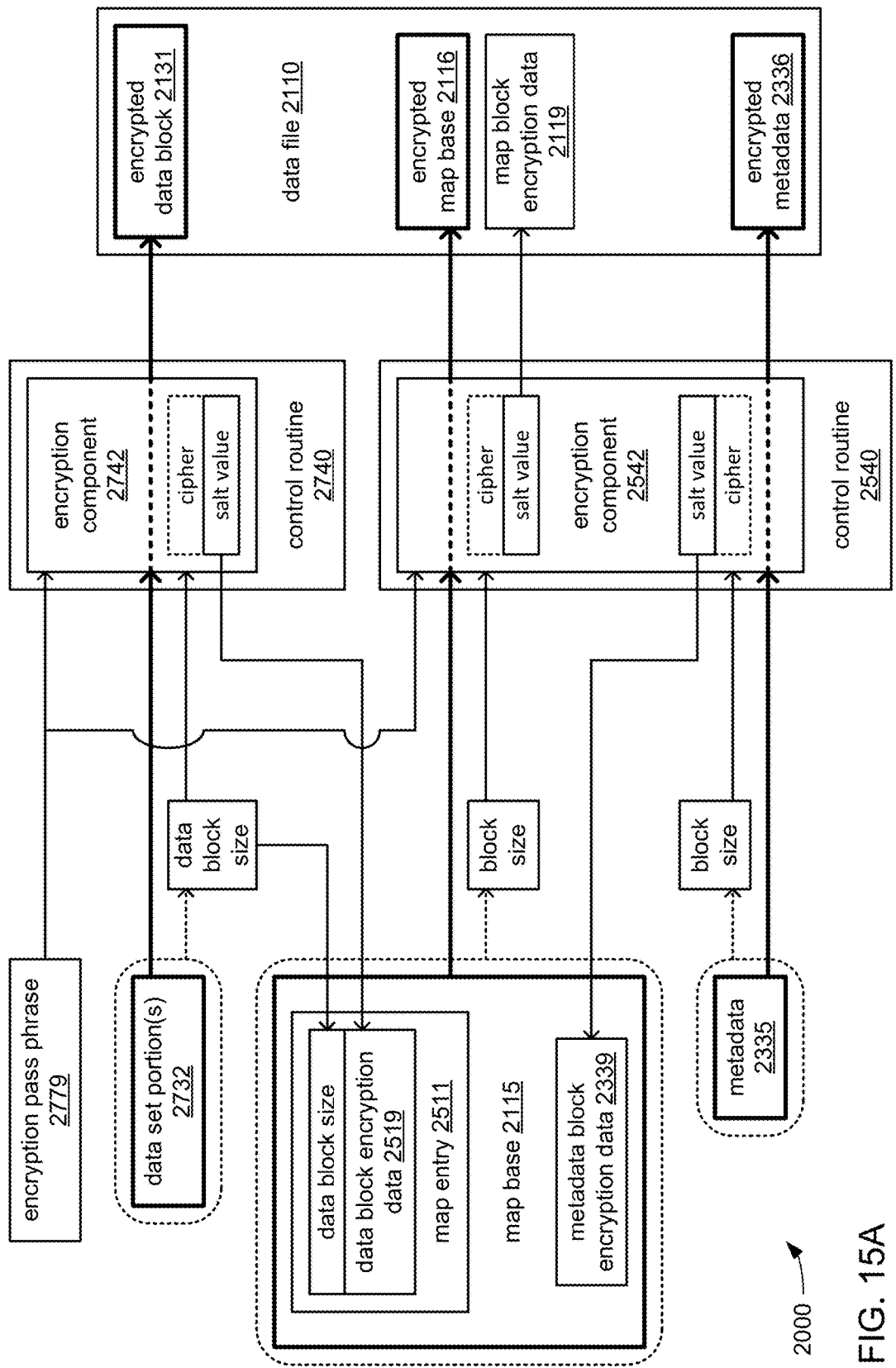
FIGS. 15A and 15B each illustrate an example embodiment of encryption of portions of a data set to generate encrypted blocks thereof.
Figure 15B:
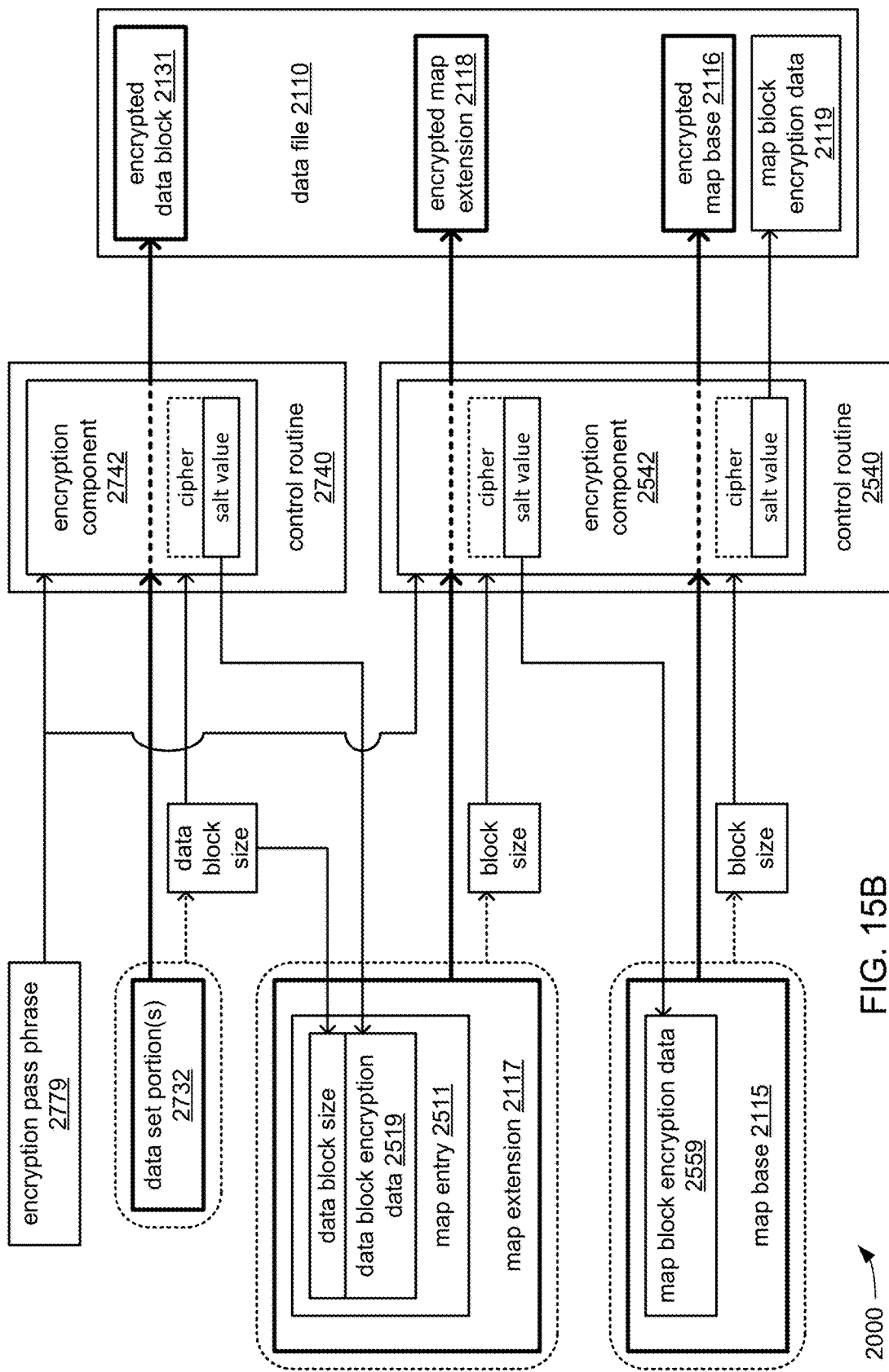

FIGS. 15A-B, together, illustrate an example of an order of encryption to be followed in encrypting blocks of the map data 2510 for storage as encrypted blocks of the map data 2510 within the data file 2110. FIG. 15A illustrates aspects of the order responsive to the map data 2510 not being divided into multiple blocks such that the map base 2115 is the only block of the map data 2510, and the map base 2115 is encrypted to generate the encrypted map base 2116 for storage within the data file 2110. FIG. 15B illustrates aspects of the order responsive to the map data 2510 being divided into multiple blocks such that the map base 2115 and the each of the multiple map extensions 2117 of the map data 2510 are encrypted to generate the encrypted map base 2116 and the multiple encrypted map extensions 2118, respectively, for storage within the data file 2110.

Referring to both FIGS. 15A-B, as recognizable to those skilled in the art, the control routines 2540 and 2740, including the components of which each is composed, are selected to be operative on whatever type of processor or processors that are selected to implement applicable ones of the processor components 2550 and/or 2750. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor components 2550 and/or 2750. Where one or more device drivers are included, those device drivers may provide support for any of a variety of other components, whether hardware or software components, of the node devices 2700 and/or the control device 2500 (or the controller 2507 incorporated into one of the node devices 2700).

As depicted, the control routine 2740 may include an encryption component 2742 to encrypt data set portions 2732. Correspondingly, the control routine 2540 may include an encryption component 2542 to encrypt blocks of the map data 2510 and/or the metadata 2335. In various embodiments of the distributed processing system 2000, and as previously discussed, any of a variety of encryption algorithms may be employed within the control device 2500 (if there is a control device 2500), the controller 2507 within one of the node devices 2700 (if there is such a controller 2507), and/or each of the node devices (if there are node devices 2700) to encrypt blocks of data of the data set 2330, the map data 2510 and/or the metadata 2335. However, in an example form of encryption depicted and discussed herein, a combination of an encryption pass phrase 2779 used throughout the encryption of all blocks associated with the data set 2330, a separate salt value that is separately generated for each such block that is so encrypted, and the size of each such block that is so encrypted are used as encryption inputs. More specifically, the the salt value separately generated for each block and the pass phrase 2779 may be used to generate an encryption cipher that may be used along with the size of the block to encrypt the block.

The salt value is separately randomly generated each time encryption is performed to generate an encrypted data block 2131, the encrypted map base 2116, an encrypted map extension 2119 or the encrypted metadata 2336 is performed. Thus, through the use of random and/or pseudo-random generation hardware and/or software within the control device 2500 and/or each of the node devices 2700, it is intended that a unique salt value be generated for each block of the data set 2330 and related information that is encrypted such that it is at least highly unlikely that any two of such blocks that are encrypted and stored within the data file 2110 will have been encrypted using the same salt value.

The encryption pass phrase 2779 may include one or more bytes of any of a variety of types of data, including and not limited to, a numerical value, a portion of text, a combination thereof, etc. An important characteristic of the pass phrase 2779 may be that it is securely maintained among the control device 2500 and/or the node devices 2700 within the distributed processing system 2000 for use in performing encryption and decryption operations, and is never transmitted outside the distributed processing system 2000, and is never provided to the one or more storage devices 2100. Thus, the pass phrase 2779 may never be stored alongside or within the data file 2110 in which the encrypted blocks of the data set 2330 and related information are stored. In some embodiments, the pass phrase 2779 may be securely maintained by the control device 2500 or another device (not shown) of the distributed processing system 2000 in such a manner in which it is made available under controlled circumstances only while encryption or decryption operations are performed. As a result, the security of the data set 2330, as stored in encrypted form within the data file 2110, may be enhanced since any decryption of the data set 2330 requires the use of the control device 2500 and/or the node devices 2700, which have access to the pass phrase 2779, unlike other processing systems outside the distributed processing system 2000 that do not.

Turning more specifically to FIG. 15A, where the map data 2510 is not divided such that there is only the map base 2115 to be encrypted and stored (as depicted in FIGS. 14A-B), the performance of encryption by the distributed processing system 2000 as part of storing the data set 2330 may begin with the encryption of data set portions 2732 to form corresponding encrypted data blocks 2131. As previously discussed, and as will be discussed further in greater detail, if the data of the data set 2330 is not partitioned, then each data set portion 2732 that has been generated and/or processed by a node device 2700 or a processor core 2555 may be encrypted to generate a corresponding one of the encrypted data blocks 2131. However, if the data of the data set 2330 is partitioned, then one or more data set portions 2732 that have been generated and/or processed by a node device 2700 or a processor core 2555 may be encrypted together as one or more corresponding data sub-blocks 2133 to generate a single one of the encrypted data blocks 2131.

Regardless of whether the data of the data set 2330 is partitioned, as previously discussed, the encryption component 2742 may randomly generate a separate salt value for use in each performance of encryption to generate one of the encrypted data blocks 2131. The encryption component 2742 may then use the pass phrase 2779, along with the salt value, to generate an encryption cipher for use only in such a performance of encryption. Then, as also previously discussed, the encryption cipher may be used, along with the total size of the one or more data set portions 2732 that are to be included, to actually perform the encryption of those one or more data set portions 2732, together, as one or more data sub-blocks 2133 to generate the encrypted data block 2131 for storage within the data file 2110.

The encryption cipher just used in the performance of encryption to generate the encrypted data block 2131 may be discarded. However, at least the total size of the one or more data set portions 2732 and the separately generated salt value used in generating the encrypted data block 2131 may be stored together within the map base 2115 as a map entry 2511 that corresponds to the encrypted data block 2131. As depicted, at least the salt value may be stored as the data block encryption data 2519 within that map entry 2511.

Similar actions may be taken by the encryption component 2542 to encrypt the metadata 2335. The encryption component 2542 may randomly generate a separate salt value for use in a performance of encryption to generate the encrypted metadata 2336. The encryption component 2542 may then use the pass phrase 2779, along with the salt value, to generate an encryption cipher for use only in this performance of encryption. Then, the encryption cipher may be used along with the size of the metadata 2335 to actually perform the encryption of the metadata 2335 to generate the encrypted metadata 2336 for storage within the data file 2110.

The encryption cipher just used in the performance of encryption to generate the encrypted metadata 2336 may be discarded. However, at least the separately generated salt value used in generating the encrypted metadata 2336 may be stored within the map base 2115 as the metadata block encryption data 2339. In some embodiments, the metadata 2335 may be of a predefined size such that its size is known, and therefore, it may be deemed unnecessary to consume space within the map base 2115 (or any other part of the map data 2510) to store an explicit indication of the size of the encrypted metadata 2336. By way of example, it may be that a predetermined amount of storage space is always allocated to the metadata 2335 regardless of its actual size. However, if the size of the metadata 2335 is not known and/or predetermined such that it is variable, then an indication of the size of the encrypted metadata 2336 may be stored within the map base 2115 along with the metadata block encryption data 2339.

Once the map base 2115 includes all of the map entries 2511 and the metadata block encryption data 2339, again, similar actions may be taken by the encryption component 2542 to encrypt the map base 2115. The encryption component 2542 may randomly generate a separate salt value for use in a performance of encryption to generate the encrypted map base 2116. The encryption component 2542 may then use the pass phrase 2779, along with the salt value, to generate an encryption cipher for use only in this performance of encryption. Then, the encryption cipher may be used along with the size of the map base 2115 to actually perform the encryption of the map base 2115 to generate the encrypted map base 2116 for storage within the data file 2110.

The encryption cipher just used in the performance of encryption to generate the encrypted map base 2116 may be discarded. However, as previously discussed, at least the separately generated salt value used in generating the encrypted map base 2116 may be stored within a predetermined location within the data file 2110 as the map block encryption data 2119. Again, as also previously discussed, the map block encryption data 2119 may be subjected to an XOR operation before being so stored. In some embodiments, the map base 2115 may be of a predefined size such that its size is known, and therefore, it may be deemed unnecessary to consume space within the data file 2110 to store an indication of the size of the encrypted map base 2116. By way of example, it may be that a predetermined amount of storage space is always allocated to the map base 2115 regardless of its actual size (e.g., regardless of the size of the portion of the map data 2510 therein). However, if the size of the map data 2115 is not known and/or predetermined such that it is variable, then an indication of the size of the encrypted map data 2116 may be stored within the data file 2110 along with the map block encryption data 2119.

Turning more specifically to FIG. 15B, where the map data 2510 is divided into the map base 2115 and the multiple map extensions 2117 (as depicted in FIG. 14C), the performance of encryption by the distributed processing system 2000 to store the data set 2330 may also begin with the encryption of data set portions 2732 to form corresponding encrypted data blocks 2131. As previously discussed, where there are the multiple map extensions 2117, the map entries 2511 may be stored within the multiple map extensions 2117, and not within the map base 2115.

Again, regardless of whether the data of the data set 2330 is partitioned, the encryption component 2742 may randomly generate a separate salt value for use in performing encryption to generate each encrypted data block 2131. The encryption component 2742 may then use the pass phrase 2779, along with the salt value, to generate an encryption cipher for use only in this performance of encryption. Then, again, the encryption cipher may be used, along with the total size of the one or more data set portions 2732 that are to be included, to actually perform the encryption of those one or more data set portions 2732, together, as one or more data sub-blocks 2133 to generate the encrypted data block 2131 for storage within the data file 2110.

The encryption cipher just used in the performance of encryption to generate the encrypted data block 2131 may be discarded. However, at least the total size of the one or more data set portions 2732 and the separately generated salt value used in generating the encrypted data block 2131 may be stored together within one of the multiple map extensions 2117 (only one of which is depicted for sake of clarity) as a map entry 2511 that corresponds to the encrypted data block 2131. As depicted, at least the salt value may be stored as the data block encryption data 2519 within that map entry 2511.

Again, similar actions may be taken by the encryption component 2542 to encrypt the metadata 2335. However, for sake of clarity, the performance of encryption to generate the encrypted metadata 2336 from the metadata 2335, as well as the storage of the metadata block encryption data 2339 within the map base 2115, are not shown in FIG. 15B.

Once the multiple map extensions 2117 include all of the map entries 2511, again, similar actions may be taken by the encryption component 2542 to encrypt each map extension 2117 to generate a corresponding encrypted map extension 2118, one at a time, and in an order that creates a chain of nested encryption among the resulting encrypted map extensions 2118. In some embodiments, the formation of such a chain of nested encryption may begin with the encryption of the map extension 2117 that includes the most recently generated map entries 2511 such that its corresponding encrypted map extension 2118 is to be positioned furthest from the encrypted map base 2116 in the payload section. The formation of such a chain of nested encryption may then proceed, one map extension 2117 at a time, and toward the map extension 2117 that includes the earliest generated map entries 2511 such that its corresponding encrypted map extension 2118 is to be positioned closest to the encrypted map base 2116 within the payload section 2113. The formation of such a chain of nested encryption may then end with encryption of the map base 2115 to generate the encrypted map base 2116, which as previously discussed, may be positioned toward a starting end of the payload section 2113 (e.g., toward the starting end 2112 of the data file 2110). As previously discussed, as each map extension 2117 is encrypted in such an order (best shown in FIG. 14C), the map block encryption data 2559 generated from its encryption is stored within the next one of the map extensions 2117 that is to be encrypted, with the exception that the map block encryption data 2559 generated from the encryption of the map extension 2117 that includes the earliest map entries 2511 (such that its encryption generates the encrypted map extension 2118 that is closest to the encrypted map base 2116) is stored within the map base 2115 prior to the encryption of the map base 2115 to generate the encrypted map base 2116. Thus, in this way, and as previously discussed, the resulting chain of nested encryption is formed among the multiple map extensions 2117 and the map base 2115, and extends from the resulting encrypted map base 2116, to the one of the encrypted map extensions 2118 that is furthest from the encrypted map base 2116, and through the intervening ones of the encrypted map extensions 2118 in the order of their relative proximities to the encrypted map base 2116.

In so doing, the encryption component 2542 may randomly generate a separate salt value for use in a performance of encryption to generate each encrypted map extension 2118. The encryption component 2542 may then use the pass phrase 2779, along with the salt value, to generate an encryption cipher for use only in this performance of encryption. Then, the encryption cipher may be used along with the size of the map extension 2117 to actually perform the encryption of the map extension 2117 to generate the encrypted map extension 2118 for storage within the data file 2110.

Thus, the encryption cipher used in each performance of encryption to generate each one of the encrypted map extensions 2118 may be discarded. However, at least the separately generated salt value used in generating each encrypted map extension 2118 may be stored as map block encryption data 2559 within the next map extension 2117 to be encrypted (e.g., stored within the map extension 2117 from which the next closest encrypted map extension 2118 to the encrypted map base 2116 will be generated) The one exception may be the separately generated salt value used in generating the encrypted map extension 2118 that will be the closest one to the encrypted map base 2116, where the separately generated salt value may be stored as map block encryption data 2559 within the map base 2115 (prior to encryption of the map base 2115). In some embodiments, each of the map extensions 2117 may be of a predefined size such as the predetermined exponentially increasing sizes previously discussed. As a result, it may be deemed unnecessary to consume space within the map base 2115 or anywhere else within the data file 2110 to store an indication of the size of each of the encrypted map extensions 2118. However, if the size of one or more of the map extensions 2117 is not known and/or predetermined such that it is variable, then an indication of the size of its corresponding encrypted map extension 2118 may be stored within the next one of the map extensions 2117 to be encrypted and/or within the map base 2115.

The encryption of the map base 2115 may be performed in much the same manner as was discussed in reference to FIG. 15A.

Figure 16A:
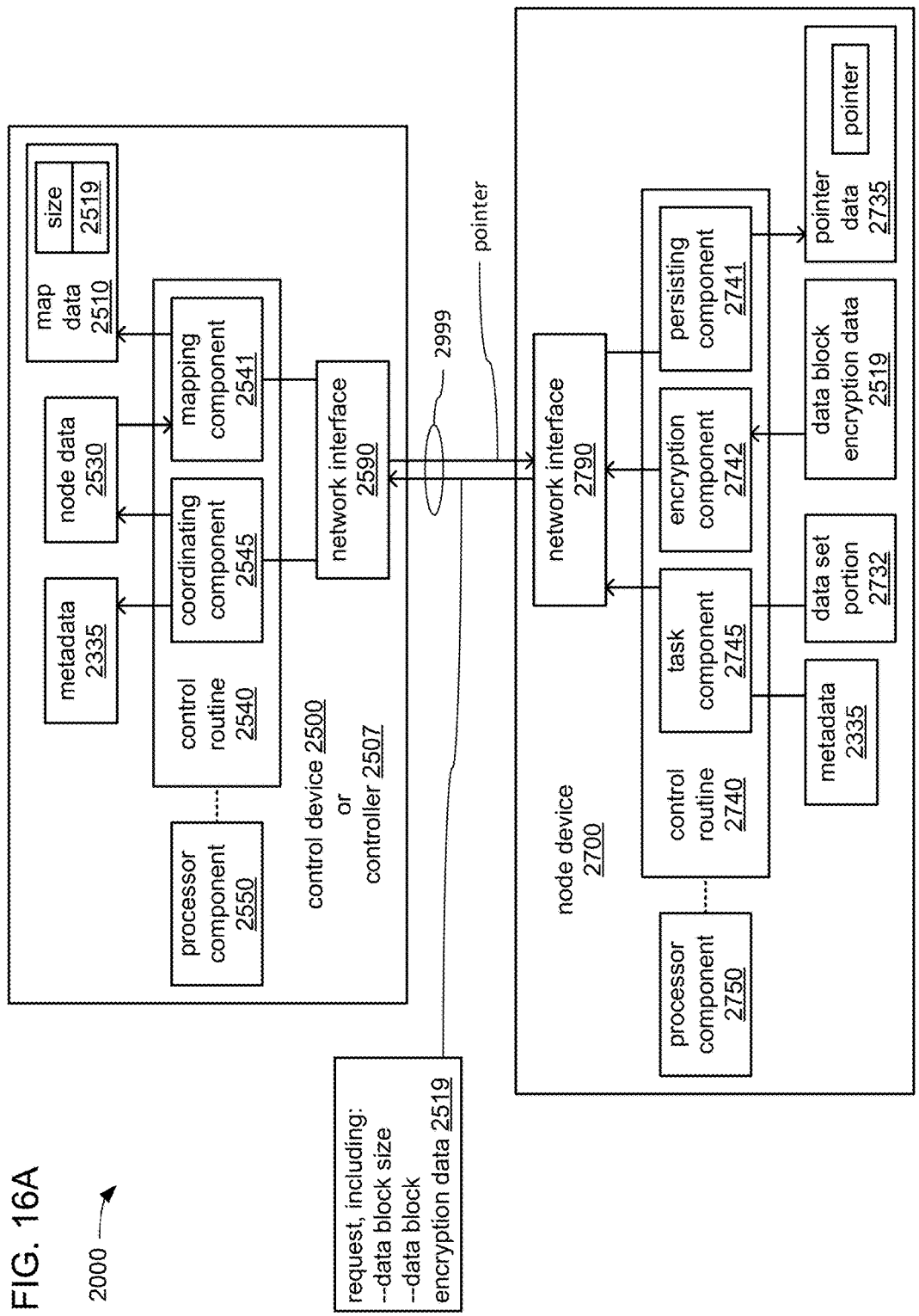
FIGS. 16A, 16B, 16C, 16D and 16E, together, illustrate an example of storing encrypted data blocks of non-partitioned data of a data set.
Figure 16B:
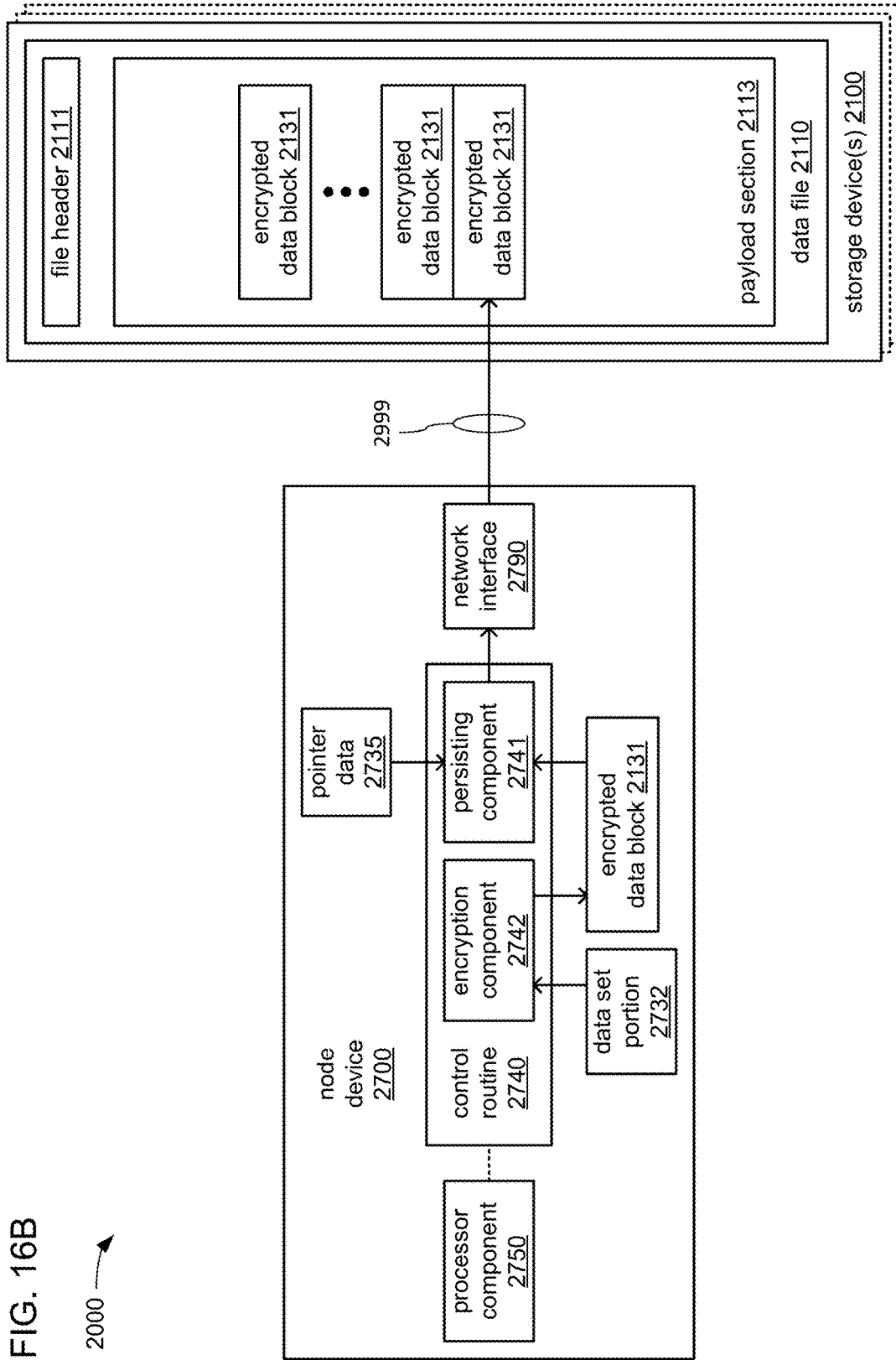
Figure 16C:
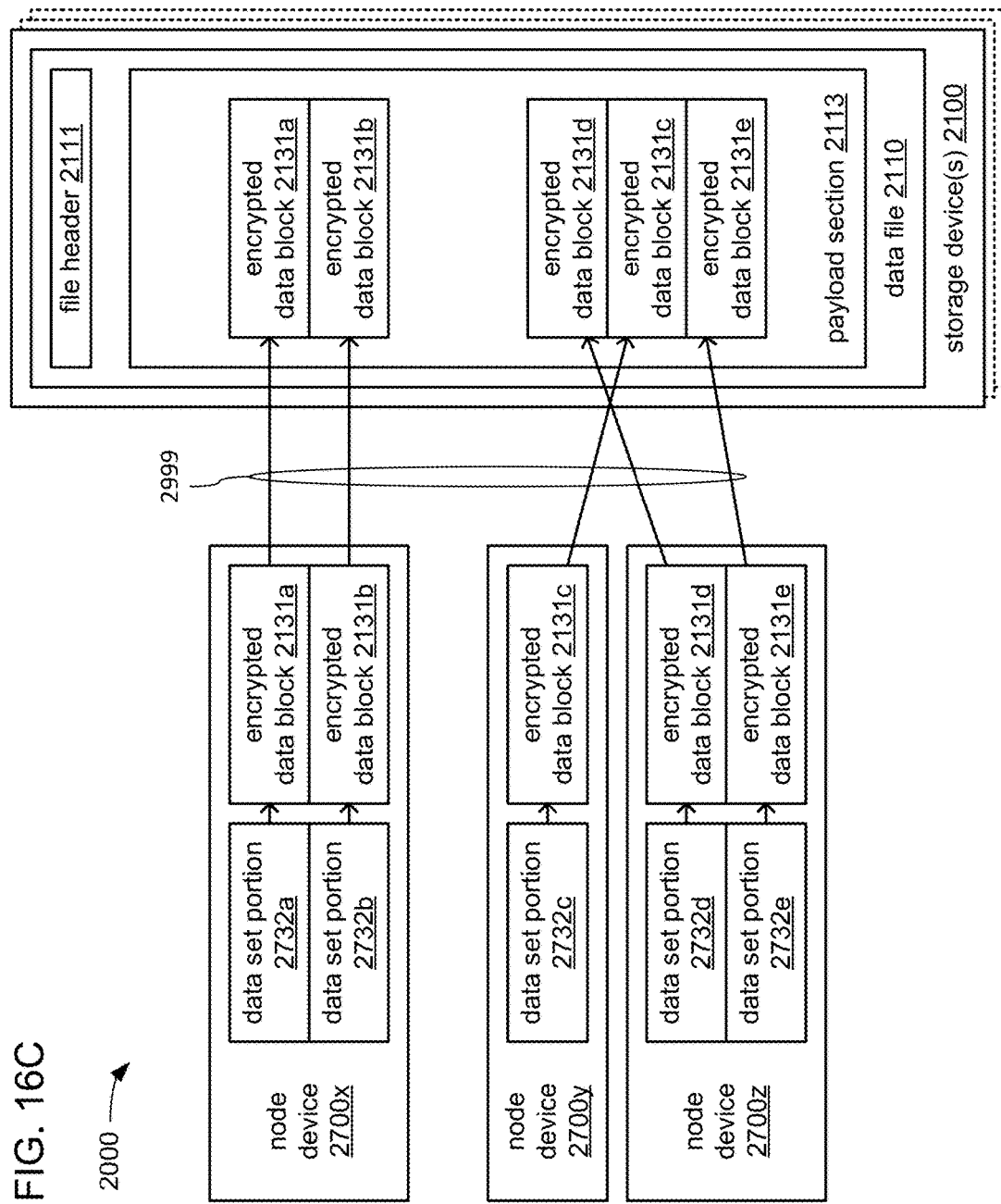
Figure 16D:
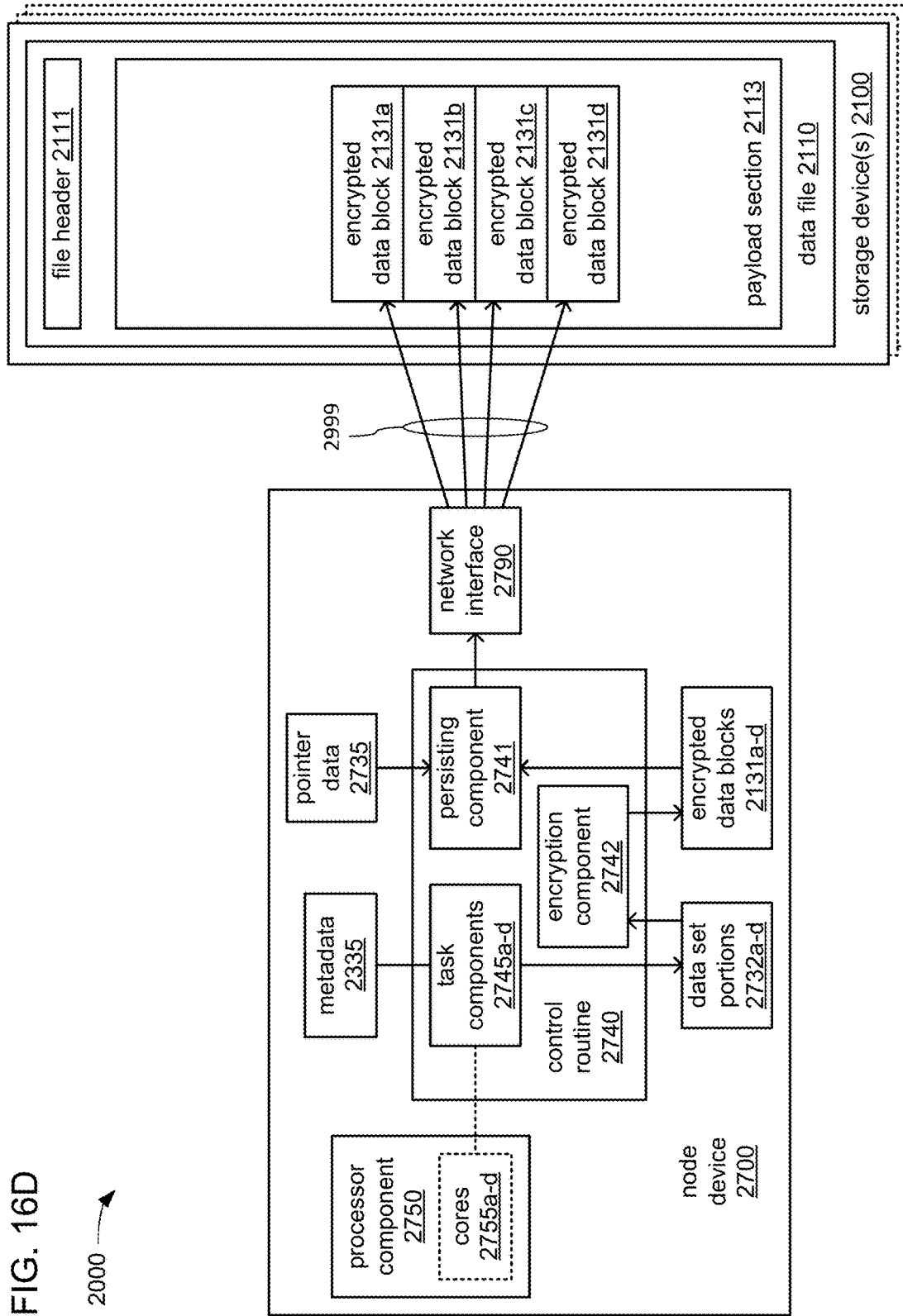
Figure 16E:
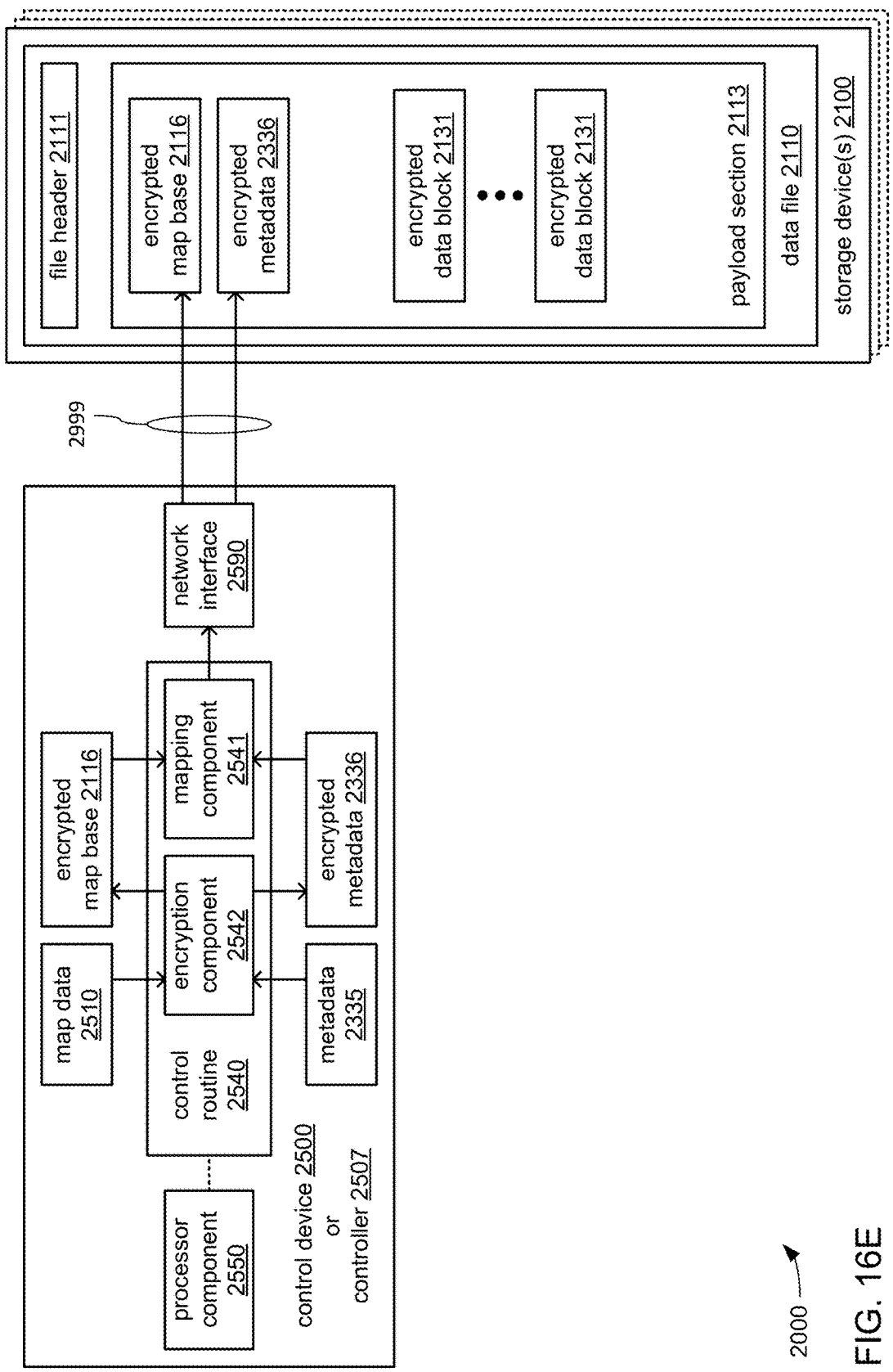

FIGS. 16A-E, together, illustrate an example of encrypting and storing the data set 2330 where the data set 2330 is made up of non-partitioned data in embodiments of the distributed processing system 2000 of FIG. 13A, 13B or 13C in greater detail. More specifically, FIGS. 16A and 16B, together, depict aspects of the encryption and storage of a single data set portion 2732 as an encrypted data block 2131. FIG. 16C depicts aspects of the encryption and storage of multiple data set portions 2732 by multiple node devices 2700. FIG. 16D depicts aspects of the encryption and storage of multiple data set portions 2732 by a single node device 2700 incorporating a processor component 2750 with multiple processor cores. FIG. 16E depicts aspects of the encryption and storage of the metadata 2335 and the map data 2510 by the control device 2500 or the controller 2507.

It should be noted that, in embodiments of the distributed processing system 2000 that do not include multiple node devices 2700 that may each incorporate the processor component 2750 to execute an instance of the control routine 2740, there may be multiple instances of the control routine 2740 that are separately executed in separate threads of execution provided by multiple processor cores 2555 of one or more of processor component 2550 within the control devices 2500. As a result, the coordination about to be discussed between the node devices 2700 and the control device 2500 via the network 2999 may, instead, be performed among multiple ones of the processor cores 2555 of one or more processor component 2550 within the control device 2500.

Turning to FIG. 16A, as depicted, the control routine 2740 may include a task component 2745 to perform processing tasks as directed by the control device 2500, and a persisting component 2741 to effect storage of a data set portion 2732 that may have been generated through a performance of a task by the task component 2745. Correspondingly, the control routine 2540 may include a coordinating component 2545 to coordinate the at least partially parallel distributed performances of various tasks among multiple ones of the node devices 2700, and a mapping component 2541 to coordinate the at least partially parallel and distributed performances of storage and retrieval of data set portions 2732 by the multiple ones of the node devices 2700.

In some embodiments, upon completion of a processing task involving a data set portion 2732 of the data set 2330, the task component 2745 may operate the network interface 2790 of the node device 2700 to transmit an indication of such completion to the control device 2500 via the network 2999. In embodiments in which the completed task includes the generation of the data set portion 2732, the task component 2745 may transmit at least a portion of the metadata 2335 that describes aspects of the organization of data within the data set portion 2732 to the control device 2500 via the network 2999. Also, in response to such completion of the processing task by the task component 2745, the persisting component 2741 may operate the network interface 2790 to transmit a request to the control device 2500 for a pointer to a location within the payload section 2113 of the data file 2110 (see FIG. 14A) at which to store an encrypted data block 2131 generated from the data set portion 2732. Further, in response to such completion of the processing task by the task component 2745, the encryption component 2742 may operate the network interface 2790 to transmit an indication of the size of the encrypted data block 2131 corresponding to the data set portion 2732, along with the data block encryption data 2519 generated by the encryption component 2742 for use in encrypting the data set portion 2732 to generate the encrypted data block 2131.

Within the control device 2500, the coordinating component 2545 may operate the network interface 2590 to recurringly monitor for received indications of the status of node devices 2700, and may maintain indications of the current state of each node device 2700 as part of the node data 2530. In response to receiving the indication of completion of the processing task involving the data set portion 2732 from the node device 2700, the coordinating component 2545 may update an indication of the current status of the node device 2700 within the node data 2530 to reflect such completion. Additionally, the mapping component 2541 may operate the network interface 2590 to recurringly monitor for requests for pointers. In response to receiving the request for a pointer from the node device 2700 for use in storing the encrypted data block 2131 generated from the data set portion 2732, the mapping component 2541 may employ indications earlier stored within the map data 2510 of portions of the payload section 2113 that have already been allocated to identify a location within the payload section 2113 at which the encrypted data block 2131 may be stored. The mapping component 2541 may then operate the network interface 2590 to transmit a pointer to that identified location back to the node device 2700 via the network 2999.

The mapping component 2541 may then also update the map data 2510 by adding a new map entry 2511 (see FIG. 14A) that includes an indication of where the encrypted data block 2131 generated from the data set portion 2732 is to be stored within the payload section 2113 to enable the subsequent identification of another location within the payload section 2113 at which another encrypted data block 2131 generated from another data set portion 2732 may be stored, and for which another pointer may be provided in response to another request from another node device 2700. The new map entry 2511 may include an indication of the size of the encrypted data block 2131 and/or may include the data block encryption data 2519 used to generate the encrypted data block 2131.

In response to receiving the pointer transmitted from the control device 2500 in response to the earlier transmitted request for a pointer, the persisting component 2741 may store an indication of the received pointer within the pointer data 2735. Turning to FIG. 16B, as depicted, the encryption component 2742 may perform the encryption of the data set portion 2732 to generate the encrypted data block 2131. The persisting component 2741 may then operate the network interface 2790 to transmit the encrypted data block 2131 to the one or more storage devices 2100 along with a command to the one or more storage devices 2100 to store the encrypted data block 2131 at the location within the payload section 2113 that is specified by the pointer. It should be noted that although FIG. 16B depicts an example of the node device 2700 encrypting and storing just the single data set portion 2732 of non-partitioned data as the single encrypted data block 2131, other embodiments are possible in which the node device 2700 may encrypt and store multiple data set portions 2732 of non-partitioned data.

Turning to FIG. 16C, as depicted, embodiments are possible in which at least one of multiple node devices 2700 (e.g., the depicted node device 2700y) encrypts and stores a single data set portion 2732 of an embodiment of the data set 2330 made up of non-partitioned data as a single encrypted data block 2131, while at least one other of the multiple node devices 2700 (e.g., the depicted node devices 2700x and 2700z) encrypts and stores multiple data set portions 2732 thereof as corresponding multiple encrypted data blocks 2131. Also depicted in FIG. 16C is an example of how the timing of the transmitting of requests to the control device 2500 for pointers may result in interspersing of encrypted data blocks 2131 from different node devices 2700 within the payload section 2113. More specifically, upon completion of performing one or more processing tasks involving data set portions 2732a and 2732b, the depicted node device 2700x may have requested a pair of pointers to a pair of adjacent locations within the payload section 2113 at which to store the data set portions 2732a and 2732b as adjacent encrypted data blocks 2131a and 2131b. Alternatively, upon completion of such performance, the node device 2700x may have requested a single pointer to a single location within the payload section 2113 large enough thereat to store both of the data set portions 2732a and 2732b as the adjacent encrypted data blocks 2131a and 2131b.

In contrast, upon completion of performing one or more processing tasks involving data set portion 2732d, and before completion of the same one or more processing tasks involving data set portion 2732e, the depicted node device 2700z may have requested a single pointer to a single location within the payload section 2113 at which to store the data set portion 2732d as encrypted data block 2131d. Then, before the node device 2700z is able to complete such processing involving data set portion 2732e and/or request another single pointer to another single location within the payload section 2113 at which to store the data set portion 2732e as encrypted data block 2131e, the depicted node device 2700y may complete such processing of data set portion 2732c and may request a pointer to a location within the payload section 2113 at which to store the data set portion 2732c as the encrypted data block 2131c. As a result, the node device 2700y may be provided with a pointer for use in storing the data set portion 2732c as the encrypted data block 2131c before the node device 2700z is provided with a pointer for use in storing the data set portion 2732e as the encrypted data block 2131e. This may lead to the encrypted data block 2131c being stored at a location within the payload section 2113 that is interposed between the locations at which the encrypted data blocks 2131d and 2131e are stored.

It should be noted that the timing by which requests for pointers are received at the control device 2500 and/or by which the control device 2500 transmits the requested pointers back to the ones of the node devices 2700 that requested them does not necessarily control the timing by which corresponding data set portions 2732 are stored within the payload section 2113 as their respective ones of the encrypted data blocks 2131. More specifically, any of a variety of factors may cause one node device 2700 to more quickly make use of a received pointer to a location within the payload section 2113 than another node device 2700. Thus, a data set portion 2732 for which a pointer was later received may at least begin to be stored before another data set portion 2732 for which a pointer was received earlier.

Turning to FIG. 16D, a single node device 2700 may output the depicted multiple data set portions 2732a-d as a result of performing multiple instances of a processing task at least partially in parallel within the single node device 2700 in which each instance generates one of the multiple data set portions 2732a-d. More specifically, as depicted, each of multiple instances of the task component 2745a-d may be executed in a separate thread of execution by the processor component 2750 of the single node device 2700, and/or the processor component 2750 may incorporate multiple cores 2755a-d that are each capable of executing one of the instances of the task component 2745a-d independently of the others. Thus, in such embodiments, the single one of the node devices 2700 may internally function in a manner akin to multiple ones of the node devices 2700 in generating the multiple data set portions 2732a-d.

In some of such embodiments, the multiple instances of the task component 2745a-d may be capable of coordinating thereamong to the extent of causing the persisting component 2741 to combine what might otherwise be multiple separate requests for multiple separate pointers into a single request for a single pointer for all of the multiple data set portions 2732a-d. The persisting component 2741 may then operate the network interface 2790 to transmit such a single request to the control device 2500 for a single pointer for use in storing all of the multiple data set portions 2732a-d as adjacently located encrypted data blocks 2131a-d within the payload section 2113. Such combining into a single request in which the multiple data set portions 2732a-d are then caused to be encrypted and stored adjacently almost as if they were a single encrypted data block 2131 may be deemed advantageous by allowing the one or more storage devices 2100 to determine a relatively optimal organization of the storage thereof among the one or more storage devices 2100 based on the configuration of storage components therein, including and not limited to, a relatively optimal splitting of that effective single encrypted data block 2131 among more than one storage component. The fact of the multiple data set portions 1732a-d also being transmitted by the depicted node device 1700 as if they were a single encrypted data block 2131 may also allow some degree of optimization in the transmission to be arrived at between the depicted node device 2700 and the one or more storage devices 2100, thereby addressing possible issues of contention among the node devices 2700 as each acts at least partially in parallel to store one or more encrypted data blocks 2131.

In some of such embodiments, the single request for a pointer may specify only a single size that is a sum of the sizes of all of the encrypted data blocks 2131a-d to be generated from the data set portions 2732a-d. However, in others of such embodiments, the single request may separately specify the separate sizes of each of the data set portions 2732a-d, and may additionally include separate data block encryption data 2519 generated for the separate encryption of each of the data set portions 2732a-d to generate a corresponding one of the encrypted data blocks 2131a-d. In still other embodiments, the multiple instances of the task component 2745a-d may not be capable of such coordination (or may simply have not been architected to engage in such coordination) such that each causes the persisting component 2741 to transmit a separate request for a separate pointer for use in separately storing each of the multiple data set portions 2732a-d as a corresponding one of the encrypted data blocks 2131a-d. As discussed with regard to FIG. 16C, the use of such separate requests for pointers may result in the multiple data set portions 2732a-d being stored as corresponding ones of the encrypted data blocks 2131a-d within the payload section 2113 in a manner that is not contiguous.

Turning to FIG. 16E, following the provision of pointers for the storage of all data set portions 2732 of the non-partitioned embodiment of the data set 2330, the encryption component 2542 may encrypt the map data 2510 to generate the encrypted map base 2116, or to generate a combination of the encrypted map base 2116 and the multiple encrypted map extensions 2118. As previously discussed in reference to FIG. 14C, where the map data 2510 becomes large enough to exceed a predetermined threshold in size, the map data 2510 may be divided into the map base 2115 and the multiple extensions 2117. The encryption component 2542 may also encrypt the metadata 2335 to generate the encrypted metadata 2336. The mapping component 2541 may operate the network interface 2590 to transmit the encrypted map base 2116 or the combination of the encrypted map base 2116 and the multiple encrypted map extensions 2118 to the one or more storage devices 2100 for storage within the payload section 2113. Correspondingly, the mapping component 2541 may also operate the network interface 2590 to transmit the encrypted metadata 2336 to the one or more storage devices 2100.

In some embodiments, the mapping component 2541 may operate the network interface 2590 to recurringly monitor for indications from each node device 2700 of not needing to request any more pointers from the control device 2500. In such embodiments, the mapping component 2541 may delay the encryption and storage of at least the map data 2510 until indications have been received from all of the multiple node devices 2700 involved in processing the data set 2330 that there will be no more requests for pointers. However, in embodiments in which each of the node devices 2700 is required to request only a single pointer for all data set portions 2732 that are to be encrypted and stored by that node device 2700, the control device 2500 may determine whether there are more data set portions 2732 for which pointers remain to be requested based on whether or not a single request for a pointer has been received from every one of the node devices 2700 involved in processing the data set 2330. Thus, in such embodiments, exchanges of information between the control device 2500 and the node devices 2700 through the network 2999 for purposes of coordinating at least the storage of the data set 2330 may advantageously be further minimized by elimination of the need for exchanges of explicit indications of whether there are more data set portions 2732 for which pointers remain to be requested.

Figure 17A:
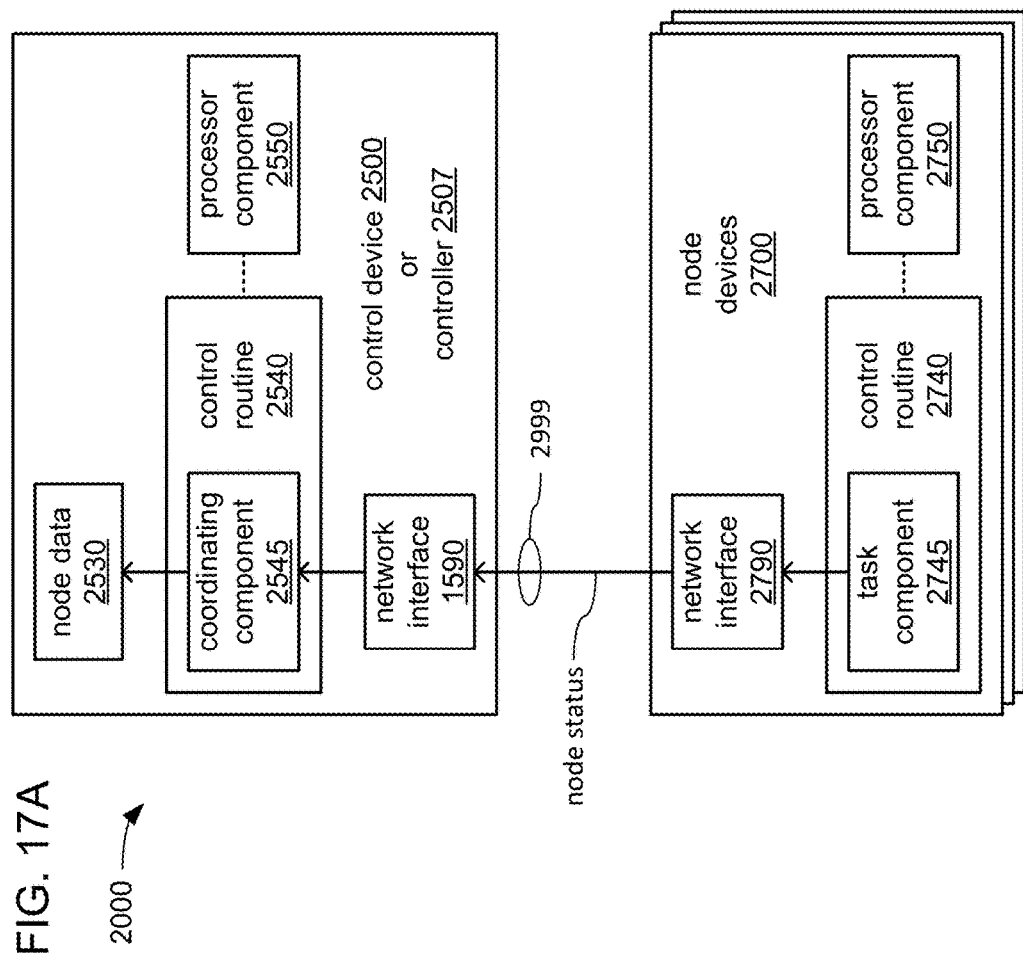
FIGS. 17A, 17B, 17C, 17D and 17E, together, illustrate an example of retrieving encrypted data blocks of non-partitioned data of a data set.
Figure 17B:
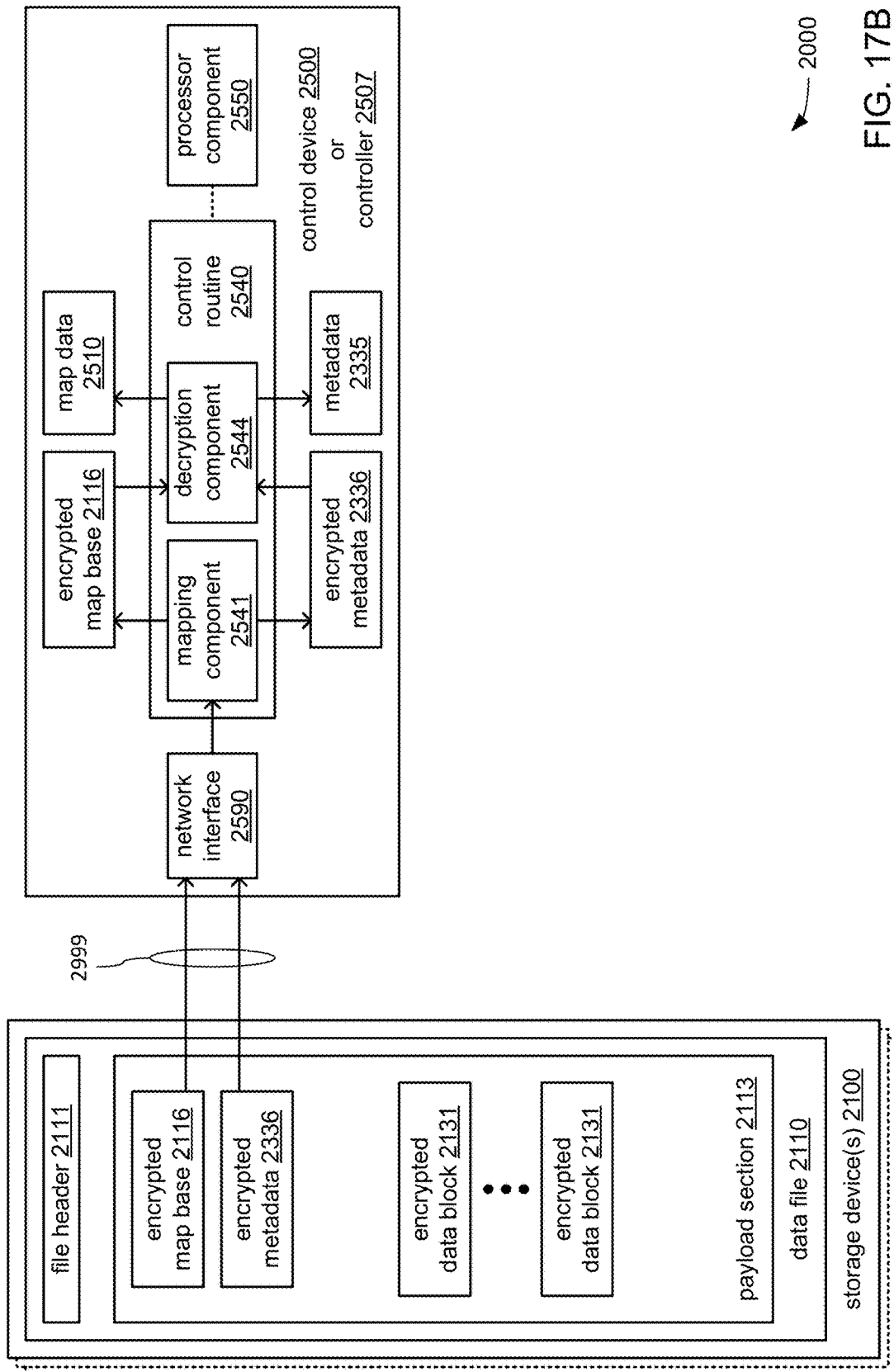
Figure 17C:
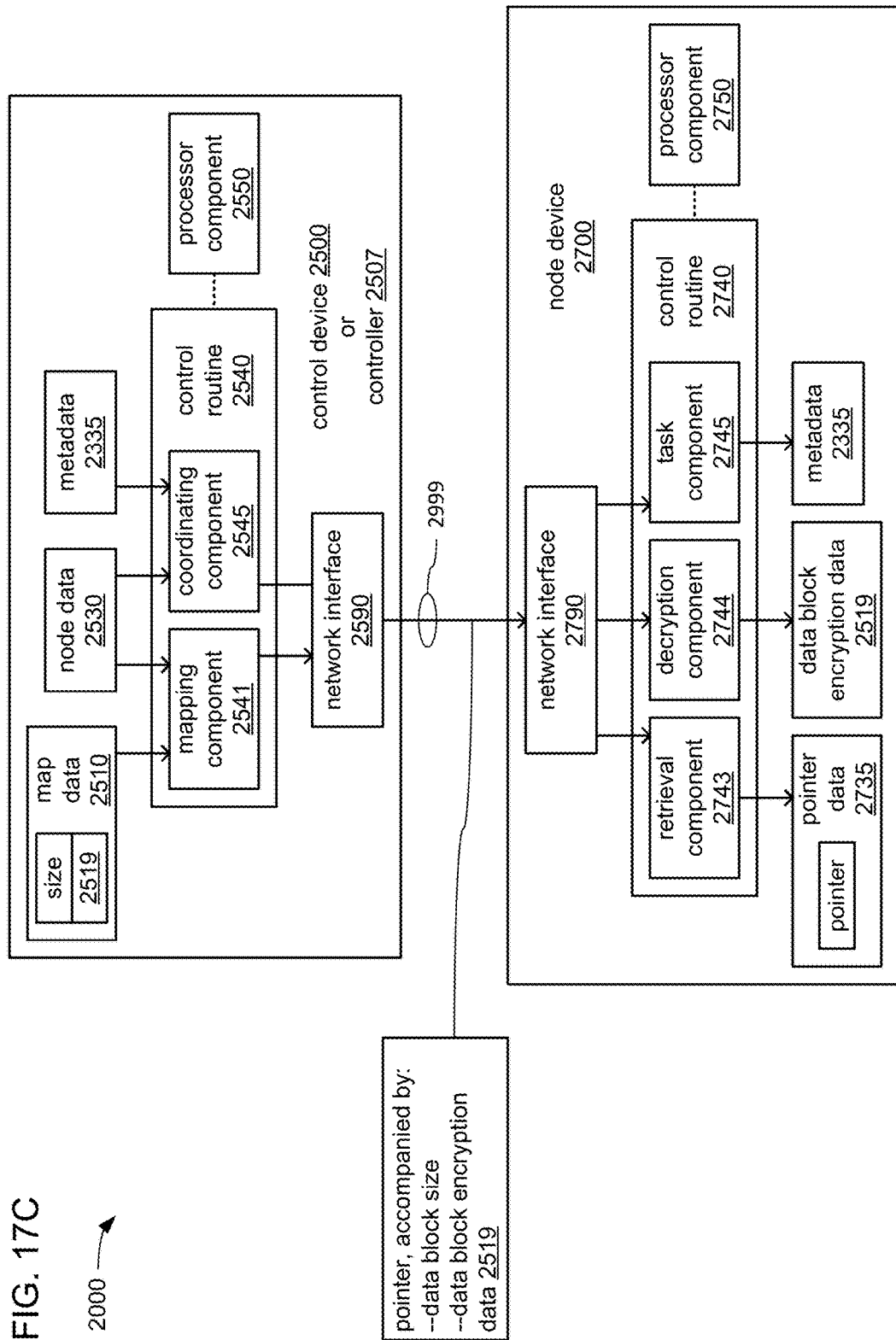
Figure 17D:
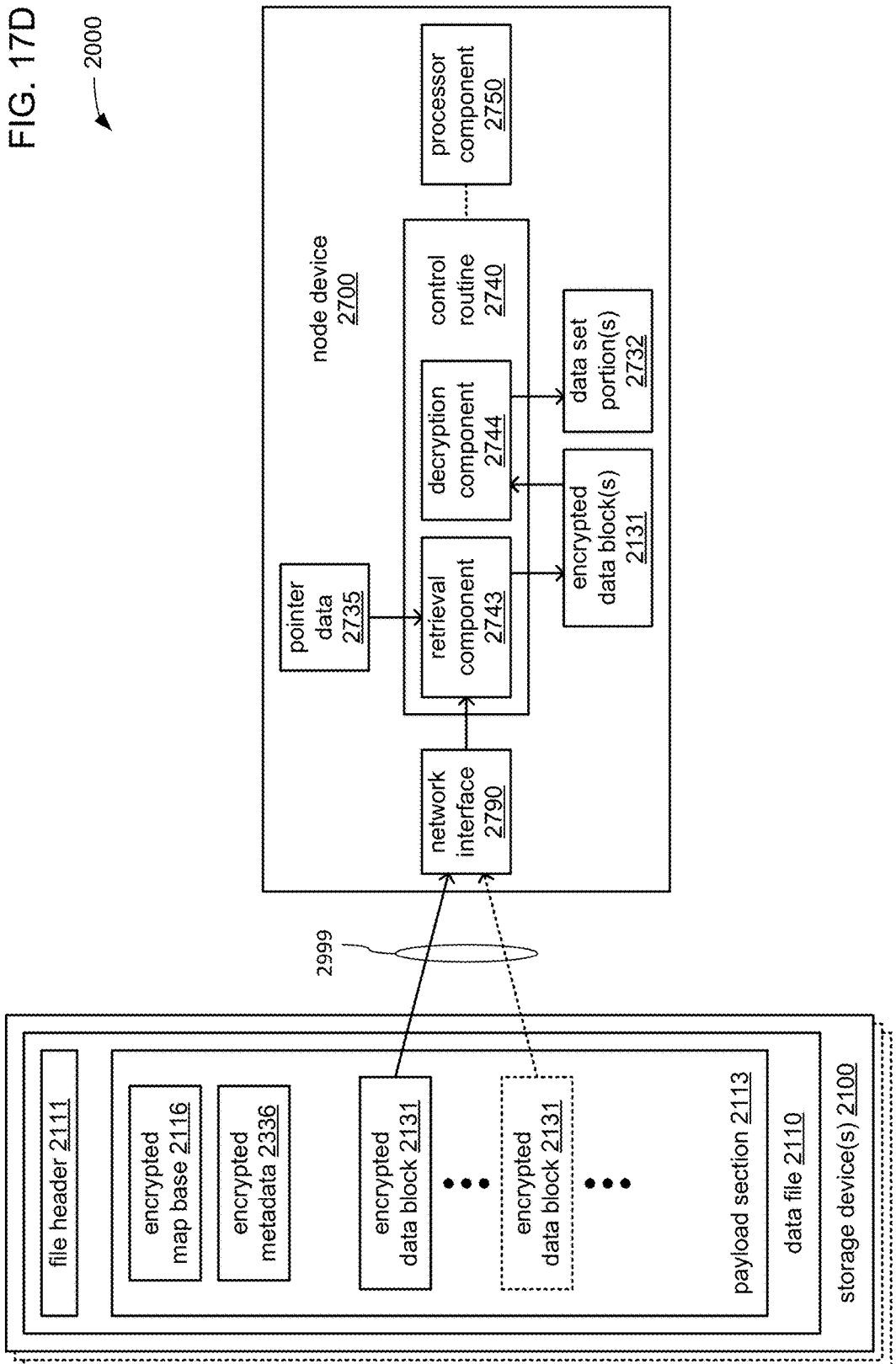
Figure 17E:
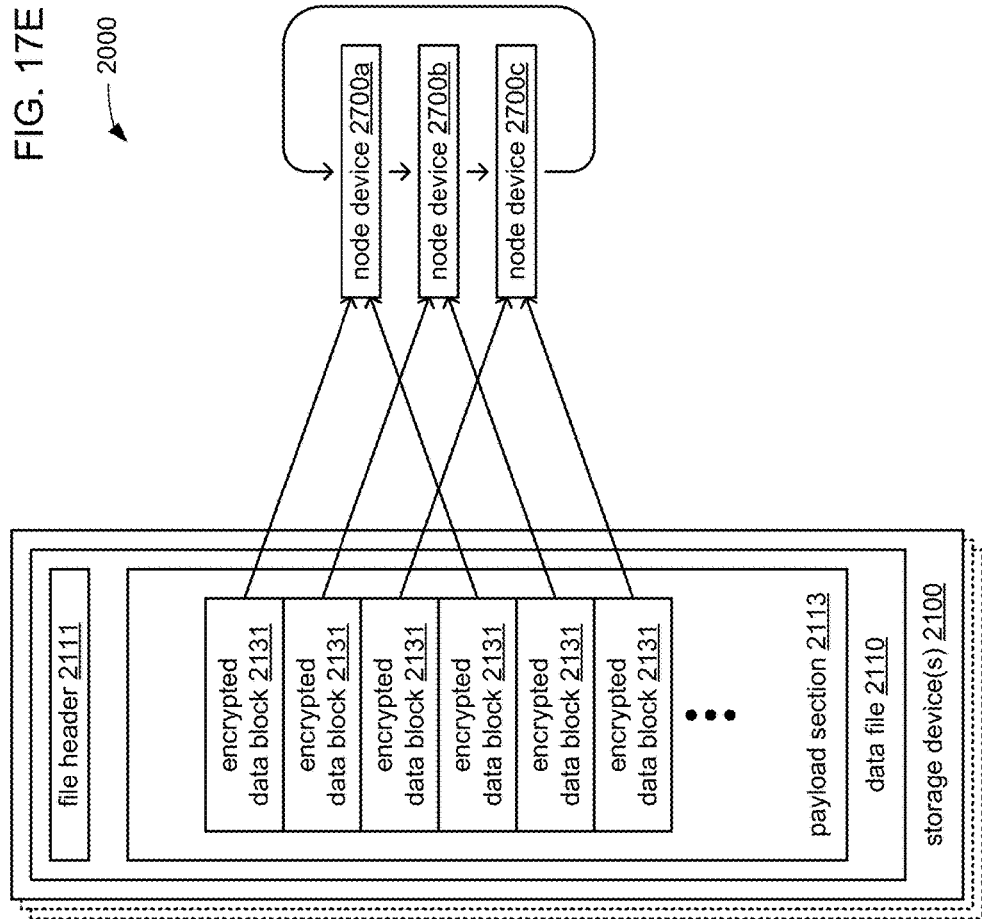

FIGS. 17A-E, together, illustrate an example of retrieving the data set 2330 where the data set 2330 is made up of non-partitioned data in embodiments of the distributed processing system 2000 of FIG. 13A, 13B or 13C in greater detail. More specifically, FIGS. 17A and 17B, together, depict aspects of the collection of information needed by the control device 2500 to determine a distribution of encrypted data blocks 2131 among available ones of the node devices 2700. FIG. 17C depicts aspects of the transmission of pointers to available ones of the node devices 2700. FIG. 17D depicts aspects of the retrieval of one or more encrypted data blocks 2131 by a single node device 2700. FIG. 17E depicts aspects of an approach to effecting a relatively balanced distribution of the encrypted data blocks 2131 among available ones of the node devices 2700.

It should be noted that, in embodiments of the distributed processing system 2000 that do not include multiple node devices 2700 that may each incorporate the processor component 2750 to execute an instance of the control routine 2740, there may be multiple instances of the control routine 2740 that are separately executed in separate threads of execution provided by multiple processor cores 2555 of one or more of processor component 2550 within the control devices 2500. As a result, the coordination about to be discussed between the node devices 2700 and the control device 2500 via the network 2999 may, instead, be performed among multiple ones of the processor cores 2555 of one or more processor component 2550 within the control device 2500.

Turning to FIG. 17A, within each node device 2700 of multiple node devices 2700, the task component 2745 may operate the network interface 2790 to recurringly transmit indications of the current status of the node device 2700 to the control device 2500 via the network 2999. Such recurring transmissions may convey an indication of the availability of the node device 2700 to perform tasks on one or more portions of a data set.

Within the control device 2500, the coordinating component 2545 may operate the network interface 2590 to recurringly monitor for received indications of the status of node devices 2700, and may maintain and recurringly update indications of the current state of each node device 2700 as part of the node data 2530. More specifically, the coordinating component 2545 may recurringly monitor for indications of whether each node device 2700 of the multiple node devices 2700 is available to be assigned to perform operations on a portion of a data set as part of a distributed and at least partially parallel performance of a processing task involving multiple portions of a data set, such as the embodiment of the data set 2330 made up of non-partitioned data.

Turning to FIG. 17B, as depicted, the control routine 2540 may include a decryption component 2544 to decrypt earlier encrypted blocks of the map data 2510 and/or of the metadata 2335. As part of retrieving the non-partitioned data of such an embodiment of the data set 2330, the mapping component 2541 may operate the network interface 2590 to retrieve the encrypted map base 2116 (and any accompanying encrypted map extensions 2118—see FIG. 14C) via the network 2999 from the payload section 2113 of the data file 2110 stored within the one or more storage devices 2100. The decryption component 2544 may then decrypt the encrypted map base 2116 (and any accompanying encrypted map extensions 2118) to generate the map base 2115 (and any corresponding map extensions 2117). As previously discussed, the map base 2115 (and any accompanying map extensions 2117) may provide a map of the manner in which the multiple data set portions 2732 of the data set 2330 are stored within the payload section 2113 as multiple encrypted data blocks 2131. The mapping component 2541 may store such a map as the map data 2510.

Additionally, the mapping component 2541 may operate the network interface 2590 to retrieve the encrypted metadata 2336 via the network 2999 from the payload section 2113. The decryption component 2544 may then decrypt the encrypted metadata 2336 to generate the metadata 2335 that describes aspects of the organization of the data within the data set 2330.

Turning to FIG. 17C, as depicted, the coordinating component 2545 may refer to the recurringly updated indications of status of multiple node devices 2700 in the node data 2530 to determine which ones of the multiple node devices 2700 are currently available to decrypt one or more of the encrypted data blocks 2131 to generate one or more corresponding data set portions 2732 of the data set 2330, and then perform a processing task on the one or more corresponding data set portions 2732. The coordinating component 2545 may then operate the network interface 2590 to transmit an indication of what the processing task is to be performed to the available ones of the node devices 2700 via the network 2999. In so doing, the coordinating component 2545 may also distribute copies of at least a portion of the metadata 2335 to each of those available node devices 2700.

Additionally, the mapping component 2541 may operate the network interface 2590 to transmit, to the available ones of the node devices 2700, one or more pointers to encrypted data blocks 2131 within the payload section 2113. In so doing, the mapping component 2541 may refer to the map data 2510 to identify the locations within the payload section 2113 at which each of the pointers point to enable retrieval of the encrypted data blocks 2131 therefrom. In some embodiments, the mapping component 2541 may derive such locations for each encrypted data block 2131 within the payload section 2113, at least in part, by summing the sizes specified in the map data 2510 for all the encrypted data blocks 2131 that precede each encrypted data block 2131. The mapping component 2541 may receive indications of which ones of the multiple node devices 2700 are the available ones from the coordinating component 2545 or may directly retrieve such indications from the node data 2530. Each transmission of a pointer may include an indication of the size of the encrypted data block(s) 2131 pointed to by that pointer to enable each of the available ones of the node devices 2700 to retrieve the correct amount of data when retrieving each of the encrypted data blocks 2131 from the payload section 2113. Each transmission of a pointer may also include the data block encryption data 2519 needed to decrypt the data block(s) 2131 pointed to by that pointer to generate unencrypted corresponding data set portions 2732 therefrom.

Within each node device 2700, the task component 2745 may operate the network interface 2790 to recurringly monitor for received indications from the control device 2500 of a task to perform, and may locally store any portion of the metadata 2335 received via the network 2999 for use in performing such a task. As depicted, the control routine 2740 may additionally include a retrieval component 2743 and a decryption component 2744. The retrieval component 2743 may operate the network interface 2790 to recurringly monitor for any transmissions of pointers from the control device 2500 via the network 2999, and may store any such received pointers as part of the pointer data 2735. Correspondingly, the decryption component 2744 may operate the network interface 2790 to recurringly monitor for any transmissions of data block encryption data 2519 from the control device for use in decrypting encrypted data blocks 2131. The retrieval component 2743 may effect retrieval of one or more encrypted data blocks 2131 from the payload section 2113 for decryption by the decryption component 2744 to generate corresponding one or more data set portions 2732 for use in the performance of a task by the task component 2745. In decrypting each of the encrypted data blocks 2131 so retrieved, the decrypting component 2744 may employ the data block encryption data 2519 provided by the control device 2500 to decrypt that particular encrypted data block 2131.

Turning to FIG. 17D, which depicts a single example one of the available node devices 2700, in response to receiving one or more pointers to one or more encrypted data blocks 2131 within the payload section 2113, the retrieval component 2743 may operate the network interface 2790 to retrieve the one or more encrypted data blocks 2131 from the payload section 2113. In so doing, the retrieval component 2743 may transmit one or more commands to the one or more storage devices 2100 to provide the one or more data blocks 2131, employing the one or more pointers and/or the accompanying indications of size to specify the one or more encrypted data blocks 2131 to be provided by the one or more storage devices 2100. The retrieval component 2743 may locally store each of the retrieved encrypted data blocks 2131 for the decryption component 2744 to decrypt to generate corresponding one or more data set portions 2732 for use by the task component 2745 in performing the task specified to the node device 2700 by the control device 2500.

How many of the encrypted data blocks 2131 are retrieved by each of the available ones of the node devices 2700 from the payload section 2113 may be determined by the manner in which pointers to the encrypted data blocks 2131 are distributed among the available ones of the node devices 2700 by the control device 1500. Turning to FIG. 17E, in some embodiments, the pointers may be distributed in a round robin manner to the available ones of the node devices 2700. It should be noted that FIG. 14E depicts a relatively simplistic example of distribution of among only three node devices 2700a-c in a round robin manner for purposes of illustration. It is envisioned that a considerably greater quantity of node devices 2700 would more likely be used. This approach may be deemed desirable due to its simplicity of implementation and/or as an approach to distributing the encrypted data blocks 2131 among the available ones of the node devices 2700 in relatively similar quantities.

Figure 18A:
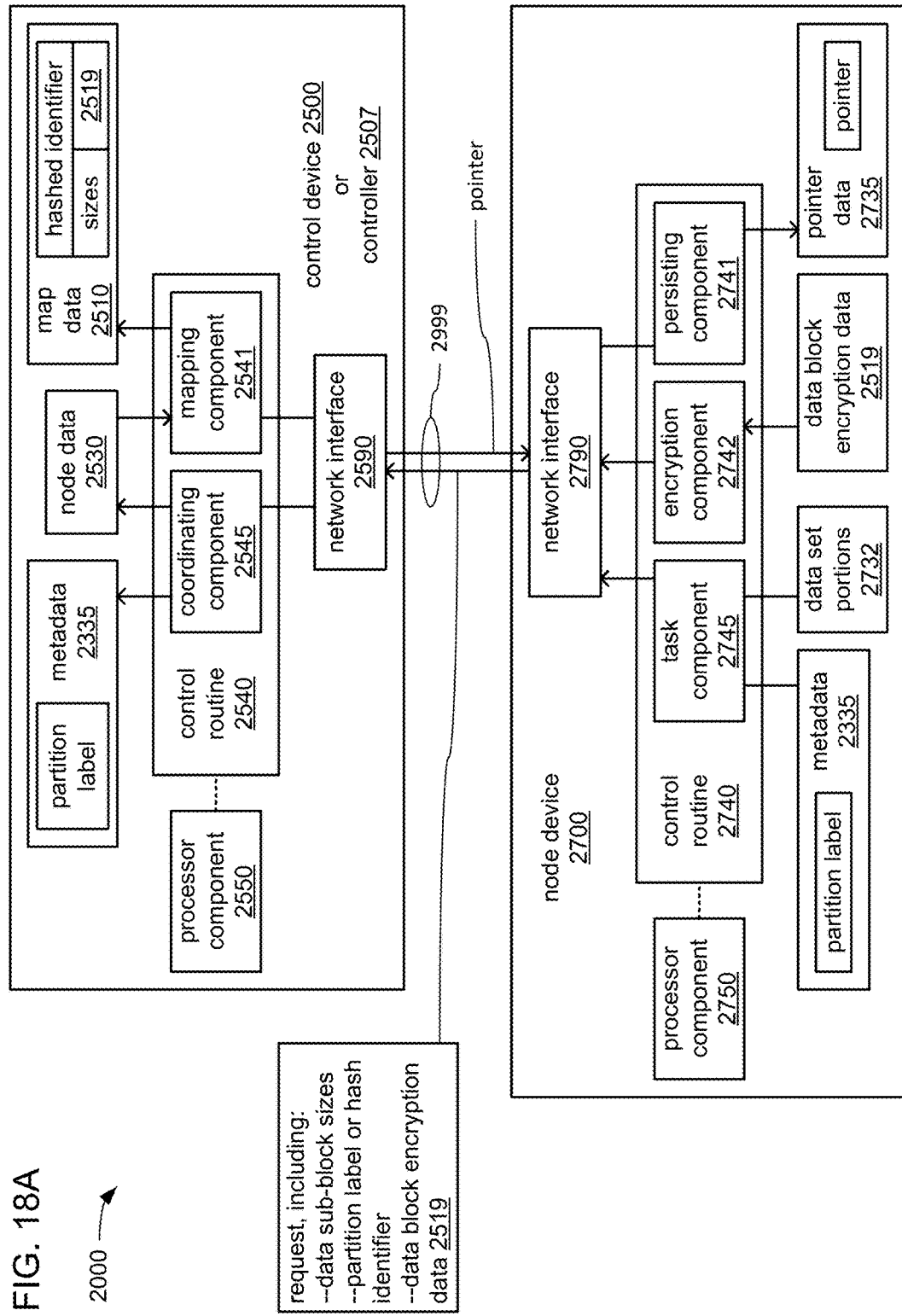
FIGS. 18A, 18B, 18C, 18D and 18E, together, illustrate an example of storing encrypted data blocks of partitioned data of a data set.
Figure 18B:
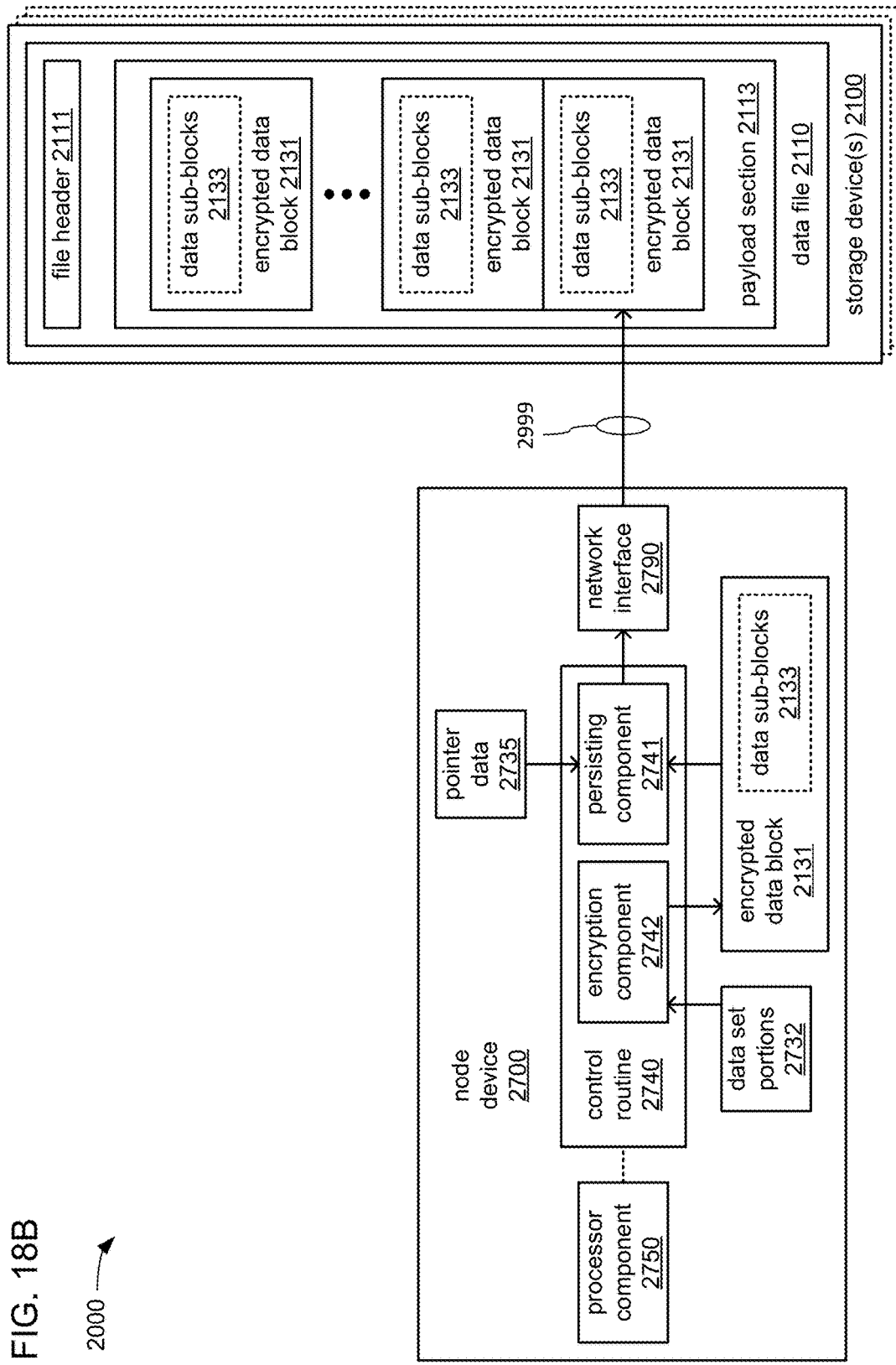
Figure 18C:
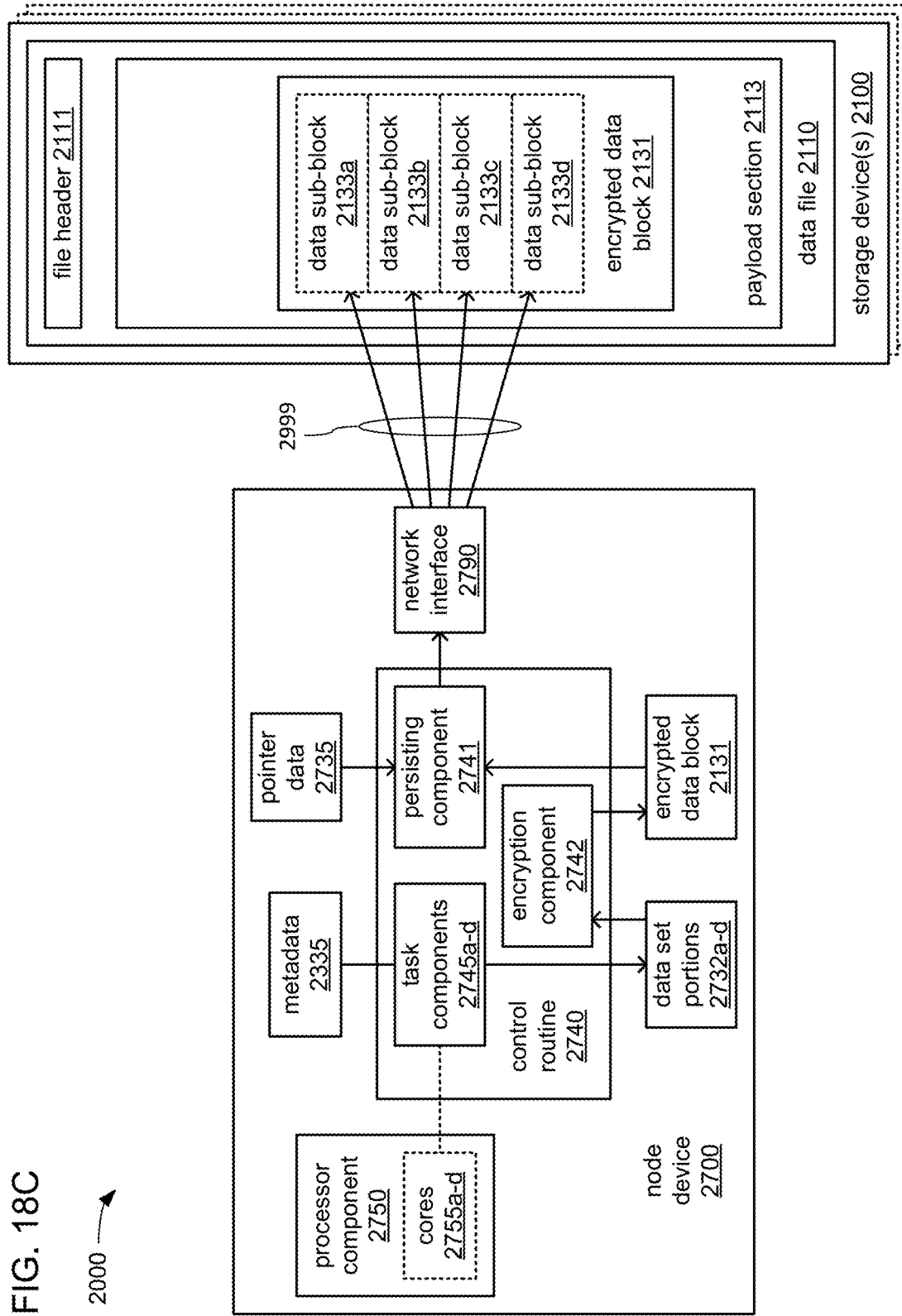
Figure 18D:
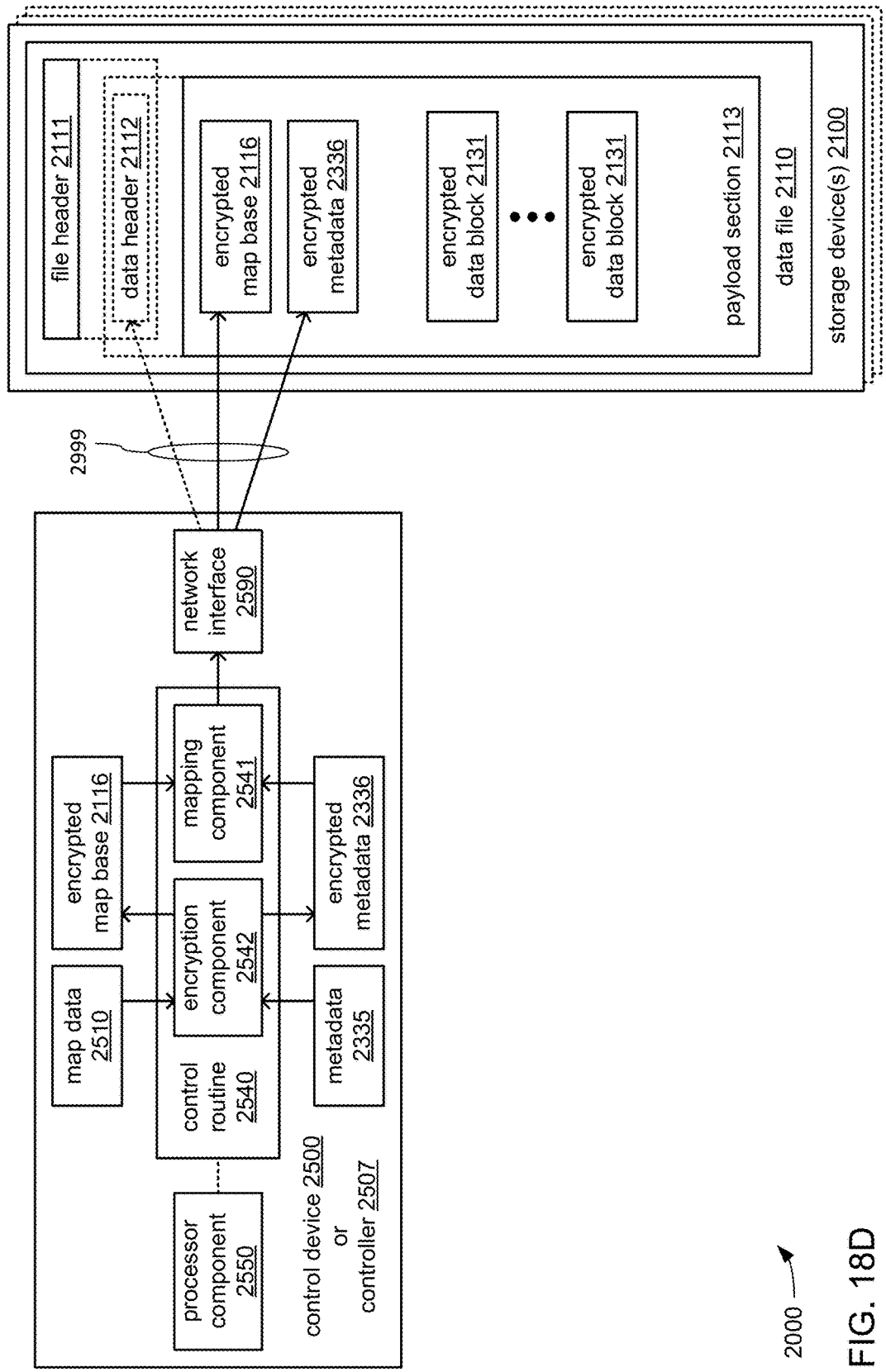
Figure 18E:
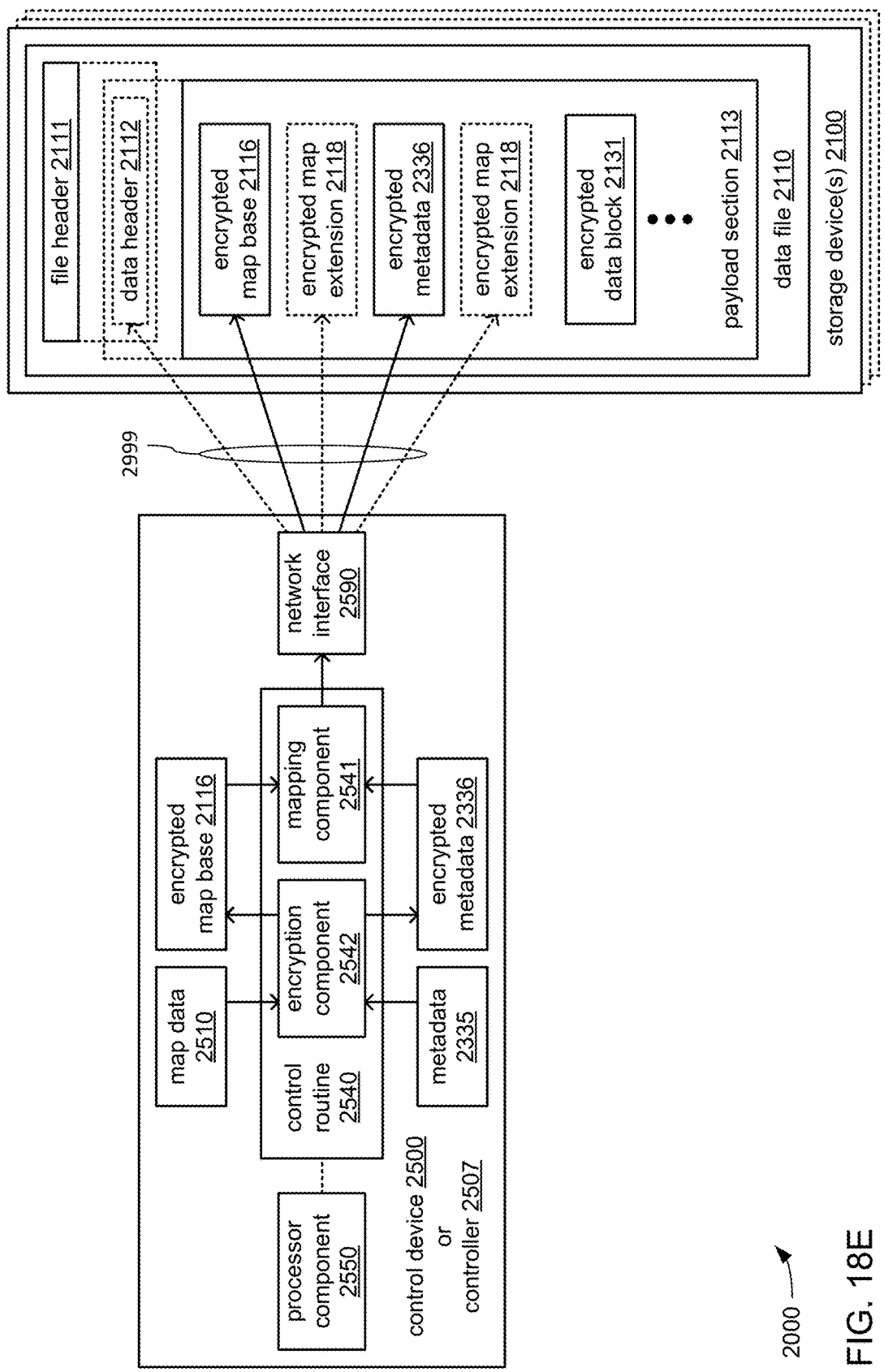

FIGS. 18A-E, together, illustrate an example of storing the data set 2330 where the data set 2330 is made up of partitioned data in embodiments of the distributed processing system 2000 of FIG. 13A, 13B or 13C in greater detail. More specifically, FIGS. 18A and 18B, together, depict aspects of the encryption and storage of multiple data set portions 2732 as an encrypted data block 2131. FIG. 18C depicts aspects of the storage of multiple data set portions 2732 by a single node device 2700 incorporating a processor component 2750 with multiple processor cores. FIGS. 18D and 18E, together, depict aspects of the encryption and storage of the map data 2510 by the control device 2500 or the controller 2507.

It should be noted that, in embodiments of the distributed processing system 2000 that do not include multiple node devices 2700 that may each incorporate the processor component 2750 to execute an instance of the control routine 2740, there may be multiple instances of the control routine 2740 that are separately executed in separate threads of execution provided by multiple processor cores 2555 of one or more of processor component 2550 within the control devices 2500. As a result, the coordination about to be discussed between the node devices 2700 and the control device 2500 via the network 2999 may, instead, be performed among multiple ones of the processor cores 2555 of one or more processor component 2550 within the control device 2500.

Turning to FIG. 18A, in some embodiments, upon completion of a processing task involving one or more data set portions 2732 of the data set 2330, the task component 2745 may operate the network interface 2790 of the node device 2700 to transmit an indication of such completion to the control device 2500 via the network 2999. In embodiments in which the completed task includes the generation of the one or more data set portions 2732, the task component 2745 may transmit, to the control device 2500 via the network 2999, at least a portion of the metadata 2335 that describes aspects of the organization of data within each of the one or more data set portions 2732, including which partition 2333 (see FIG. 14B) that each of the one or more data set portions 2732 belongs to. Also, in response to such completion of the processing task by the task component 2745, the persisting component 2741 may operate the network interface 2790 to transmit a request to the control device 2500 for a pointer to a location within the payload section 2113 of the data file 2110 (see FIG. 14B) at which to store an encrypted data block 2131 generated from the one or more data set portions 2732.

Further, in transmitting the request for a pointer to the control device 2500, the persisting component 2741 may transmit an indication of the size of each of the one or more data set portions 2732 and/or of the encrypted data block 2131 that is to be generated from the one or more data set portions 2732, into which each of the one or more data set portions 2732 is to be incorporated as a data sub-block 2133. Further, for each data set portion 2732 to be so incorporated into the encrypted data block 2131, the persisting component 2741 may additionally transmit a hashed identifier that is indicative of the partition 2333 to which the data set portion 2732 belongs. Where all of the one or more data set portions 2732 belong to the same partition 2333, the same hashed identifier may be indicated in the request for all of the one or more data set portions 2732. However, where different ones of the one or more data set portions belong to different partitions 2333, different hashed identifiers may be indicated for different ones of the one or more data set portions 2732. The persisting component 2741 may generate such hashed identifiers from the unique labels provided to each of one or more partitions 2333 of the partitioned data. In such embodiments, the persisting component 2741 may take a hash of (or perform any of a variety of other normalization operations with) the partition label of the partition 2333 to which each of the one or more data set portions 2732 belongs to generate the corresponding hashed identifier.

Within the control device 2500, the coordinating component 2545 may operate the network interface 2590 to recurringly monitor for received indications of the status of node devices 2700, and may maintain indications of the current state of each node device 2700 as part of the node data 2530. In response to receiving the indication of completion of the processing task involving the one or more data set portions 2732 from the node device 2700, the coordinating component 2545 may update an indication of the current status of the node device 2700 to reflect such completion within the node data 2530. Additionally, the mapping component 2541 may operate the network interface 2590 to recurringly monitor for requests for pointers. In response to receiving the request for a pointer from the node device 2700 for use in storing the encrypted data block 2131 generated from the one or more data set portions 2732, the mapping component 2541 may employ indications earlier stored within the map data 2510 of portions of the payload section 2113 that have already been allocated to the storage of other encrypted data blocks 2131 to identify a location within the payload section 2113 at which the encrypted data block 2131 generated from the one or more data set portions 2732 may be stored. The mapping component 2541 may then operate the network interface 2590 to transmit a pointer to that identified location back to the node device 1700 via the network 1999.

The mapping component 2541 may then also update the map data 2510 by adding a new map entry 2511 (see FIG. 14B) that includes an indication of where the encrypted data block 2131 generated from the data set portions 1732 is to be stored within the payload section 2113 to enable the subsequent identification of another location within the payload section 2113 at which another encrypted data block 2131 generated from still other data set portions 2732 may be stored, and for which another pointer may later be provided in response to another later request from another node device 2700. The new map entry may include an indication of the size of the encrypted data block 2131 and/or may include the data block encryption data 2519 used to generate the encrypted data block 2131. For each of the data set portions 2732 from which the encrypted data block 2131 is generated (such that each is incorporated therein as a data sub-block 2133), the mapping component 2541 may add a corresponding map sub-entry 2513 that may include an indication of the size of the data set portion 2732 and a hashed identifier indicative of the partition 2333 to which the data set portion 2732 belongs.

In response to receiving the pointer transmitted from the control device 2500 in response to the earlier transmitted request for a pointer, the persisting component 2741 may store an indication of the received pointer within the pointer data 2735. Turning to FIG. 18B, as depicted, the encryption component 2742 may perform the encryption of the one or more data set portions 2732, together, to generate the encrypted data block 2131. The persisting component 2741 may then operate the network interface 2790 to transmit the encrypted data block 2131 to the one or more storage devices 2100 along with a command to the one or more storage devices 2100 to store the encrypted data block 2131 at the location within the payload section 2113 that is specified by the pointer.

Turning to FIG. 18C, a single node device 2700 may output the depicted multiple data set portions 2732a-d as a result of performing multiple instances of a processing task at least partially in parallel within the single node device 2700 in which each instance generates one of the multiple data set portions 2732a-d. More specifically, as depicted, each of multiple instances of the task component 2745a-d may be executed in a separate thread of execution by the processor component 2750 of the single node device 2700, and/or the processor component 2750 may incorporate multiple cores 2755a-d that are each capable of executing one of the instances of the task component 2745a-d independently of the others. Thus, in such embodiments, the single one of the node devices 2700 may internally function in a manner akin to multiple ones of the node devices 2700 in generating the multiple data set portions 2732a-d.

In such embodiments, the multiple instances of the task component 2745a-d may coordinate to cause the persisting component 2741 to transmit a single request to the control device 2500 for a single pointer for use in storing all of the multiple data set portions 2732a-d as adjacently located data sub-blocks 2133*a-d* within a single encrypted data block 2131 within the payload section 2113. Again, the request may include separate indications of size and hashed identifier for each one of the multiple data set portions 2732*a-d*. Where all of the multiple data set portions 2732*a-d* belong to the same partition 2333, the same hashed identifier may be indicated in the request for all of the multiple data set portions 2732*a-d*. However, where different ones of the multiple data set portions 2732*a-d* belong to different partitions 2333, different hashed identifiers may be indicated for different ones of the multiple data set portions 2732*a-d*.

Turning to FIG. 18D, following the provision of pointers for the storage of all data set portions 2732 of the partitioned embodiment of the data set 2330, the encryption component 2542 may encrypt the map data 2510 to generate the encrypted map base 2116, or to generate a combination of the encrypted map base 2116 and the multiple encrypted map extensions 2118. As previously discussed in reference to FIG. 14B, where the map data 2510 does not become large enough to exceed a predetermined threshold in size, the map data 2510 may not be divided into the map base 2115 and the multiple extensions 2117. Accordingly, the mapping component 2541 may operate the network interface 2590 to transmit the encrypted map base 2116 to the one or more storage devices 2100 for storage within the payload section 2113, as depicted in FIG. 18D. However, as previously discussed in reference to FIG. 14C, where the map data 2510 becomes relatively large in the amount of storage required to store it within the payload section 2113, the map data 2510 may be divided into the map base 2115 and the multiple extensions 2117. Accordingly, the mapping component 2541 may operate the network interface 2590 to transmit the encrypted map base 2116 and the multiple encrypted map extensions 2118 to the one or more storage devices 2100 for storage within the payload section 2113, as depicted in FIG. 18E.

Returning to FIG. 18D, the encryption component 2542 may also encrypt the metadata 2335 to generate the encrypted metadata 2336. The mapping component 2541 may also operate the network interface 2590 to transmit the encrypted metadata 2336 to the one or more storage devices 2100 for storage within the payload section 2113. Further, the mapping component 2541 may also store indications of the quantity of node devices 2700 among which all of the data set portions 2732 of the data set 2330 were temporarily stored and/or were generated as the data header 2112. Again, in various embodiments, the data header 1112 may be incorporated into either the file header 2111 or the payload section 2113 (e.g., within the map base 2115 or as part of the metadata 2335). Regardless of where the indication of the quantity of node devices 2700 is stored, in some embodiments, the indication of whether the data of the data set 2330 is partitioned data or non-partitioned data may be combined with the indication of the quantity of node devices 2700. More specifically, in such embodiments, an indication of a zero quantity of node devices 2700 may serve as an indication that the data of the data set 2330 is non-partitioned data. In contrast, an indication of a non-zero quantity of node devices 2700 may serve as an indication that the data set 2330 is partitioned data, in addition to specifying the quantity of node devices 2700. This manner of combining these two indications may be employed where an indication of the quantity of node devices 2700 is deemed superfluous in situations where the data is non-partitioned data.

In some embodiments, the mapping component 2541 may operate the network interface 2590 to recurringly monitor for indications from each node device 2700 of not needing to request any more pointers from the control device 2500. In such embodiments, the mapping component 2541 may delay the encryption and storage of at least the map data 2510 until indications have been received from all of the multiple node devices 2700 involved in processing the partitioned embodiment of the data set 2330 that there will be no more requests for pointers. However, in embodiments in which each of the node devices 2700 is required to request only a single pointer for all data set portions 2732 that are to be encrypted and stored by that node device 2700, the control device 2500 may determine whether there are more data set portions 2732 for which pointers remain to be requested based on whether or not a single request for a pointer has been received from every one of the node devices 2700 involved in processing the data set 2330. Again, in such embodiments, exchanges of information between the control device 2500 and the node devices 2700 through the network 2999 for purposes of coordinating at least the storage of the data set 2330 may advantageously be further minimized by elimination of the need for exchanges of explicit indications of whether there are more data set portions 2732 for which pointers remain to be requested.

Figure 19A:
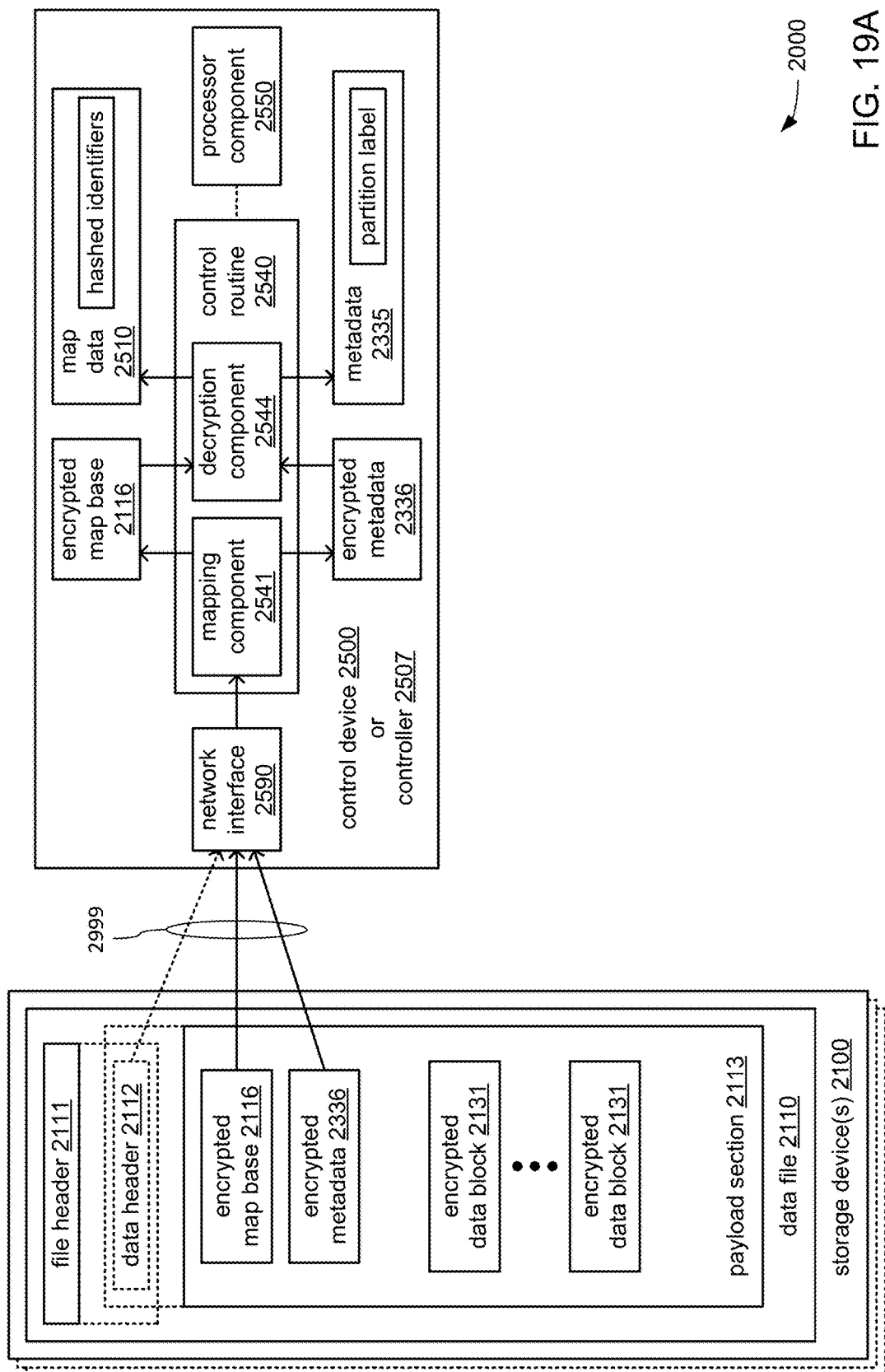
FIGS. 19A, 19B, 19C and 19D, together, illustrate an example of retrieving encrypted data blocks of partitioned data of a data set.
Figure 19B:
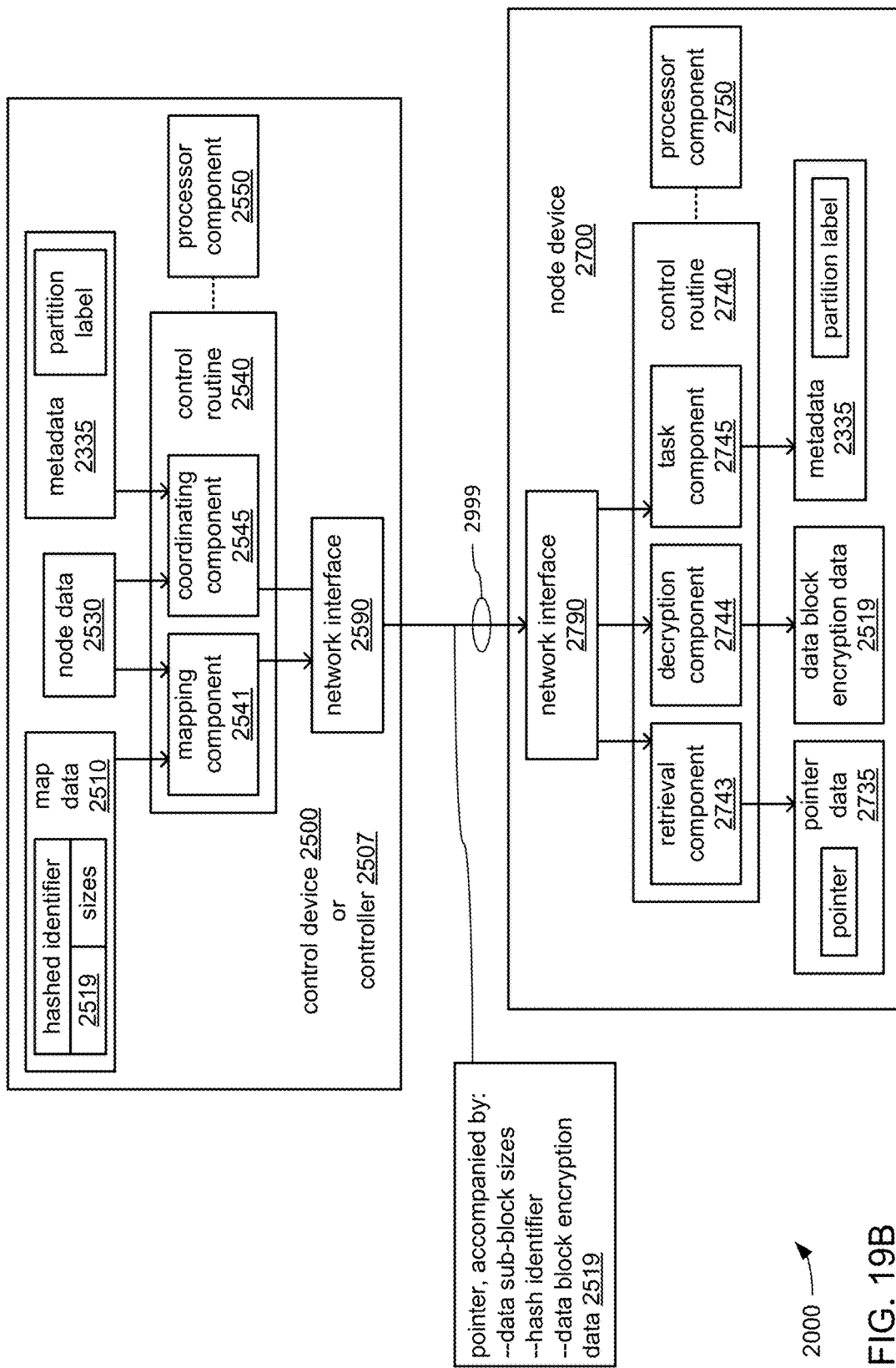
Figure 19C:
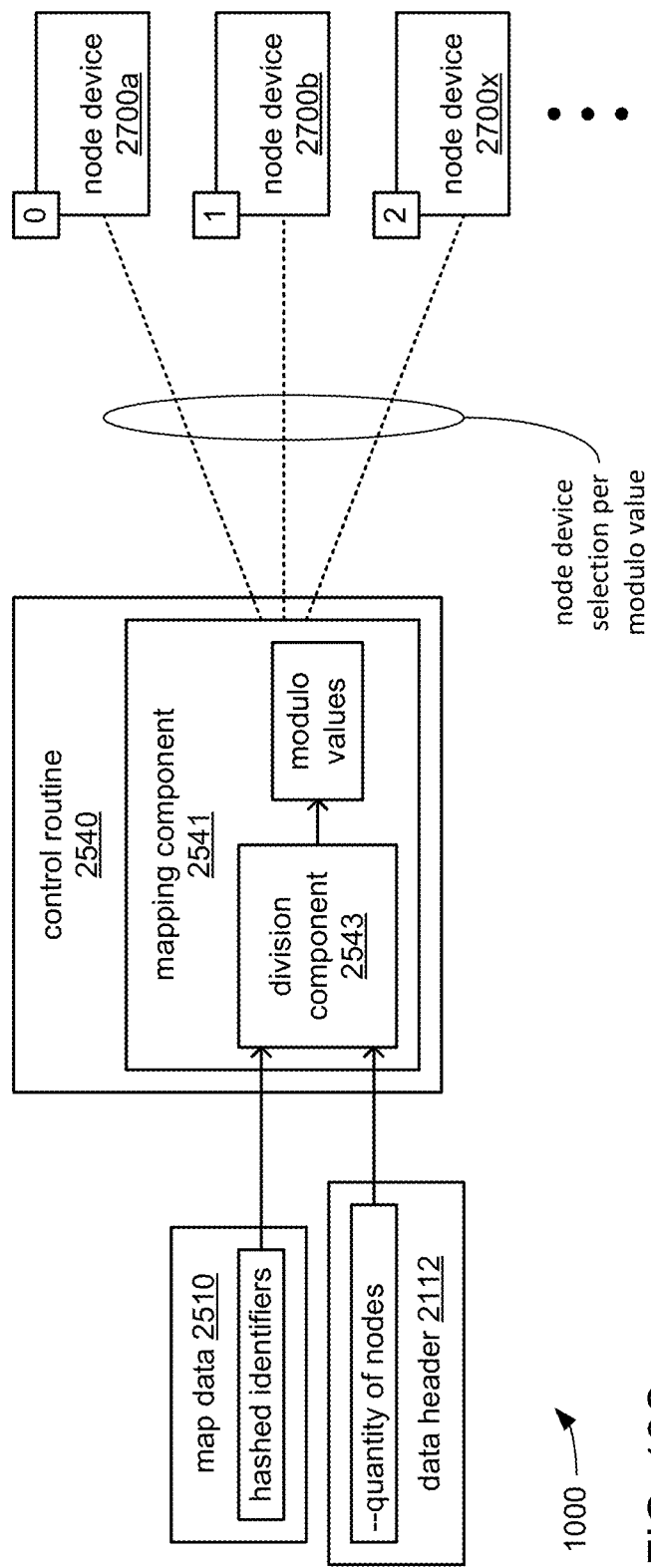
Figure 19D:
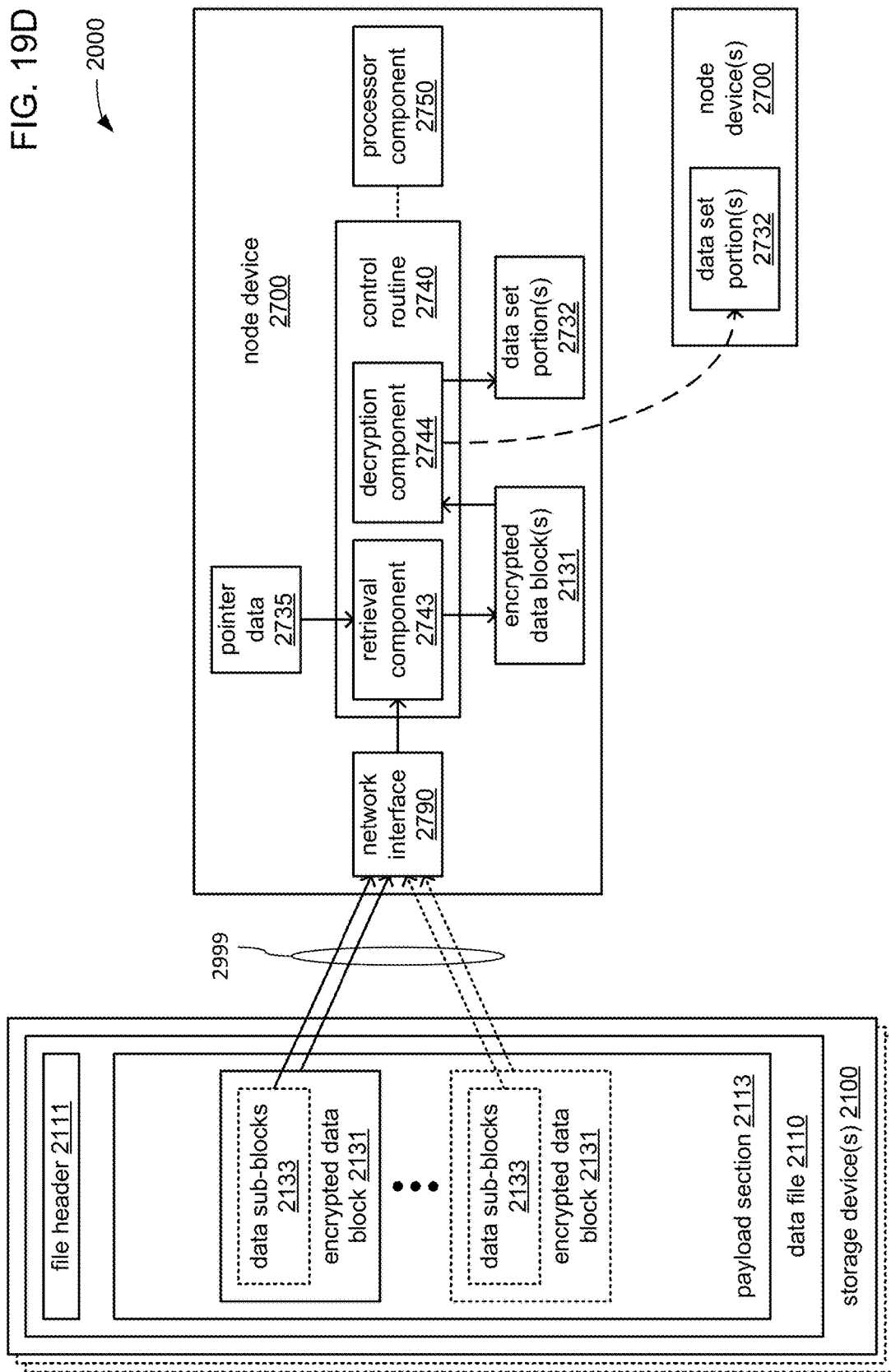

FIGS. 19A-D, together, illustrate an example of retrieving the data set 2330 where the data set 2330 is made up of partitioned data in embodiments of the distributed processing system 2000 of FIG. 13A, 13B or 13C in greater detail. More specifically, FIG. 19A depicts aspects of the collection of information needed by the control device 2500 to determine a distribution of encrypted data blocks 2131 among available ones of the node devices 2700. FIG. 19B depicts aspects of transmission of the pointers to available ones of the node devices 2700. FIG. 19C depicts aspects of an approach to effecting a relatively balanced distribution of the encrypted data blocks 2131 among available ones of the node devices 2700. FIG. 19D depicts aspects of the retrieval of one or more encrypted data blocks by a single node device 2700.

It should be noted that, in embodiments of the distributed processing system 2000 that do not include multiple node devices 2700 that may each incorporate the processor component 2750 to execute an instance of the control routine 2740, there may be multiple instances of the control routine 2740 that are separately executed in separate threads of execution provided by multiple processor cores 2555 of one or more of processor component 2550 within the control devices 2500. As a result, the coordination about to be discussed between the node devices 2700 and the control device 2500 via the network 2999 may, instead, be performed among multiple ones of the processor cores 2555 of one or more processor component 2550 within the control device 2500.

Turning to FIG. 19A, as part of retrieving the partitioned data of such an embodiment of the data set 2330, the mapping component 2541 may operate the network interface 2590 to retrieve the encrypted base map 2116 (and any accompanying encrypted map extensions 2118—see FIG. 14C) via the network 2999 from the payload section 2113 of the data file 2110 stored within the one or more storage devices 2100. The decryption component 2544 may then decrypt the encrypted map base 2116 (and any accompanying encrypted map extensions 2118) to generate the map base 2115 (and any corresponding map extensions 2117). As previously discussed, the map base 2115 (and any accompanying map extensions 2117) may provide a map of the manner in which the multiple data set portions 2732 of the partitioned embodiment of the data set 2330 are stored within the payload section 2113. The mapping component 2541 may store such a map as the map data 2510.

Additionally, the mapping component 2541 may operate the network interface 2590 to retrieve the encrypted metadata 2335 via the network 2999 from the payload section 2113. The decryption component 2544 may then decrypt the encrypted metadata 2336 to generate the metadata 2335 that describes aspects of the organization of the data within the data set 2330. Alternatively or additionally, the mapping component 2541 may additionally operate the network interface 2590 to retrieve the data header 2112, which (if present) may describe the quantity of node devices 2700 that most recently stored the data set 2330 within the payload section 2113 of the data file 2110. Again, in various embodiments, the data header 2112 may be incorporated into one or both of the base map 2115 and the metadata 2335.

Turning to FIG. 19B, as depicted, the coordinating component 2545 may refer to recurringly updated indications of status of multiple node devices 2700 in the node data 2530 to determine which ones of the multiple node devices 2700 are currently available to decrypt one or more of the encrypted data blocks 2131 to generate corresponding data set portions 2732 of the data set 2330, and then perform a processing task on the corresponding data set portions 2732 of the partitioned embodiment of the data set 2330. The coordinating component 2545 may then operate the network interface 2590 to transmit an indication of what the processing task is to be performed to the available ones of the node devices 2700 via the network 2999. In so doing, the coordinating component 2545 may also distribute copies of at least a portion of the metadata 2335 to each of those available node devices 2700.

The mapping component 2541 may first make a determination of which of two approaches to use in distributing encrypted data blocks 2131 of the data set 2330 among the currently available node devices 2700 for processing, and accordingly, which of two approaches to use in deriving and distributing pointers among the currently available node devices 2700. To do so, the mapping component 2541 may compare the quantity of the node devices 2700 that are currently available to the quantity of node devices 2700 that were involved in most recently storing the data set 2330 within the data file 2110. If these two quantities of the node devices 2700 match, then the mapping component 2541 may make the determination to distribute the data set portions 2732 among the currently available node devices 2700 for processing in a manner that effectively recreates the distribution of the data set portions 2732 that existed at the time the data set 2330 was most recently stored within the data file 2110. More precisely, the mapping component 2541 may distribute each entire encrypted data block 2131 within the payload section 2113 of the data file 2110 (thereby keeping together all data sub-blocks 2133 within each encrypted data block 2131) to a different one of the currently available node devices 2700. However, if these two quantities of the node devices 2700 do not match, then the mapping component 2541 may make the determination to derive a new distribution of individual ones of the data sub-blocks 2133 within each of the encrypted data blocks 2131 within the payload section 2113 of the data file 2110 among the currently available node devices 2700 (to thereby individually distribute the data set portions 2732 without regard to what encrypted data blocks 2133 they are included within).

Turning to both FIGS. 19B and 19C, to effect either such a distribution of whole encrypted data blocks 2131 or such a distribution of individual ones of the data sub-blocks 2133 among the currently available node devices 2700 for processing, the mapping component 2541 may employ at least a subset of the hashed identifiers associated by the map data 2510 with each of the data sub-blocks 2133. The mapping component 2541 may assign positive integer values as identifiers to each of the available node devices 2700, starting with the integer value of 0 and incrementing by the integer value of 1 for each such node device 2700. As depicted, the mapping component 2541 may perform division operations in which hashed identifiers are divided by the quantity of currently available node devices 2700 to derive a modulo value from each such division.

More precisely, where the quantities of currently available node devices 2700 and of the node devices 2700 most recently involved in storing the data set 2330 do match, then for each of the encrypted data blocks 2131, the mapping component 2541 may retrieve a single hashed identifier associated by the map data 2510 with one of the data sub-blocks 2133 within that encrypted data block 2131, and may divide that single hashed identifier by the quantity of currently available node devices 2700 to derive a modulo value. In some embodiments, the single hashed identifier that is retrieved may be selected on the basis of being the hashed identifier present within the first map sub-entry 2513 found to be within the map entry 2511 in the map data 2510 for the encrypted data block 2131. In other embodiments, the single hashed identifier that is retrieved may be selected to be the one associated with the largest data sub-block 2133 within the encrypted data block 2131 (e.g., the largest in terms of containing the most data of all data sub-blocks 2133 within the encrypted data block 2131). In still other embodiments, the single hashed identifier that is retrieved may be selected to be the one associated with the partition 2333 to which the majority of the data within the encrypted data block 2131 belongs. The mapping component 2541 may then match that modulo value to one of the positive integer values assigned to one of the currently available node devices 2700. The mapping component 2541 may then operate the network interface 2590 to transmit a pointer to the location of that encrypted data block 2131 within the payload section 2113 to that one of the node devices 2700 which had been assigned the matching one of the positive integer values.

In embodiments in which the data of the data set 2330 is partitioned, and where there are one or more instances of data belonging to more than one partition 2333 being generated and/or processed by the same node device 2700, there may be a limitation on which partitions 2333 of data of the data set 230 may be generated and/or stored within the same node device 2700. The limitation may be that all partitions 2333 of data that so share the same node device 2700 must have partition labels that beget the same modulo value when the hashed identifiers derived from those partition labels (e.g., by taking hashes of those partition labels) are divided by the quantity of currently available node devices 2700. Thus, the use of only a single hashed identifier associated with only one of the data sub-blocks 2133 within each encrypted data block 2131 in deriving a modulo value by which the distribution of the entire encrypted data block 2131 is determined may rely on this requirement to ensure that it makes no difference which hashed identifier among all of those associated with each of the data sub-blocks 2133 is so used.

Regardless of the exact manner in which a distribution of whole encrypted data blocks 2131 for purposes of processing may be derived, the mapping component 2541 may effect such a distribution by operating the network interface 2590 to transmit, to the available ones of the node devices 2700, one or more pointers to the one or more whole encrypted data blocks 2131 within the payload section 2113 that are assigned thereto. In so doing, the mapping component 2541 may refer to the map data 2510 to identify the locations within the payload section 2113 at which each of the pointers point to enable retrieval of the encrypted data blocks 2131 therefrom. In some embodiments, the mapping component 2541 may derive such locations for each encrypted data block 2131 within the payload section 2113, at least in part, by summing the sizes specified in the map data 2510 for all the encrypted data blocks 2131 that precede each encrypted data block 2131. Each transmission of a pointer may include an indication of the size of the encrypted data block(s) 2131 pointed to by that pointer to enable each of the available ones of the node devices 2700 to retrieve the correct amount of data when retrieving each of the encrypted data blocks 2131 assigned to them from the payload section 2113. Each transmission of a pointer may also include the data block encryption data 2519 needed to decrypt the data block(s) 2131 pointed to by that pointer to generate unencrypted corresponding data set portions 2732 therefrom.

Within each node device 2700 that receives one or more of such transmitted pointers, the retrieval component 2743 and the decryption component 2744 may cooperate to retrieve and decrypt the one or more whole encrypted data blocks 2131 assigned to that node device 2700 in a manner very much like what was earlier described in reference to FIG. 17D.

However, and continuing to refer to both FIGS. 19B and 19C, where the quantities of currently available node devices 2700 and of the node devices 2700 most recently involved in storing the data set 2330 do not match, the mapping component 2541 may derive a distribution of individual data sub-blocks 2133 to different ones of the currently available node devices 2700 for purposes of processing, rather than an assignment of whole encrypted data blocks 2133. More specifically, for each of the data sub-blocks 2133 within each encrypted data block 2131, the mapping component 2541 may retrieve the hashed identifier associated by the map data 2510 with that data sub-block 2133, and may divide the hashed identifier by the quantity of currently available node devices 2700 to derive a modulo value. The mapping component 2541 may then match that modulo value to one of the positive integer values assigned to one of the currently available node devices 2700, and may assign that data sub-block 2133 to that one of the currently available node devices 2700 for processing based on that match of the modulo value to that positive integer value.

Such use of the hashed identifiers of each of the data sub-blocks 2133 to derive a distribution of each of the data sub-block 2133, individually, for processing may result in the derivation of a new distribution of the data set portions 1732 for processing that were earlier encrypted and stored as the data sub-blocks 2133, and such a new distribution may be a relatively balanced distribution of data of the data set 2330 among the currently available node devices 2700. Also, such use of the hashed identifiers takes advantage of the fact that all of the data sub-blocks 2133 associated with a single partition 2333 will have the same hashed identifier, and so, such use of modulo values taken of the hashed identifiers ensures that all data belonging to any one of the partitions 2333 will be distributed to the same one of the currently available node devices 2700 for processing, and not among multiple node devices 2700.

However, as previously discussed in reference to FIGS. 18A-E, the encryption of a partitioned embodiment of the data set 2330 may include generating encrypted data blocks 2131 by encrypting multiple data set portions 2732 together as a set of data sub-blocks 2133 where different ones of the data sub-blocks 2133 may belong to different partitions 2333, as indicated by their different hashed identifiers. Thus, even though different ones of the data sub-blocks 2133 of a particular encrypted data block 2131 may be assigned by the mapping component 2541 to different node devices 2700 for processing based on their different hashed identifiers, the particular data block 2131 must first be decrypted as a whole block before such a distribution of its data sub-blocks 2133 for processing can be performed.

Thus, for ones of the encrypted data blocks 2131 in which all of the data sub-blocks 2133 are of data set portions 2732 that all belong to the same partition 2333, the mapping component 2541 may assign each of such encrypted data blocks 2131 to a node device based on the single hashed identifier that is associated with all of the data sub-blocks 2131 therein. Each of such encrypted data blocks 2131 may then be decrypted within the node device 2700 to which it is distributed, and then all of the data set portions 2732 retrieved from the decryption may also be processed within the same node device 2700. Thus, for such encrypted data blocks 2131, the distribution of those encrypted data blocks 2131 among the node devices 2700 for decryption perfectly matches the distribution of the data sub-blocks 2131 therein for processing.

However, for ones of the encrypted data blocks 2131 in which the data sub-blocks 2133 are of data set portions 2732 that belong to two or more different partitions 2333 such that they are meant to be distributed to two or more different node devices 2700 based on their hashed identifiers, there may be a divergence between the distribution of such encrypted data blocks 2131 for decryption and the distribution of the data sub-blocks 2133 within each of those encrypted data blocks 2131 for processing. Stated differently, for such encrypted data blocks 2131, the mapping component 2541 may, in addition to deriving a distribution of the individual data sub-blocks 2133 within each for processing based on the hashed identifiers, the mapping component 2541 may also derive a different distribution for such encrypted data blocks 2131 for purposes of decryption. Thus, for such encrypted data blocks 2131, there may be a first distribution of the whole encrypted data blocks 2131 to node devices 2700 for purposes of decrypting whole encrypted data blocks 2131, followed by a second distribution of data sub-blocks 2133 therefrom among node devices 2700 for purposes of processing individual data sub-blocks 2133.

To minimize consumption of network bandwidth of the network 2999 and/or other resources of the distributed processing system 2000, the mapping component 2541 may derive the distribution of whole encrypted data blocks 2131 for purposes of decryption by first identifying the ones of the encrypted data blocks 2131 that include data sub-blocks 2133 that are meant to be distributed to two or more different node devices 2700 for processing based on hashed identifiers. For each such identified encrypted data block 2131, the mapping component 2541 may then determine which node device 2700 to distribute that encrypted data block 2131 to for purposes of decryption based on the relative quantities of data therein that are associated with each different hashed identifier. The mapping component 2541 may assign the whole encrypted data block 2131 to be decrypted within the node device 2700 to which the largest proportion of the data therein has also been assigned for purposes of processing as a result of the assignment of the data sub-blocks 2133 therein based on hashed identifiers.

For each encrypted data block 2131 that includes data sub-blocks 2133 that are all assigned to a single node device 2700, the mapping component 2541 may effect the distribution of that data block to that node device 2700 for both purposes of decryption and processing by operating the network interface 2590 to transmit, to that node device 2700, a pointer to that encrypted data block 2131 within the payload section 2113. Within that node device 2700, the retrieval component 2743 and the decryption component 2744 may cooperate to retrieve and decrypt that encrypted data block 2131 in a manner very much like what was earlier described in reference to FIG. 17D.

However, for each encrypted data block 2131 that includes data sub-blocks 2133 that are assigned to two or more node devices 2700, FIG. 19D depicts the manner in which retrieval and decryption of that encrypted data block 2131 may be performed. For purposes of decryption, the mapping component 2541 may effect the first distribution of that encrypted data block to the node device 2700 to which the greatest proportion of the data within that encrypted data block 2131 has been assigned for processing. More specifically, the mapping component may operate the network interface 2590 to transmit, to that node device 2700, a pointer to that encrypted data block 2131 within the payload section 2113. Within that node device 2700, the retrieval component 2743 and the decryption component 2744 may cooperate to retrieve and decrypt that encrypted data block 2131. Then, as also depicted in FIG. 19D, while one or more of the resulting data set portions 2732 are retained within that node device 2700 for processing, one or more others of the resulting data set portions 2732 are retransmitted to the one or more other node devices 2700 to which they were assigned for processing, based on hashed identifiers (more precisely, based on the modulo values generated from dividing the hashed identifiers by the quantity of currently available node devices 2700).

Such exchanges of one or more data set portions 2732 among the node devices 2700 following the decryption of an encrypted data block 2131 may be performed as peer-to-peer transfers between node devices 2700 through the network 2999 without involving the control device 2500. However, to enable such exchanges, the mapping component 2541 of the control device 2500 may transmit, along with a pointer, information concerning which other node device(s) 2700 that one or more of the data set portions 2732 are to be transmitted to following decryption of the encrypted data block 2131 in which they are included as corresponding data sub-block(s) 2133.

Returning to FIGS. 13A, 13B and 13C, in various embodiments, each of the processor components 2550 and 2750 may include any of a wide variety of commercially available processors. Further, one or more of these processor components may include multiple processors, a multi-threaded processor, a multi-core processor (whether the multiple processor cores coexist on the same or separate dies), and/or a multi-processor architecture of some other variety by which multiple physically separate processors are linked.

However, in a specific embodiment, the processor component 2750 of each of the node devices 2700, or the processor component 2550 in embodiments that do not include the node devices 2700, may be selected to efficiently perform processing tasks with multiple data set portions 2732 in parallel. By way of example, the processor component 2750 or 2550 may incorporate a single-instruction multiple-data (SIMD) architecture, may incorporate multiple processor cores, and/or may incorporate the ability to support multiple simultaneous threads of execution per processor core.

In various embodiments, each of the storages 2560 and 2760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, a plurality of storage devices organized into one or more arrays (e.g., multiple ferromagnetic disk drives organized into a Redundant Array of Independent Disks array, or RAID array), or layered or array). redundant sets of storage devices in which non-volatile storage devices serve to preserve the contents of volatile storage devices in the event of an error condition or power failure (e.g., storage class memory accompanying RAM). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 2760 of one or more of the node devices 2700 (or of the controller 2507) that stores one or more of the data set portions 1732, or the storage 2560 of the control device 2500 in embodiments that do not include the node devices 2700, may be implemented with a redundant array of independent discs (RAID) of a RAID level selected to provide fault tolerance to prevent loss of one or more of these datasets and/or to provide increased speed in accessing one or more of these datasets.

In various embodiments, each of the input devices 2520 and 2720 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, each of the displays 2580 and 2780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 2580 of the coordinating device 2500 and/or the display 2780 of the viewing device 2700 may be a touch-screen display such that the input device 2520 may be incorporated into the display 2580 and/or the input device 2720 may be incorporated into the display 2780. In such embodiments, the input device 2520 and/or the input device 2720 may be a touch-sensitive component of the display 2580 and/or the display 2780, respectively.

In various embodiments, the network interfaces 2590 and 2790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, 5G, NVMe, PCIe, etc.

However, in a specific embodiment, the network interface 2790 of one or more of the node devices 2700 that stores one or more of the data set portions 2732, or of the network interface 2590 of the control device 2500 in embodiments that do not include the node devices 2700, may be implemented with multiple copper-based or fiber-optic based network interface ports to provide redundant and/or parallel pathways in exchanging one or more of the data set portions 2732 with the one or more storage devices 2100.

Figure 20:
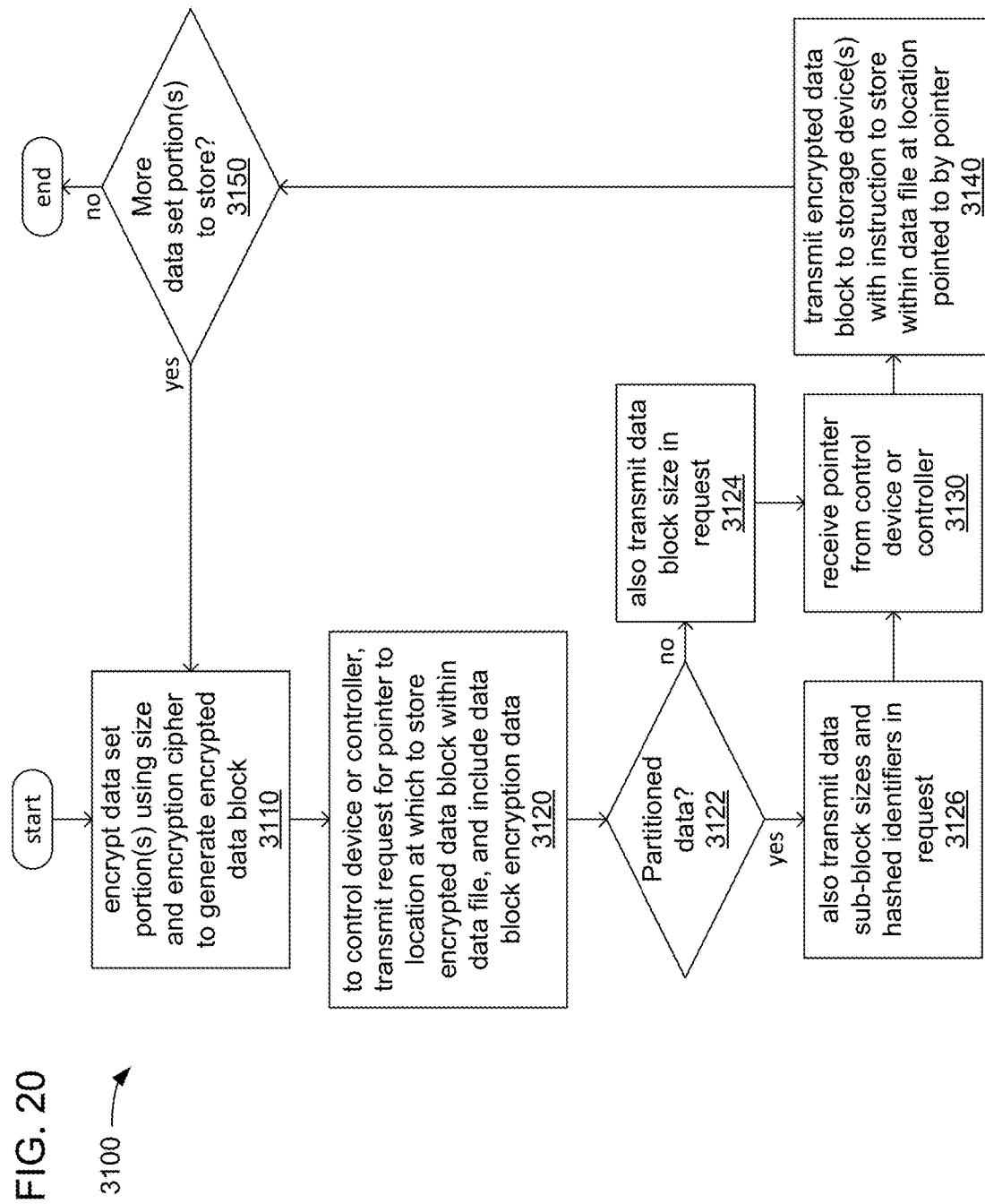
FIG. 20 illustrates an example embodiment of a logic flow of a node device storing encrypted data blocks of a data set.

FIG. 20 illustrates an example embodiment of a logic flow 3100. The logic flow 3100 may be representative of some or all of the operations executed by one or more embodiments described herein. More specifically, the logic flow 3100 may illustrate operations performed by the processor component 2750 in executing the control routine 2740, and/or performed by other component(s) of at least one of the node devices 2700.

At 3110, a processor component of a node device (e.g., the processor component 2750 of one of the node devices 2700) may encrypt one or more data set portions of a data set to generate an encrypted data block (e.g., one or more of the data set portions 2732 of the data set 2330 to generate one of the encrypted data blocks 2131), using a combination of the total size of the one or more data portions 2732 that are to be encrypted together to generate each encrypted data block and an encryption cipher separately generated for each encrypted data block. As previously discussed, such an encryption cipher may be derived from a salt value that is separately randomly generated for each encrypted data block (such that no two encrypted data blocks share the same salt value), and from a pass phrase (e.g., the pass phrase 2779) to generate each encrypted data block. As also previously discussed, the pass phrase may be securely maintained by a control device (e.g., the control device 2500) and a grid of node devices, but is never transmitted to the one or more storage devices in which the data set may be persisted.

At 3120, the processor component may transmit a request to a control device or to a controller implemented within another node device (e.g., the control device 2500, or the controller 2507 acting in place of the control device 2500 from within another of the node devices 2700) for a pointer to a location within a data file maintained by one or more storage devices (e.g., the data file 2110 maintained by the one or more storage devices 2100) at which the node device may store the encrypted data block. In so doing, the processor component may also transmit data block encryption data to also be stored to enable later decryption of the encrypted data block upon later retrieval. As previously discussed, such data block encryption data may include at least the salt value, but not the pass phrase, since again, the pass phrase is not to be stored with the data set 3220.

At 3122, if the data of the data set is not partitioned, then at 3124, the processor component may also transmit an indication of the size of the encrypted data block as part of the request for a pointer. However, at 3122, if the data of the data set is partitioned, then at 3126, the processor component may also transmit indications of the hashed identifier and size of each of the data sub-blocks (e.g., the data sub-blocks 2133) that are included within the encrypted data block, along with an indication of the size of the encrypted data block, as part of the request for a pointer. As previously discussed, each hashed identifier may be hash value derived from the unique partition label given to each partition.

At 3130, the requested pointer may be received at the node device from the control device (or controller within another node device). At 3140, in response to having received the requested pointer, the processor component of the node device may transmit the encrypted data block to the one or more storage devices with an instruction to the encrypted data block at the location pointed to by the pointer.

At 3150, the processor component may check whether there are any further data set portions to be stored that were not included in the last encrypted data block that was generated and transmitted to the one or more storage devices for storage. If so, then the processor component may return to encrypting such further data set portions at 3110.

Figure 21:
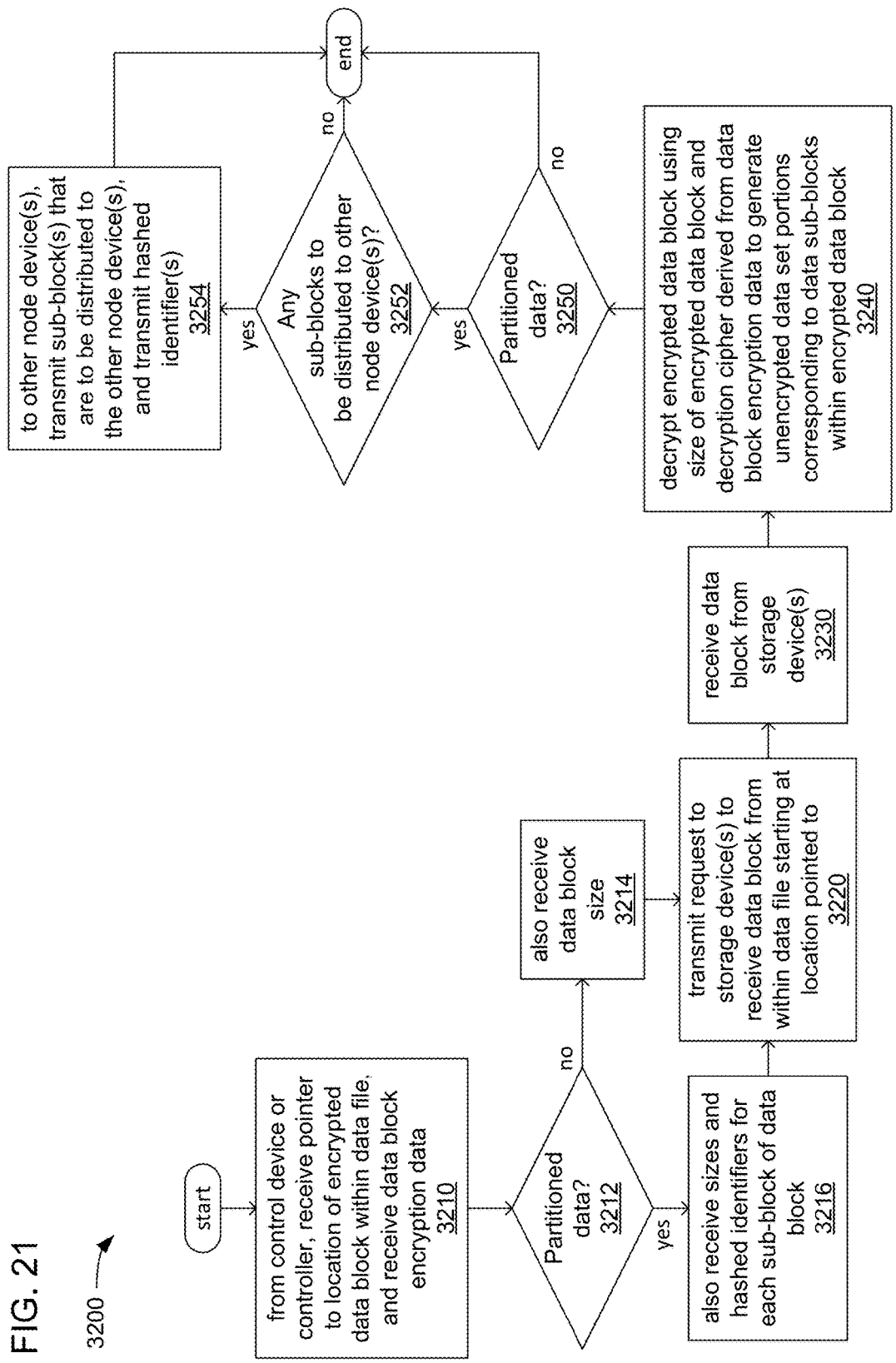
FIG. 21 illustrates an example embodiment of a logic flow of a node retrieving encrypted data blocks of a data set.

FIG. 21 illustrates an example embodiment of a logic flow 3200. The logic flow 3200 may be representative of some or all of the operations executed by one or more embodiments described herein. More specifically, the logic flow 3200 may illustrate operations performed by the processor component 2750 in executing the control routine 2740, and/or performed by other component(s) of at least one of the node devices 2700.

At 3210, a processor component of a node device (e.g., the processor component 2750 of one of the node devices 2700) may receive, from a control device or a controller implemented within another node device (e.g., the control device 2500 or the controller 2507 within another of the node devices 2700), a pointer to an encrypted data block of a data set stored within a data file (e.g., one of the encrypted data blocks 2131 of the data set 2330 stored within the data file 2110) to be retrieved therefrom. Along with the pointer, the processor component may also receive data block encryption data needed to decrypt the encrypted data block.

At 3212, if the data of the data set is not partitioned, then at 3214, the processor component may also receive an indication of the size of the encrypted data block along with the pointer. However, at 3212, if the data of the data set is partitioned, then at 3216, the processor component may also receive indications of the hashed identifier and size of each of the data sub-blocks (e.g., the data sub-blocks 2133) that are included within the encrypted data block, and an indication of the size of the encrypted data block, along with the pointer.

At 3220, the processor component may transmit a request to the one or more storage devices to provide the encrypted data block, starting at the location in the data file pointed to by the pointer, and including the quantity of data specified by the indication of size of the encrypted data block that accompanied the pointer. At 3230, the requested encrypted data block may be received at the node device from the one or more storage devices.

At 3240, the processor component may decrypt the received encrypted data block using the size of the encrypted data block and a decryption cipher derived from the data block encryption data provided by the control device or controller along with a pass phrase (e.g., the pass phrase 2779). As previously discussed, in a manner similar to the encryption cipher, the decryption cipher may be derived based on the pass phrase and the salt value originally used in the original encryption operation that generated the encrypted data block, with at least the salt value having been provided in the data block encryption data.

At 3250, if the data of the data set is partitioned data, then the processor component may check at 3252 whether there are any data set portions that were included in the encrypted data block as data sub-blocks (e.g., one or more data set portions 2732 included as data sub-blocks 2133) that have been assigned by the control device or controller to be processed by another node device. As previously discussed, where a data set of partitioned data is retrieved from storage, and the quantity of node devices currently available differs from the quantity of node devices that were involved in the most recent storage of the data set, then the control device or controller may derive a distribution of the data set for purposes of processing based on assigning individual ones of the one or more data sub-blocks that may be included in each encrypted data block. However, as also previously discussed, each of the encrypted data blocks may be required to be decrypted as a whole, such that one or more of the encrypted data blocks may need to be distributed to node devices in a first distribution for purposes of decryption, before the data sub-blocks therein may then be distributed in a second distribution to peer node devices to which they have been assigned for processing Thus, at 3252, if there are one or more data set portions that were included in the encrypted data block as data sub-blocks that are have been assigned to another node device, then at 3254, the processor component may transmit such data set portion(s) to such other node device(s) along with their associated hashed identifiers.

Figure 22A:
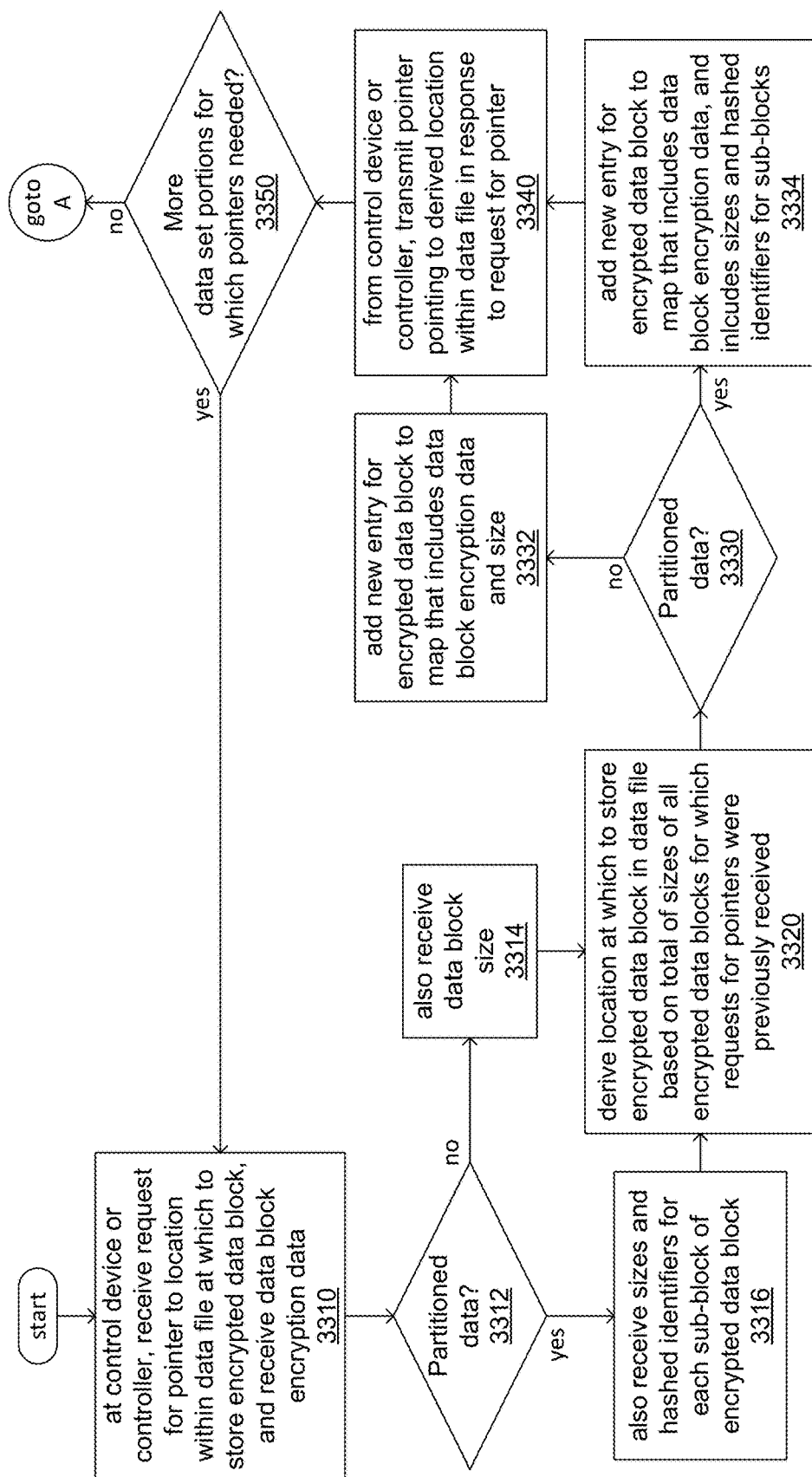
FIGS. 22A and 22B, together, illustrate an example embodiment of a logic flow of a control device coordinating storage of encrypted data blocks of a data set by node devices.
Figure 22B:
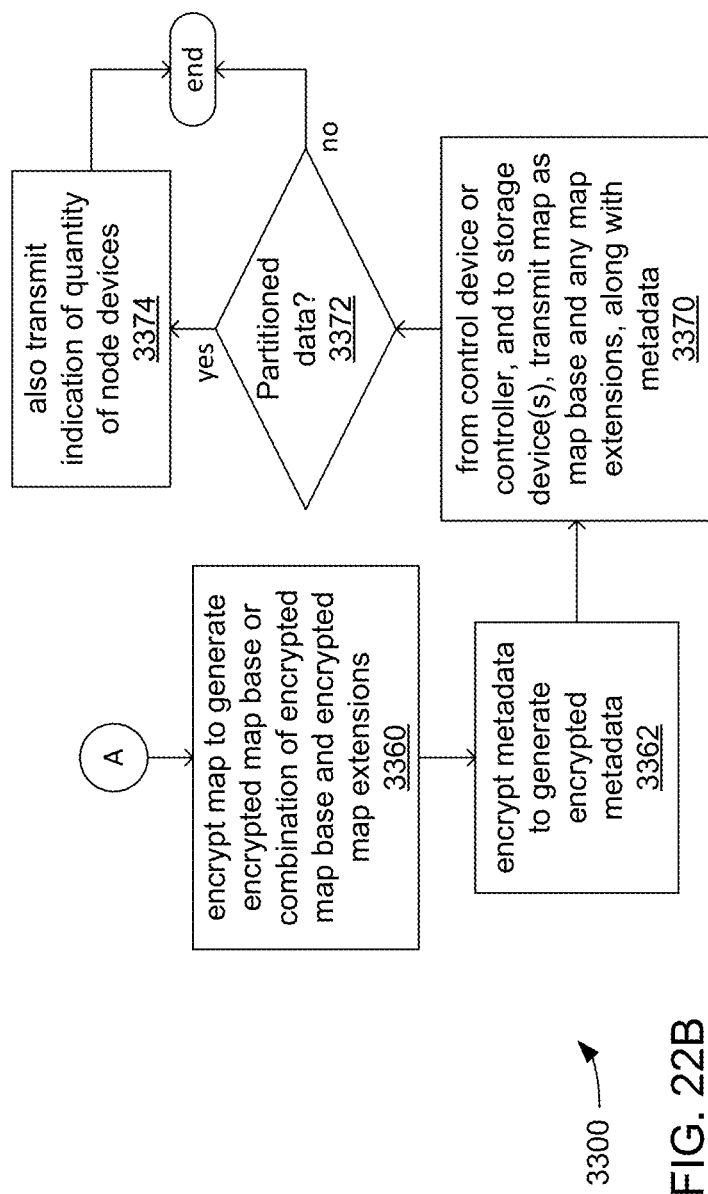

FIGS. 22A and 22B, together, illustrate an example embodiment of a logic flow 3300. The logic flow 3300 may be representative of some or all of the operations executed by one or more embodiments described herein. More specifically, the logic flow 3300 may illustrate operations performed by the processor component 2550 in executing the control routine 2540, and/or performed by other component(s) of the control device 2500 or of the controller 2507 implemented within at least one of the node devices 2700.

At 3310, a processor component of a control device or a controller implemented within a node device (e.g., the processor component 2550 of the control device 2500 or of the controller 2507 implemented within one of the node devices 2700) may receive a request for a pointer to a location within a data file maintained by one or more storage devices (e.g., the data file 2110 maintained by the one or more storage devices 2100) at which the requesting node device may store an encrypted data block of a data set (e.g., one of the encrypted data blocks 2131 of the data set 2330). Along with the pointer, the processor component may also receive data block encryption data needed for subsequent decryption of the encrypted data block.

At 3312, if the data of the data set is not partitioned, then at 3314, the processor component may also receive an indication of the size of the encrypted data block along with the request for a pointer. However, at 3312, if the data of the data set is partitioned, then at 3316, the processor component may also receive indications of the hashed identifier and size of each of the data sub-blocks (e.g., the data sub-blocks 2133) that are included within the encrypted data block, and an indication of the size of the encrypted data block, along with the request for a pointer.

At 3320, the processor component may derive the location within the data file at which to store the encrypted data block for which the pointer was requested based on a total of the sizes of all of the data blocks previously stored in the data file, and may generate a pointer to point to that location.

At 3330, if the data of the data set is not partitioned, then at 3332, the processor component may add a new map entry for the encrypted data block to a map (e.g., a new map entry 2511 in the map of the data file 2110 stored as the map data 2510) that includes the data block encryption data and an indication of the size of the encrypted data block received from the node device along with the request for a pointer. However, at 3330, if the data of the data set is partitioned, then at 3334, the processor component may add a new map entry for the encrypted data block to the map that, in addition to the data block encryption data and an indication of the size of the encrypted data block, includes a separate map sub-entry (e.g., a map sub-entry 2513) for each data sub-block within the encrypted data block. Each such map sub-entry may include indications of the hashed identifier and size of one of the data sub-blocks that are included within the encrypted data block.

At 3340, the processor component may then transmit that pointer to the node device.

At 3350, the processor component may check whether there are any further data set portions for which pointers are needed to enable their storage as one or more encrypted data blocks. If so, then the processor component may return to receiving another request for a pointer at 3310.

However, at 3350, if there are no more data set portions for which pointers are needed to enable their storage as one or more encrypted data blocks, then at 3360, the processor component may encrypt the map of the encrypted data blocks and/or data sub-blocks to generate either an encrypted map base (e.g., the encrypted map base 2116) or a combination of an encrypted map base and multiple encrypted map extensions (e.g., the encrypted map extensions 2118). At 3362, the processor component may also encrypt metadata descriptive of the manner in which items of data are organized within the data set (e.g., the metadata 2335) to generate encrypted metadata (e.g., as the encrypted metadata 2336). At 3370, the processor component may transmit the encrypted map base and/or the combination of encrypted map base and encrypted map extensions to the one or more storage devices, along with the encrypted metadata, to be stored within the data file maintained. At 3372, if the data of the data set is partitioned, then at 3374, the processor component may also transmit an indication of the quantity of node devices currently involved in storing the data set to the one or more storage devices to also be stored within the data file. As previously discussed, an indication of the quantity of node devices may be stored within a data header of the data file, and such a data header may be part of a file header of the data file or may be part of a payload section of the data file.

Figure 23A:
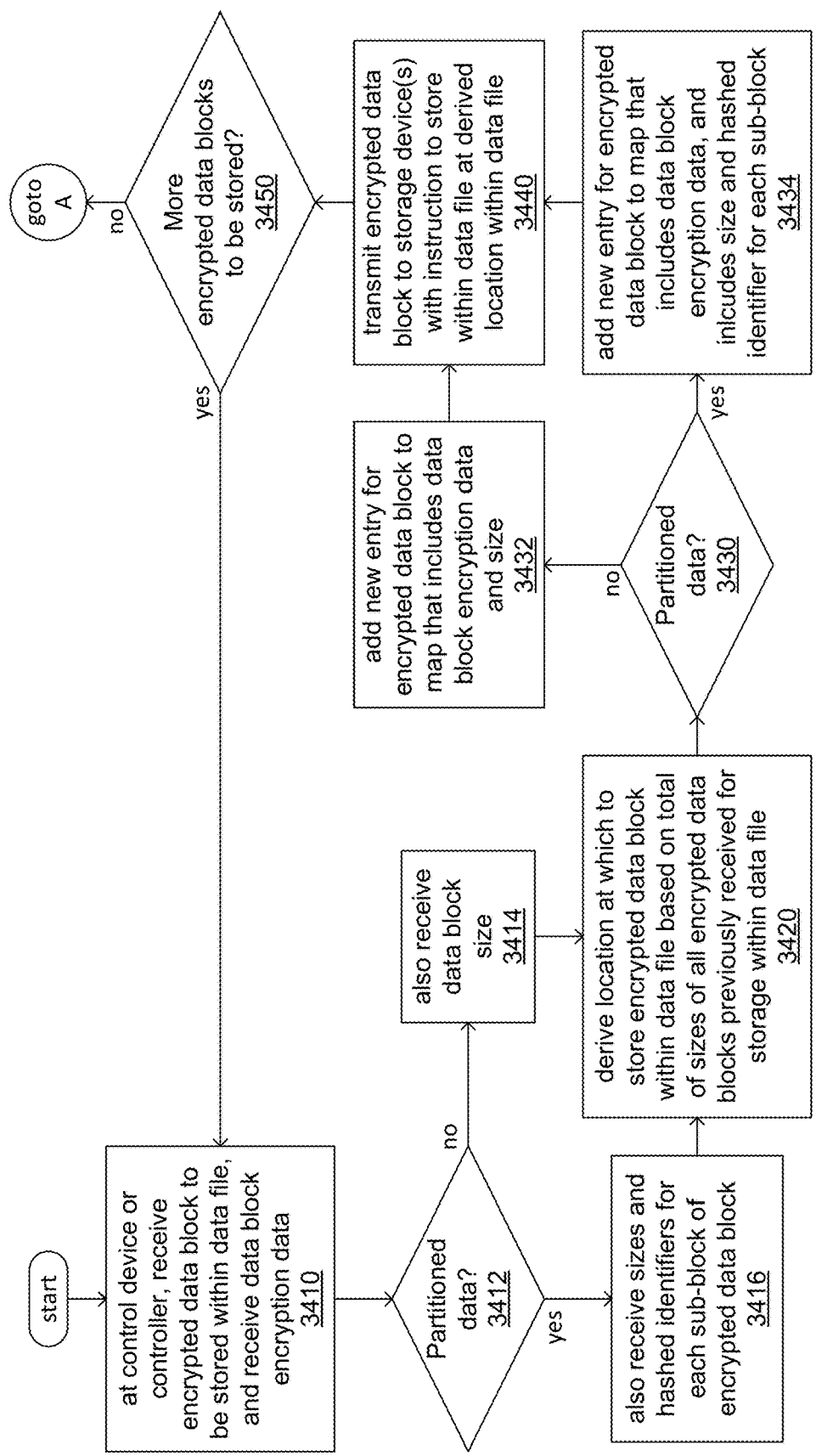
FIGS. 23A and 23B, together, illustrate an example embodiment of a logic flow of a control device storing encrypted data blocks of a data set.
Figure 23B:
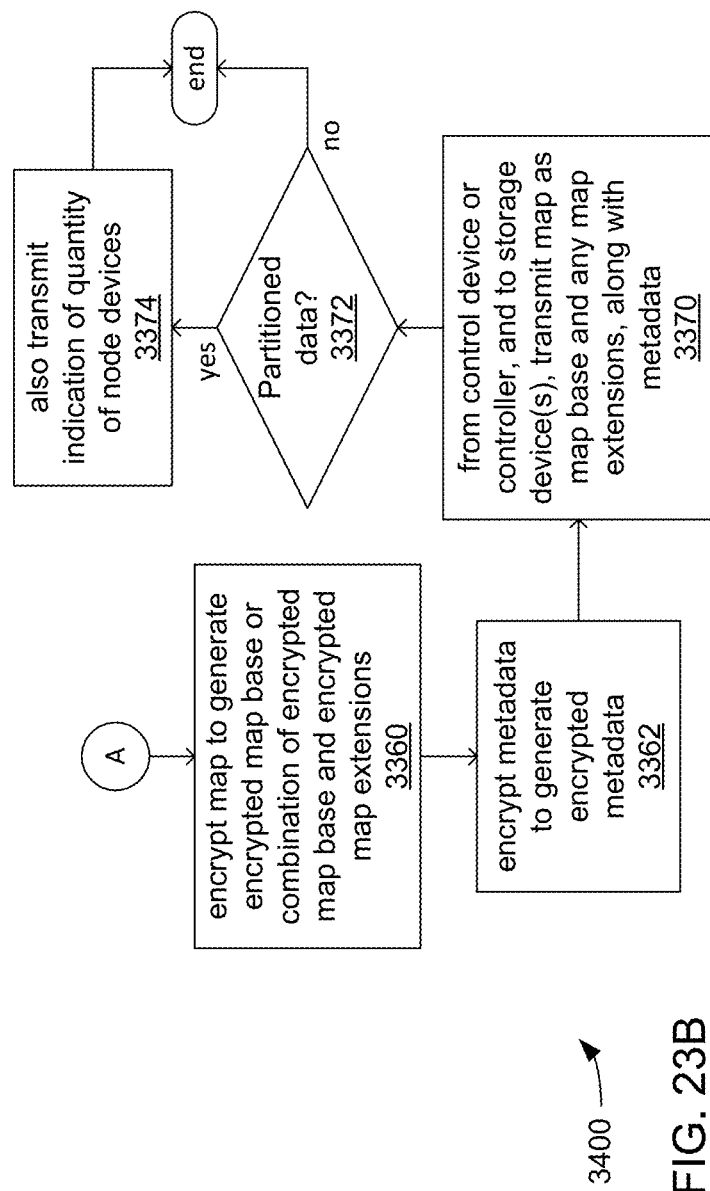

FIGS. 23A and 23B, together, illustrate an example embodiment of a logic flow 3400. The logic flow 3400 may be representative of some or all of the operations executed by one or more embodiments described herein. More specifically, the logic flow 3400 may illustrate operations performed by the processor component 2550 in executing the control routine 2540, and/or performed by other component(s) of the control device 2500 or of the controller 2507 implemented within at least one of the node devices 2700.

The logic flow 3400 is substantially similar to the 3300 of FIGS. 22A-B insofar as both of the logic flows 3300 and 3400 address aspects of the encryption and storage of a data set as encrypted data blocks within a data file maintained by one or more storage devices. However, while the logic flow 3300 addresses embodiments in which the node devices are capable (and are permitted) to individually transmit encrypted data blocks to the one or more storage devices, the logic flow 3400 addresses embodiments in which the node devices are not so capable (or are not so permitted) such that the encrypted data blocks are relayed through the control device or the controller within one of the node devices.

Thus, unlike at 3310 of the logic flow 3300 where a request for a pointer is received, at 3410 of the logic flow 3400, a processor component of a control device or a controller implemented within a node device (e.g., the processor component 2550 of the control device 2500 or of the controller 2507 implemented within one of the node devices 2700) may receive an encrypted data block of a data set (e.g., one of the encrypted data blocks 2131 of the data set 2330) to be stored within a data file maintained by one or more storage devices (e.g., the data file 2110 maintained by the one or more storage devices 2100). Along with the pointer, the processor component may also receive data block encryption data needed for subsequent decryption of the encrypted data block.

Also, unlike at 3340 of the logic flow 3300 where the processor component transmits a pointer, at 3440 of the logic flow 3400, the processor component may transmit the encrypted data block to the one or more storage devices with instructions to store the encrypted data block at a location within the data file derived by the processor component.

Further, unlike at 3350 of the logic flow 3300 where the processor component checks whether more pointers are needed, at 3450 of the logic flow 3400, the processor may check whether there are more encrypted data blocks to be stored.

Figure 24A:
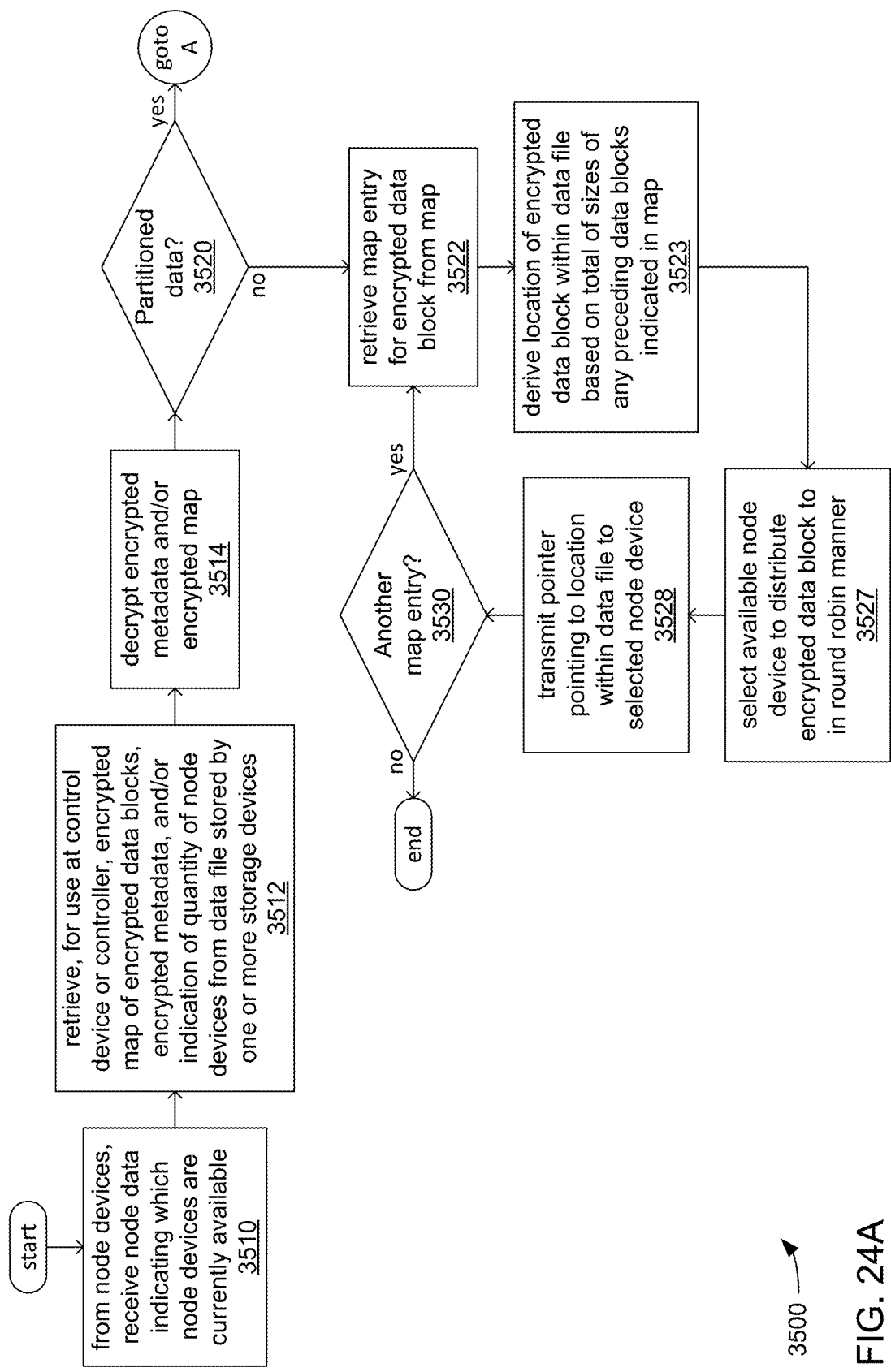
FIGS. 24A, 24B and 24C, together, illustrate an example embodiment of a logic flow of a control device coordinating retrieval of encrypted data blocks of a data set by node devices.
Figure 24B:
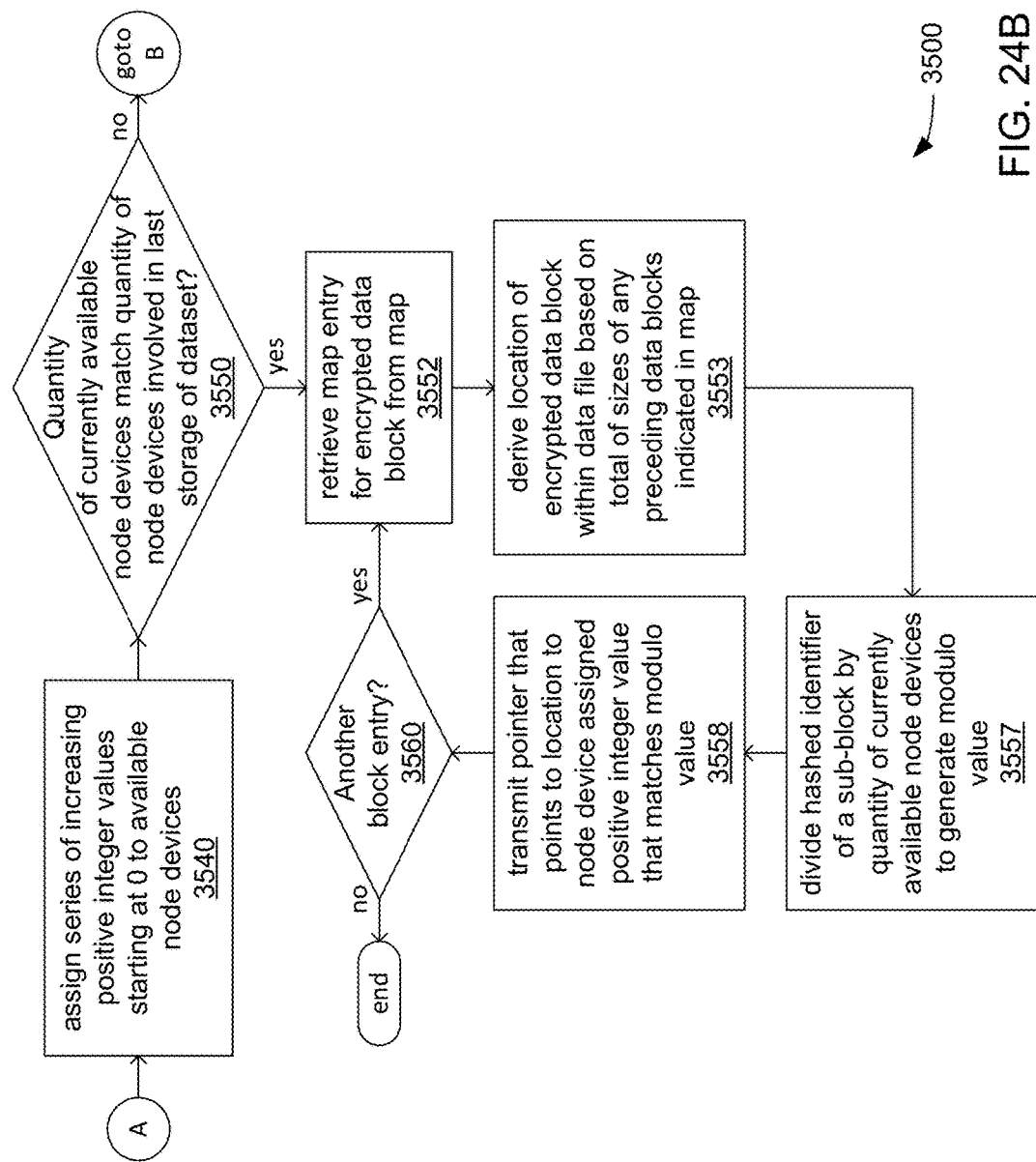
Figure 24C:
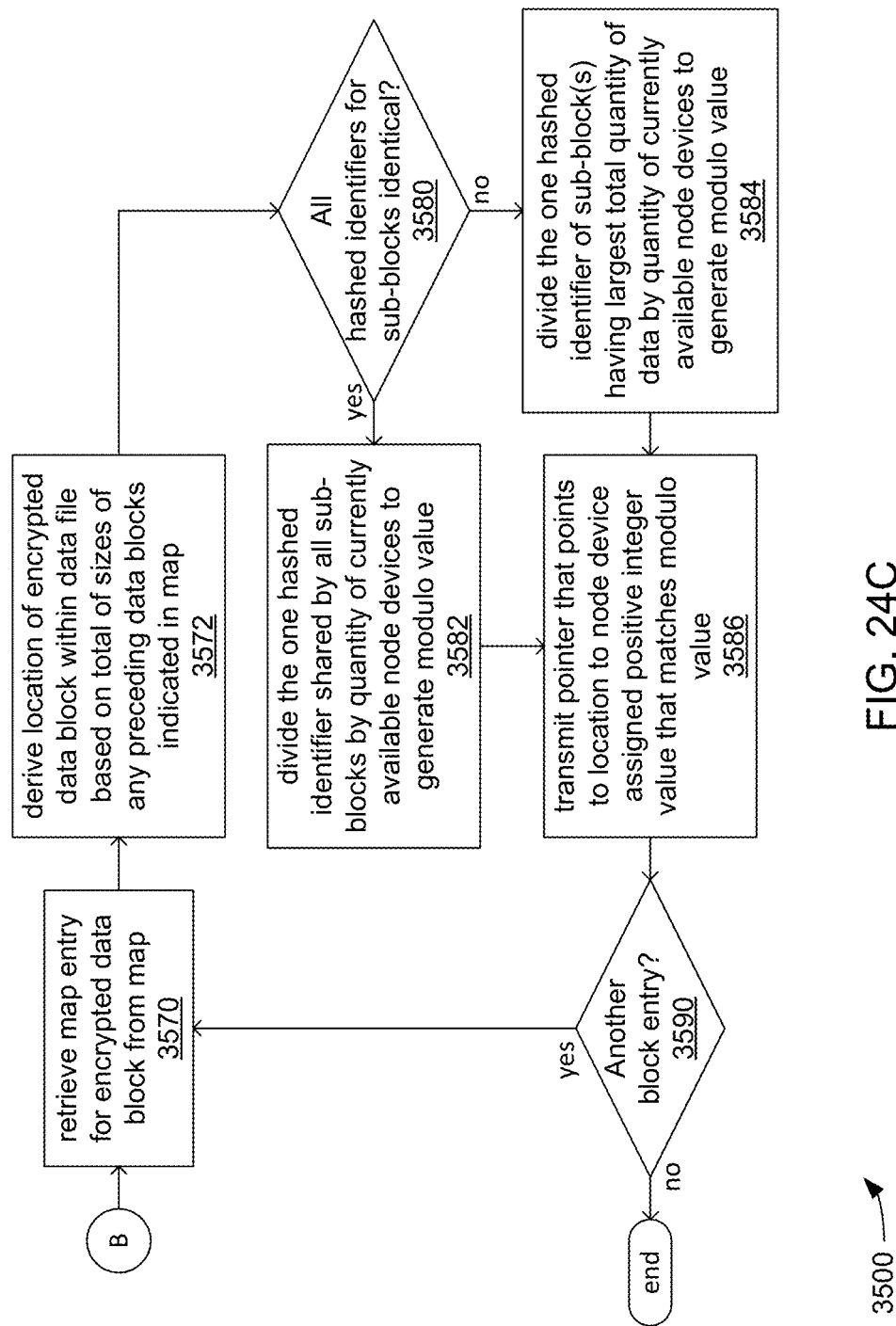

FIGS. 24A, 24B and 24C, together, illustrate an example embodiment of a logic flow 3500. The logic flow 3500 may be representative of some or all of the operations executed by one or more embodiments described herein. More specifically, the logic flow 3500 may illustrate operations performed by the processor component 2550 in executing the control routine 2540, and/or performed by other component(s) of the control device 2500 or of the controller 2507 implemented within at least one of the node devices 2700.

At 3510, a processor component of a control device or a controller implemented within a node device (e.g., the processor component 2550 of the control device 2500 or of the controller 2507) may receive indications from multiple node devices (e.g., the node devices 2700) concerning their current availability to perform processing tasks on a portion of a data set (e.g., a data set portion 2732 of the data set 2330). As previously discussed, each node device may recurringly transmit indications of its current status, including its availability to perform processing tasks on a portion of a data set.

At 3512, the processor component may retrieve, from a data file maintained within one or more storage devices (e.g., the data file 2110 maintained by the one or more storage devices 2100), an encrypted map of encrypted data blocks and/or data sub-blocks, and encrypted metadata of a data set (e.g., the encrypted map base 2116 and any encrypted map extensions 2118, and the encrypted metadata 2336). Additionally, the processor component may retrieve an indication of the quantity of node devices that were involved in the most recent storage of the data set in the data file (e.g., the data header 1112, or again, the encrypted metadata 2336).

At 3514, the processor component may decrypt the encrypted map to obtain an unencrypted map (e.g., the unencrypted map base 2115 and any unencrypted map extensions 2117 into which the map data 2510 may have been divided for storage), and the encrypted metadata to obtain unencrypted metadata (e.g., the metadata 2335).

If at 3520, the data of the data set is not partitioned, then at 3522, the processor component may retrieve a single map entry corresponding to a single encrypted data block from the map (e.g., a single map entry 2511 of the map data 2510). At 3523, the processor component may derive the location within the data file of an encrypted data block that corresponds to the map entry based on a total of the sizes of all preceding encrypted data blocks indicated in all of the corresponding preceding map entries in the map. As previously discussed, the order in which the map entries are arranged within the map may correspond to the order in which the encrypted data blocks are arranged in the data file.

At 3527, the processor component may select one of the available node devices in a round robin manner to which to distribute the encrypted data block. At 3528, the processor component may transmit a pointer, to the selected node device, that points to the location of the encrypted data block in the data file. Along with the pointer, the processor component may also transmit data block encryption data retrieved from the map entry to enable the selected node device to decrypt the encrypted data block At 3530, if there is another map entry in the map, then the processor component may return to retrieving another map entry at 3530.

However, if at 3520, the data of the data set is partitioned, then at 3540, the processor component may assign a series of increasing positive integer values (specifically, the series 0, 1, 2, 3, etc., created by repeated incrementing by the positive integer value of 1) to each of the available node devices. At 3550, the processor may check whether the quantity of currently available node devices matches the quantity of node devices indicated in the data file as having been involved in the most recent storage of the data set within the data file.

If at 3550, the two quantities of node devices match, then at 3552, the processor component may retrieve a single map entry corresponding to a single encrypted data block from the map. At 3553, the processor component may derive the location within the data file of an encrypted data block that corresponds to the map entry based on a total of the sizes of all preceding encrypted data blocks indicated in all of the corresponding preceding map entries in the map.

At 3557, the processor component may divide the hashed identifier of one of the data sub-blocks by the quantity of currently available node devices to generate a modulo value. As previously discussed, in some embodiments, the hashed identifier that is so divided may be belong to the data sub-block that is listed in the first map sub-entry within the retrieved map entry for the encrypted data block. Alternatively, in other embodiments, the hashed identifier that is so divided may be belong to the data sub-bock that is determined to contain the most data of all of the data sub-blocks within the encrypted data block (based on the sub-block sizes specified within the retrieved map entry), or may be associated with the partition to which most of the data within encrypted data block belongs.

At 3558, the processor component may transmit a pointer that points to the location of the encrypted data block in the data file to the one of the available node devices that was assigned (at 3540) an integer value from the series of integer values that matches the modulo value derived at 3557.

At 3560, if there is another map entry in the map, then the processor component may return to retrieving another map entry at 3552.

However, if at 3550, the two quantities of node devices do not match, then at 3570, the processor component may retrieve a single map entry corresponding to a single encrypted data block from the map. At 3582, the processor component may derive the location within the data file of an encrypted data block that corresponds to the map entry based on a total of the sizes of all preceding encrypted data blocks indicated in all of the corresponding preceding map entries in the map.

At 3580, if the hashed identifiers for all of the data sub-blocks within the encrypted data block are identical, then all of the data of the data set that is within all of the data sub-blocks of the encrypted data block is to be distributed to the same node device for purposes of processing. Accordingly, at 3582, the processor component may divide the one hashed identifier that is shared by all of the data sub-blocks by the quantity of currently available node devices to generate a modulo value.

However, at 3580, not all of the hashed identifiers for all of the data sub-blocks within the encrypted data block are identical, then it may be that data of the data set within different ones of the data sub-blocks of the encrypted data block is to be distributed to different node devices for purposes of processing. However, to enable such distribution of the data within different ones of the data sub-blocks to different ones of multiple node devices, the entirety of the encrypted data block must first be decrypted. Accordingly, at 3584, the processor component may determine which one of those multiple node devices to distribute the whole encrypted data block to for purposes of decryption by dividing the one hashed identifier that is associated with the largest proportion of the data within encrypted data block (based on the manner in which the data therein is divided up among the data sub-blocks) by the quantity of currently available node devices to generate a modulo value.

At 3586, the processor component may transmit a pointer that points to the location of the encrypted data block in the data file to the one of the available node devices that was assigned (at 3540) an integer value from the series of integer values that matches the modulo value derived at either 3582 or 3584.

At 3590, if there is another map entry in the map, then the processor component may return to retrieving another map entry at 3570.

Figure 25A:
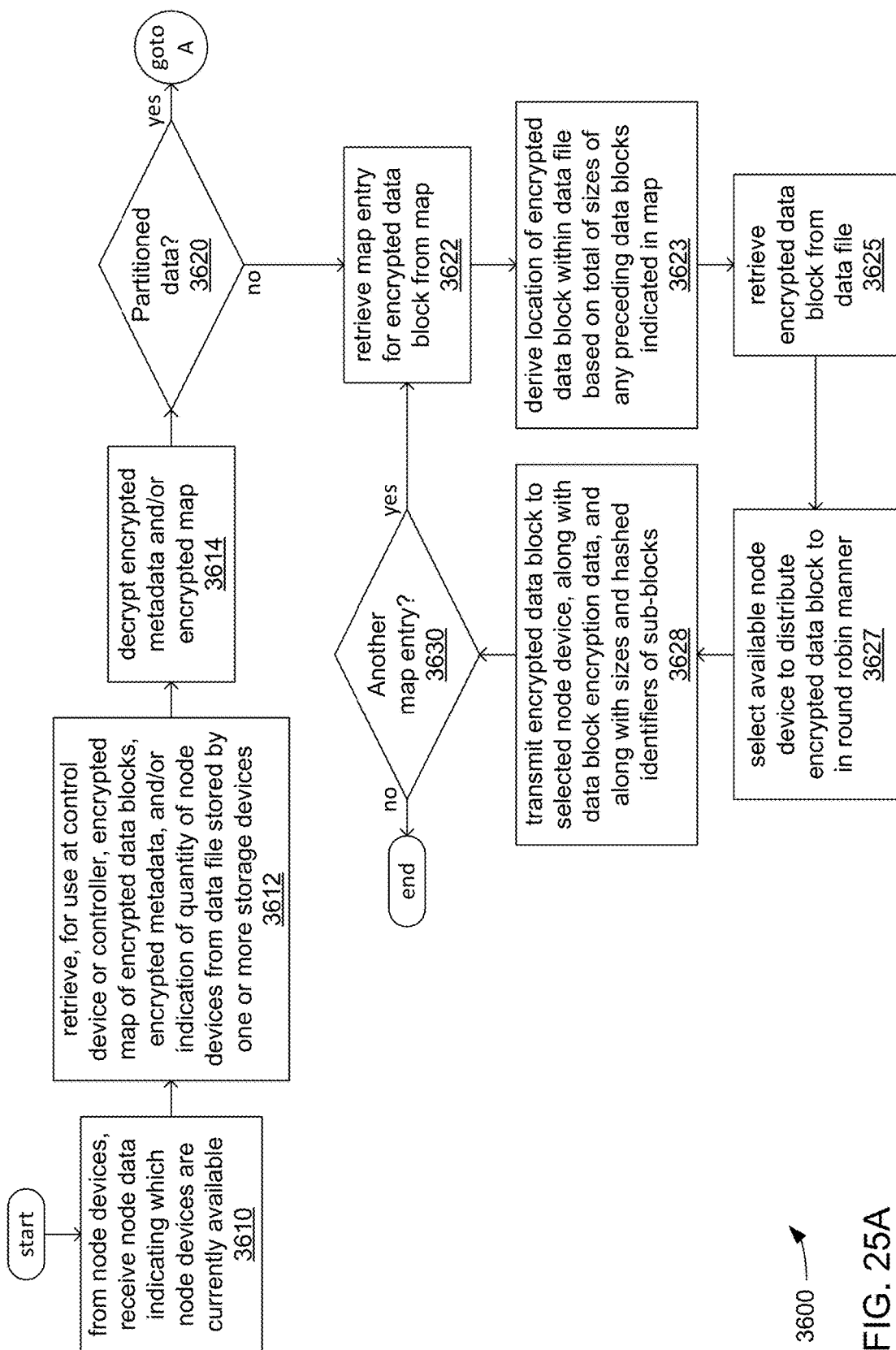
Figure 25B:
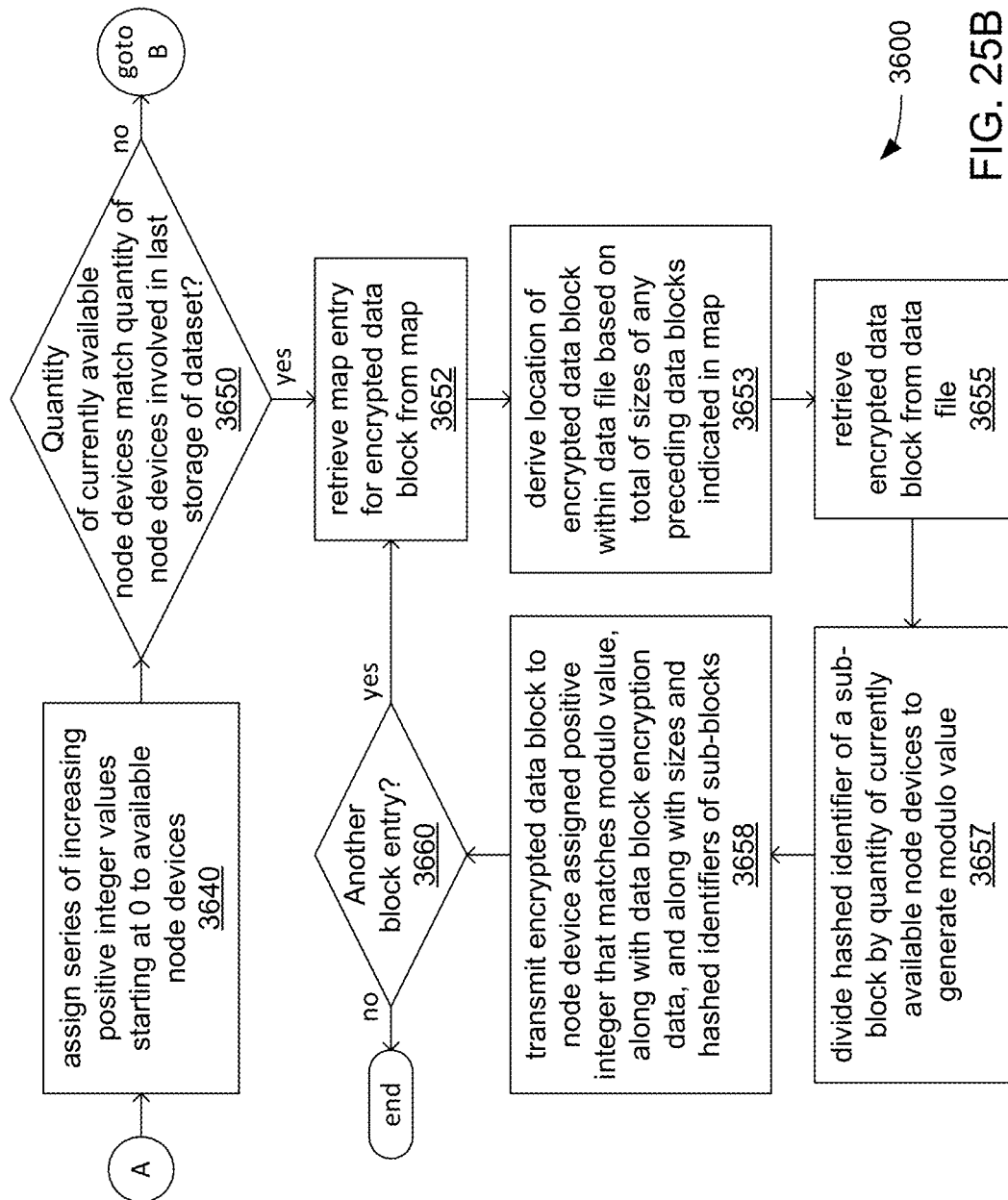

FIGS. 25A, 25B and 25C, together, illustrate an example embodiment of a logic flow 3600. The logic flow 3600 may be representative of some or all of the operations executed by one or more embodiments described herein. More specifically, the logic flow 3600 may illustrate operations performed by the processor component 2550 in executing the control routine 2540, and/or performed by other component(s) of the control device 2500 or of the controller 2507 implemented within at least one of the node devices 2700.

The logic flow 3600 is substantially similar to the 3500 of FIGS. 24A-B insofar as both of the logic flows 3500 and 3600 address aspects of the retrieval and decryption of encrypted data blocks of a data set from within a data file maintained by one or more storage devices. However, while the logic flow 3500 addresses embodiments in which the node devices are capable (and are permitted) to individually retrieve encrypted data blocks from the one or more storage devices, the logic flow 3600 addresses embodiments in which the node devices are not so capable (or are not so permitted) such that the encrypted data blocks are relayed through the control device or the controller within one of the node devices.

Thus, unlike at 3528 of the logic flow 3500 where a pointer to an encrypted data block within a data file is transmitted to a node device, at 3628 of the logic flow 3600, a processor component of a control device or a controller implemented within a node device (e.g., the processor component 2550 of the control device 2500 or of the controller 2507 implemented within one of the node devices 2700) may transmit the encrypted data block to the node device after having retrieved the encrypted data block from the data file at 3625.

Also, unlike at 3558 of the logic flow 3500 where a pointer to an encrypted data block is transmitted to a node device selected via a modulo value, at 3658 of the logic flow 3600, a processor component of a control device or a controller implemented within a node device may transmit the encrypted data block to the node device selected via a modulo value after having retrieved the encrypted data block at 3655.

Further, unlike at 3586 of the logic flow 3500 where a pointer to an encrypted data block is transmitted to a node device selected via a modulo value, at 3686 of the logic flow 3600, a processor component of a control device or a controller implemented within a node device may transmit the encrypted data block to the node device selected via a modulo value after having retrieved the encrypted data block at 3674.

In various embodiments, the division of processing and/or storage resources among the devices, and/or the API architectures supporting communications among the devices, may be configured to and/or selected to conform to any of a variety of standards for distributed processing, including without limitation, IEEE P2413, the ALLJOYN® standard, the IOTIVITY™ standard, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data set portions of data set(s) are not dependent on, nor constrained by, existing API architectures and/or supporting communications protocols. More broadly, there is nothing in the manner in which data set(s) may be organized in storage, transmission and/or distribution via a network that is bound to existing API architectures or protocols.

Some systems may use the HADOOP® framework, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node HADOOP® cluster, as understood by a person of skill in the art. The APACHE™ HADOOP® framework is an open-source software framework for distributed computing.

Implementing some examples at least in part by using machine-learning models can reduce the total number of processing iterations, time, memory, electrical power, or any combination of these consumed by a computing device when analyzing data. Some machine-learning approaches may be more efficiently and speedily executed and processed with machine-learning specific processors (e.g., not a generic CPU). For example, some of these processors can include a graphical processing unit (GPU), an application-specific integrated circuit (ASIC), a field-programmable gate array (FPGA), a Tensor Processing Unit (TPU) by Google, and/or some other machine-learning specific processor that implements one or more neural networks using semiconductor (e.g., silicon (Si), gallium arsenide (GaAs)) devices.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising a processor component and a storage to store instructions that, when executed by the processor component, cause the processor component to perform operations comprising:
use, by the processor component, first map block encryption data to encrypt a first map extension of multiple map extensions of a map data to generate a first encrypted map extension of multiple encrypted map extensions, wherein:
each map extension of the multiple map extensions comprises multiple map entries; and
each map entry of the multiple map entries within each map extension comprises data block encryption data used to encrypt a portion of a data set to generate a corresponding encrypted data block of multiple encrypted data blocks, and an indication of a data block size of the corresponding encrypted data block;
store the first encrypted map extension at a first location within a data file maintained by one or more storage devices to store the data set and the map data in encrypted form;
use, by the processor component, second map block encryption data to encrypt a second map extension of the multiple map extensions to generate a second encrypted map extension of the multiple encrypted map extensions, wherein:
the second map block encryption data differs from the first map block encryption data; and
the second map extension comprises the first map block encryption data;
store the second encrypted map extension at a second location within the data file;
use, by the processor component, third map block encryption data to encrypt a map base of the map data to generate an encrypted map base, wherein:
the third map block encryption data differs from the first map block encryption data and the second map block encryption data;
the map base comprises the second map block encryption data; and
the map base comprises multiple extension pointers that each point to a corresponding location within the data file at which a corresponding encrypted map extension of the multiple encrypted map extensions is stored; and
store the encrypted map base at a third location within the data file.

2. The apparatus of claim 1, wherein the processor component is caused to perform operations comprising:
compare a size of the map data to a threshold map data size;
determine, by the processor component, whether to divide the map data into the map base and the multiple map extensions based on the comparison; and
in response to a determination that the size of the map data exceeds the threshold map data size, perform operations comprising:
determine, by the processor component, a quantity of the multiple map extensions based on a size of the map data; and
generate the map extensions of the multiple map extensions to have exponentially increasing sizes wherein the first map extension is twice the size of the second map extension.

3. The apparatus of claim 1, wherein:
the third location within the data file at which the encrypted map base is to be stored comprises a predetermined location within the data file relative to a starting end of the data file; and
the processor component is caused to perform operations comprising:
derive the second location within the data file at which the second map extension is to be stored based on the third location and a size of the encrypted map base, wherein the second location follows the encrypted map base and precedes the multiple encrypted data blocks corresponding to the multiple map entries of the second map extension; and
derive the first location within the data file at which the first map extension is to be stored based on the second location, a size of the second encrypted map extension and a total size of the multiple encrypted data blocks corresponding to the multiple map entries of the second map extension, wherein the second location follows the multiple encrypted data blocks corresponding to the multiple map entries of the second map extension and precedes the multiple encrypted data blocks corresponding to the multiple map entries of the first map extension.

4. The apparatus of claim 1, wherein the processor component is caused to perform operations comprising:
   randomly generate a first salt value as part of the first map block encryption data;
   use, by the processor component, the first map block encryption data and a pass phrase to generate a first encryption cipher;
   use, by the processor component, the first encryption cipher and a size of the first map extension to encrypt the first map extension to generate the first encrypted map extension;
   randomly generate a second salt value as part of the second map block encryption data;
   use, by the processor component, the second map block encryption data and the pass phrase to generate a second encryption cipher;
   use, by the processor component, the second encryption cipher and a size of the second map extension to encrypt the second map extension to generate the second encrypted map extension;
   randomly generate a third salt value as part of the third map block encryption data;
   use, by the processor component, the third map block encryption data and the pass phrase to generate a third encryption cipher; and
   use, by the processor component, the third encryption cipher and a size of the map base to encrypt the map base to generate the encrypted map base, wherein the pass phrase is not to be transmitted to the one or more storage devices.

5. The apparatus of claim 4, wherein the processor component is caused to perform operations comprising:
   randomly generate a fourth salt value as part of a metadata block encryption data;
   use, by the processor component, the metadata block encryption data and the pass phrase to generate a fourth encryption cipher;
   use, by the processor component, the fourth encryption cipher and a size of metadata descriptive of an organization of data of the data set to encrypt the metadata to generate encrypted metadata; and
   store the encrypted metadata at a fourth location within the data file, wherein the map base comprises the metadata block encryption data.

6. The apparatus of claim 1, wherein the processor component is caused to perform operations comprising:
   perform an XOR operation with the third map block encryption data; and
   following the performance of the XOR operation, transmit the third map block encryption data to the one or more storage devices to be stored at a predetermined location within the data file.

7. The apparatus of claim 1, wherein the processor component is caused to perform operations comprising:
   receive, at a control device that comprises the processor component, the data block encryption data and the data block size for each encrypted data block of the multiple encrypted data blocks from multiple node devices;
   receive, at the control device and from each node device of the multiple node devices, a request for a pointer to at location within the data file at which the node device is to store an encrypted data block of the multiple encrypted data blocks; and
   in response to each request for a pointer received from a node device of the multiple node devices, derive the location within the data file at which the node device is to store the encrypted data block, and transmit, to node device, a pointer to the location within the data file.

8. The apparatus of claim 1, wherein the processor component is caused to perform operations comprising:
   receive, at a control device that comprises the processor component, the data block encryption data and the data block size for each encrypted data block of the multiple encrypted data blocks from multiple node devices;
   receive, at the control device and from each node device of the multiple node devices, at least one encrypted data block of the multiple encrypted data blocks to store an encrypted data block of the multiple encrypted data blocks; and
   in response to each receipt of at least one encrypted data block from a node device of the multiple node devices, derive the location within the data file at which the control device is to store the at least one encrypted data block, and transmit the at least one encrypted data block to the one or more storage devices to store within the data file at the location.

9. The apparatus of claim 1, wherein the processor component is caused, at a time following storage of the data set as the multiple encrypted data blocks within the data file, and at a time following storage of the map data as the encrypted map base and the multiple encrypted map extensions within the data file, to perform operations comprising:
   retrieve the third map block encryption data from a predetermined location within the data file;
   retrieve the encrypted map base from the third location within the data file;
   use, by the processor component, the third map block encryption data and a pass phrase to generate a third decryption cipher;
   use, by the processor component, the third decryption cipher and a size of the encrypted map base to decrypt the encrypted map base to regenerate the map base;
   retrieve the second map block encryption data from the map base;
   retrieve the second encrypted map extension from the second location within the data file;
   use, by the processor component, the second map block encryption data and the pass phrase to generate a second decryption cipher;
   use, by the processor component, the second decryption cipher and a size of the second encrypted map extension to decrypt the second encrypted map extension to regenerate the second map extension;
   retrieve the first map block encryption data from the second map extension;
   retrieve the first encrypted map extension from the first location within the data file;
   use, by the processor component, the first map block encryption data and the pass phrase to generate a first decryption cipher; and
   use, by the processor component, the first decryption cipher and a size of the first encrypted map extension to decrypt the first encrypted map extension to regenerate the first map extension.

10. The apparatus of claim 9, wherein the processor component is caused to perform operations comprising:
- derive, by the processor component, a distribution of the multiple encrypted data blocks among multiple node devices; and
- for each encrypted data block of the multiple encrypted data blocks, transmit at least the corresponding data block encryption data to a node device of the multiple node devices to which the encrypted data block is assigned in the distribution to enable the node device to decrypt the encrypted data block.

11. A computer-program product tangibly embodied in a non-transitory machine-readable storage medium, the computer-program product including instructions operable to cause a processor component to perform operations comprising:
- use, by the processor component, first map block encryption data to encrypt a first map extension of multiple map extensions of a map data to generate a first encrypted map extension of multiple encrypted map extensions, wherein:
  - each map extension of the multiple map extensions comprises multiple map entries; and
  - each map entry of the multiple map entries within each map extension comprises data block encryption data used to encrypt a portion of a data set to generate a corresponding encrypted data block of multiple encrypted data blocks, and an indication of a data block size of the corresponding encrypted data block;
- store the first encrypted map extension at a first location within a data file maintained by one or more storage devices to store the data set and the map data in encrypted form;
- use, by the processor component, second map block encryption data to encrypt a second map extension of the multiple map extensions to generate a second encrypted map extension of the multiple encrypted map extensions, wherein:
  - the second map block encryption data differs from the first map block encryption data; and
  - the second map extension comprises the first map block encryption data;
- store the second encrypted map extension at a second location within the data file;
- use, by the processor component, third map block encryption data to encrypt a map base of the map data to generate an encrypted map base, wherein:
  - the third map block encryption data differs from the first map block encryption data and the second map block encryption data;
  - the map base comprises the second map block encryption data; and
  - the map base comprises multiple extension pointers that each point to a corresponding location within the data file at which a corresponding encrypted map extension of the multiple encrypted map extensions is stored; and
- store the encrypted map base at a third location within the data file.

12. The computer-program product of claim 11, wherein the processor component is caused to perform operations comprising:
- compare a size of the map data to a threshold map data size;
- determine, by the processor component, whether to divide the map data into the map base and the multiple map extensions based on the comparison; and
- in response to a determination that the size of the map data exceeds the threshold map data size, perform operations comprising:
  - determine, by the processor component, a quantity of the multiple map extensions based on a size of the map data; and
  - generate the map extensions of the multiple map extensions to have exponentially increasing sizes.

13. The computer-program product of claim 11, wherein:
the third location within the data file at which the encrypted map base is to be stored comprises a predetermined location within the data file relative to a starting end of the data file; and
the processor component is caused to perform operations comprising:
- derive the second location within the data file at which the second map extension is to be stored based on the third location and a size of the encrypted map base, wherein the second location follows the encrypted map base and precedes the multiple encrypted data blocks corresponding to the multiple map entries of the second map extension; and
- derive the first location within the data file at which the first map extension is to be stored based on the second location, a size of the second encrypted map extension and a total size of the multiple encrypted data blocks corresponding to the multiple map entries of the second map extension, wherein the second location follows the multiple encrypted data blocks corresponding to the multiple map entries of the second map extension and precedes the multiple encrypted data blocks corresponding to the multiple map entries of the first map extension.

14. The computer-program product of claim 11, wherein the processor component is caused to perform operations comprising:
- randomly generate a first salt value as part of the first map block encryption data;
- use, by the processor component, the first map block encryption data and a pass phrase to generate a first encryption cipher;
- use, by the processor component, the first encryption cipher and a size of the first map extension to encrypt the first map extension to generate the first encrypted map extension;
- randomly generate a second salt value as part of the second map block encryption data;
- use, by the processor component, the second map block encryption data and the pass phrase to generate a second encryption cipher;
- use, by the processor component, the second encryption cipher and a size of the second map extension to encrypt the second map extension to generate the second encrypted map extension;
- randomly generate a third salt value as part of the third map block encryption data;
- use, by the processor component, the third map block encryption data and the pass phrase to generate a third encryption cipher; and
- use, by the processor component, the third encryption cipher and a size of the map base to encrypt the map base to generate the encrypted map base, wherein the pass phrase is not to be transmitted to the one or more storage devices.

15. The computer-program product of claim 14, wherein the processor component is caused to perform operations comprising:
- randomly generate a fourth salt value as part of a metadata block encryption data;
- use, by the processor component, the metadata block encryption data and the pass phrase to generate a fourth encryption cipher;
- use, by the processor component, the fourth encryption cipher and a size of metadata descriptive of an organization of data of the data set to encrypt the metadata to generate encrypted metadata; and
- store the encrypted metadata at a fourth location within the data file, wherein the map base comprises the metadata block encryption data.

16. The computer-program product of claim 11, wherein the processor component is caused to perform operations comprising:
- perform an XOR operation with the third map block encryption data; and
- following the performance of the XOR operation, transmit the third map block encryption data to the one or more storage devices to be stored at a predetermined location within the data file.

17. The computer-program product of claim 11, wherein the processor component is caused to perform operations comprising:
- receive, at a control device that comprises the processor component, the data block encryption data and the data block size for each encrypted data block of the multiple encrypted data blocks from multiple node devices;
- receive, at the control device and from each node device of the multiple node devices, a request for a pointer to at location within the data file at which the node device is to store an encrypted data block of the multiple encrypted data blocks; and
- in response to each request for a pointer received from a node device of the multiple node devices, derive the location within the data file at which the node device is to store the encrypted data block, and transmit, to node device, a pointer to the location within the data file.

18. The computer-program product of claim 11, wherein the processor component is caused to perform operations comprising:
- receive, at a control device that comprises the processor component, the data block encryption data and the data block size for each encrypted data block of the multiple encrypted data blocks from multiple node devices;
- receive, at the control device and from each node device of the multiple node devices, at least one encrypted data block of the multiple encrypted data blocks to store an encrypted data block of the multiple encrypted data blocks; and
- in response to each receipt of at least one encrypted data block from a node device of the multiple node devices, derive the location within the data file at which the control device is to store the at least one encrypted data block, and transmit the at least one encrypted data block to the one or more storage devices to store within the data file at the location.

19. The computer-program product of claim 11, wherein the processor component is caused, at a time following storage of the data set as the multiple encrypted data blocks within the data file, and at a time following storage of the map data as the encrypted map base and the multiple encrypted map extensions within the data file, to perform operations comprising:
- retrieve the third map block encryption data from a predetermined location within the data file;
- retrieve the encrypted map base from the third location within the data file;
- use, by the processor component, the third map block encryption data and a pass phrase to generate a third decryption cipher;
- use, by the processor component, the third decryption cipher and a size of the encrypted map base to decrypt the encrypted map base to regenerate the map base;
- retrieve the second map block encryption data from the map base;
- retrieve the second encrypted map extension from the second location within the data file;
- use, by the processor component, the second map block encryption data and the pass phrase to generate a second decryption cipher;
- use, by the processor component, the second decryption cipher and a size of the second encrypted map extension to decrypt the second encrypted map extension to regenerate the second map extension;
- retrieve the first map block encryption data from the second map extension;
- retrieve the first encrypted map extension from the first location within the data file;
- use, by the processor component, the first map block encryption data and the pass phrase to generate a first decryption cipher; and
- use, by the processor component, the first decryption cipher and a size of the first encrypted map extension to decrypt the first encrypted map extension to regenerate the first map extension.

20. The computer-program product of claim 19, wherein the processor component is caused to perform operations comprising:
- derive, by the processor component, a distribution of the multiple encrypted data blocks among multiple node devices; and
- for each encrypted data block of the multiple encrypted data blocks, transmit at least the corresponding data block encryption data to a node device of the multiple node devices to which the encrypted data block is assigned in the distribution to enable the node device to decrypt the encrypted data block.

21. A computer-implemented method comprising:
- using, by a processor component, first map block encryption data to encrypt a first map extension of multiple map extensions of a map data to generate a first encrypted map extension of multiple encrypted map extensions, wherein:
  - each map extension of the multiple map extensions comprises multiple map entries; and
  - each map entry of the multiple map entries within each map extension comprises data block encryption data used to encrypt a portion of a data set to generate a corresponding encrypted data block of multiple encrypted data blocks, and an indication of a data block size of the corresponding encrypted data block;
- storing the first encrypted map extension at a first location within a data file maintained by one or more storage devices to store the data set and the map data in encrypted form;

using, by the processor component, second map block encryption data to encrypt a second map extension of the multiple map extensions to generate a second encrypted map extension of the multiple encrypted map extensions, wherein:
the second map block encryption data differs from the first map block encryption data; and
the second map extension comprises the first map block encryption data;
storing the second encrypted map extension at a second location within the data file;
using, by the processor component, third map block encryption data to encrypt a map base of the map data to generate an encrypted map base, wherein:
the third map block encryption data differs from the first map block encryption data and the second map block encryption data;
the map base comprises the second map block encryption data; and
the map base comprises multiple extension pointers that each point to a corresponding location within the data file at which a corresponding encrypted map extension of the multiple encrypted map extensions is stored; and
storing the encrypted map base at a third location within the data file.

22. The computer-implemented method of claim 21, comprising:
comparing a size of the map data to a threshold map data size;
determining, by the processor component, whether to divide the map data into the map base and the multiple map extensions based on the comparison; and
in response to a determination that the size of the map data exceeds the threshold map data size, performing operations comprising:
determining, by the processor component, a quantity of the multiple map extensions based on a size of the map data; and
generating the map extensions of the multiple map extensions to have exponentially increasing sizes.

23. The computer-implemented method of claim 21, wherein:
the third location within the data file at which the encrypted map base is to be stored comprises a predetermined location within the data file relative to a starting end of the data file; and
the method comprises:
deriving the second location within the data file at which the second map extension is to be stored based on the third location and a size of the encrypted map base, wherein the second location follows the encrypted map base and precedes the multiple encrypted data blocks corresponding to the multiple map entries of the second map extension; and
deriving the first location within the data file at which the first map extension is to be stored based on the second location, a size of the second encrypted map extension and a total size of the multiple encrypted data blocks corresponding to the multiple map entries of the second map extension, wherein the second location follows the multiple encrypted data blocks corresponding to the multiple map entries of the second map extension and precedes the multiple encrypted data blocks corresponding to the multiple map entries of the first map extension.

24. The computer-implemented method of claim 21, comprising:
randomly generating a first salt value as part of the first map block encryption data;
using, by the processor component, the first map block encryption data and a pass phrase to generate a first encryption cipher;
using, by the processor component, the first encryption cipher and a size of the first map extension to encrypt the first map extension to generate the first encrypted map extension;
randomly generating a second salt value as part of the second map block encryption data;
using, by the processor component, the second map block encryption data and the pass phrase to generate a second encryption cipher;
using, by the processor component, the second encryption cipher and a size of the second map extension to encrypt the second map extension to generate the second encrypted map extension;
randomly generating a third salt value as part of the third map block encryption data;
using, by the processor component, the third map block encryption data and the pass phrase to generate a third encryption cipher; and
using, by the processor component, the third encryption cipher and a size of the map base to encrypt the map base to generate the encrypted map base, wherein the pass phrase is not to be transmitted to the one or more storage devices.

25. The computer-implemented method of claim 24, comprising:
randomly generating a fourth salt value as part of a metadata block encryption data;
using, by the processor component, the metadata block encryption data and the pass phrase to generate a fourth encryption cipher;
using, by the processor component, the fourth encryption cipher and a size of metadata descriptive of an organization of data of the data set to encrypt the metadata to generate encrypted metadata; and
storing the encrypted metadata at a fourth location within the data file, wherein the map base comprises the metadata block encryption data.

26. The computer-implemented method of claim 21, comprising:
performing an XOR operation with the third map block encryption data; and
following the performance of the XOR operation, transmitting the third map block encryption data to the one or more storage devices to be stored at a predetermined location within the data file.

27. The computer-implemented method of claim 21, comprising:
receiving, at a control device that comprises the processor component, the data block encryption data and the data block size for each encrypted data block of the multiple encrypted data blocks from multiple node devices;
receiving, at the control device and from each node device of the multiple node devices, a request for a pointer to at location within the data file at which the node device is to store an encrypted data block of the multiple encrypted data blocks; and
in response to each request for a pointer received from a node device of the multiple node devices, deriving the location within the data file at which the node device is to store the encrypted data block, and transmit, to node device, a pointer to the location within the data file.

28. The computer-implemented method of claim 21, comprising:
receiving, at a control device that comprises the processor component, the data block encryption data and the data block size for each encrypted data block of the multiple encrypted data blocks from multiple node devices;
receiving, at the control device and from each node device of the multiple node devices, at least one encrypted data block of the multiple encrypted data blocks to store an encrypted data block of the multiple encrypted data blocks; and
in response to each receipt of at least one encrypted data block from a node device of the multiple node devices, deriving the location within the data file at which the control device is to store the at least one encrypted data block, and transmitting the at least one encrypted data block to the one or more storage devices to store within the data file at the location.

29. The computer-implemented method of claim 21, comprising, at a time following storage of the data set as the multiple encrypted data blocks within the data file, and at a time following storage of the map data as the encrypted map base and the multiple encrypted map extensions within the data file, performing operations comprising:
retrieving the third map block encryption data from a predetermined location within the data file;
retrieving the encrypted map base from the third location within the data file;
using, by the processor component, the third map block encryption data and a pass phrase to generate a third decryption cipher;
using, by the processor component, the third decryption cipher and a size of the encrypted map base to decrypt the encrypted map base to regenerate the map base;
retrieving the second map block encryption data from the map base;
retrieving the second encrypted map extension from the second location within the data file;
using, by the processor component, the second map block encryption data and the pass phrase to generate a second decryption cipher;
using, by the processor component, the second decryption cipher and a size of the second encrypted map extension to decrypt the second encrypted map extension to regenerate the second map extension;
retrieving the first map block encryption data from the second map extension;
retrieving the first encrypted map extension from the first location within the data file;
using, by the processor component, the first map block encryption data and the pass phrase to generate a first decryption cipher; and
using, by the processor component, the first decryption cipher and a size of the first encrypted map extension to decrypt the first encrypted map extension to regenerate the first map extension.

30. The computer-implemented method of claim 29, comprising:
deriving, by the processor component, a distribution of the multiple encrypted data blocks among multiple node devices; and
for each encrypted data block of the multiple encrypted data blocks, transmitting at least the corresponding data block encryption data to a node device of the multiple node devices to which the encrypted data block is assigned in the distribution to enable the node device to decrypt the encrypted data block.

* * * * *